US008566029B1

(12) United States Patent
Lopatenko et al.

(10) Patent No.: US 8,566,029 B1
(45) Date of Patent: Oct. 22, 2013

(54) ENHANCED IDENTIFICATION OF INTERESTING POINTS-OF-INTEREST

(75) Inventors: Andrei Lopatenko, Cupertino, CA (US); Hyung-Jin Kim, Sunnyvale, CA (US); Soham Mazumdar, San Francisco, CA (US)

(73) Assignee: Google Inc., Mountain View, CA (US)

( * ) Notice: Subject to any disclaimer, the term of this patent is extended or adjusted under 35 U.S.C. 154(b) by 877 days.

(21) Appl. No.: 12/617,302

(22) Filed: Nov. 12, 2009

(51) Int. Cl.
*G01C 21/00* (2006.01)
*G01C 21/34* (2006.01)
*G08G 1/09* (2006.01)

(52) U.S. Cl.
USPC ........... 701/426; 701/400; 701/425; 701/424; 701/438; 701/532; 701/538; 701/541

(58) Field of Classification Search
USPC .................................................. 701/400–541
See application file for complete search history.

(56) References Cited

U.S. PATENT DOCUMENTS

| | | | | |
|---|---|---|---|---|
| 6,401,034 | B1 * | 6/2002 | Kaplan et al. ................. | 701/416 |
| 6,542,812 | B1 * | 4/2003 | Obradovich et al. ......... | 701/426 |
| 6,826,472 | B1 * | 11/2004 | Kamei et al. .................. | 701/426 |
| 2003/0036848 | A1 * | 2/2003 | Sheha et al. .................. | 701/209 |

OTHER PUBLICATIONS

"Enkin: navigation reinvented," [retrieved on Nov. 12, 2009]. Retrieved from the Internet: htte://www.enkin.net/ (1 page).
"Wikitude," [retrieved on Nov. 12, 2009]. Retrieved from the Internet: http://www.wikitude.org/ (2 pages).
"Where GPS Mobile Application for the iPhone, BlackBerry, Google Android & Palm Pre," [retrieved on Nov. 12, 2009]. Retrieved from the Internet: http://www.where.com/ (6 pages).
"OpenTable: 27/7 Online Reservations," [retrieved on Nov. 12, 2009]. Retrieved from the Internet: http://www.opentable.com/info/aboutus.aspx (1 page).
"Washington DC, Restaurants/Urbanspoon," [retrieved on Nov. 12, 2009]. Retrieved from the Internet: http://www.urbanspoon.com/c/7/Washington-DC-restaurants.html (6 pages).
"AroundMe," [retrieved on Nov. 12, 2009]. Retrieved from the Internet: htto://www.tweakersoft.com/mobile/aroundme.html (2 paces).
"FAQ/Yelp", [retrieved on Nov. 12, 2009]. Retrieved from the Internet: http://www.yelp.com/faq (5 pages).

* cited by examiner

*Primary Examiner* — Bhavesh V Amin
(74) *Attorney, Agent, or Firm* — Fish & Richardson P.C.

(57) ABSTRACT

Methods, systems, and apparatus, including computer programs encoded on a computer storage medium, for identifying points-of-interest. In one aspect, a method includes identifying points-of-interest (POIs) associated with one or more of multiple, selected geographic areas, and determining, for each of the multiple geographic areas, a score associated with the identified POIs. The actions also include generating a combined score for each identified POI based on the determined scores associated with the respective POI, selecting a subset of the identified POIs based at least on the combined scores, and displaying a link to the POIs in the subset.

20 Claims, 28 Drawing Sheets

FIG. 11

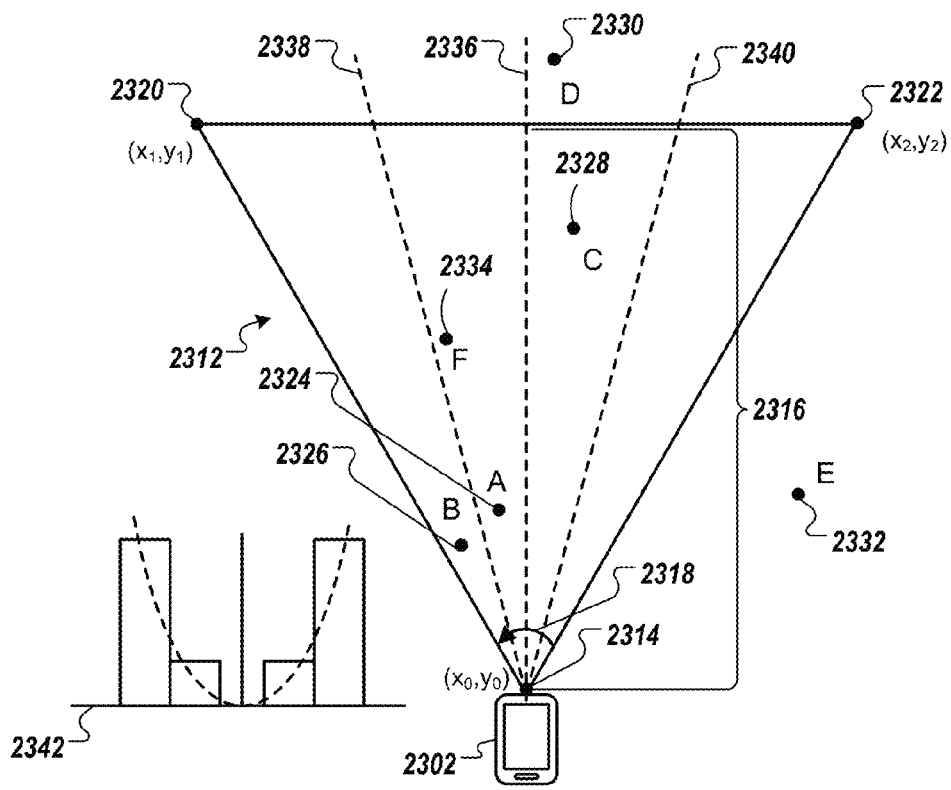
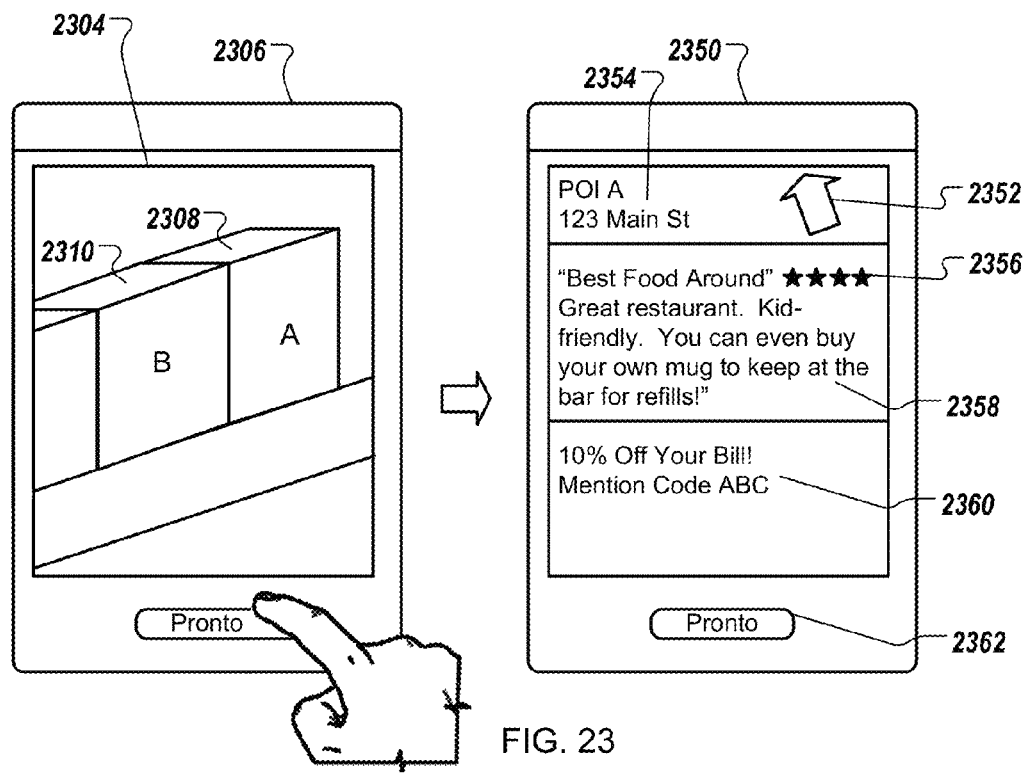
FIG. 23

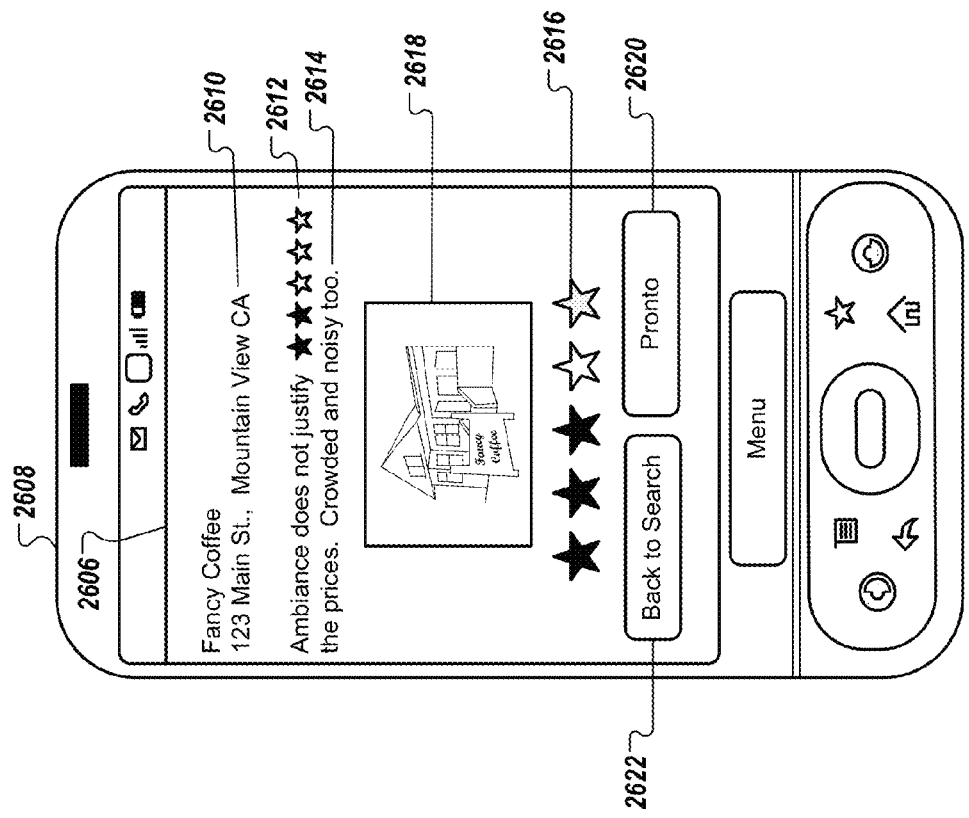
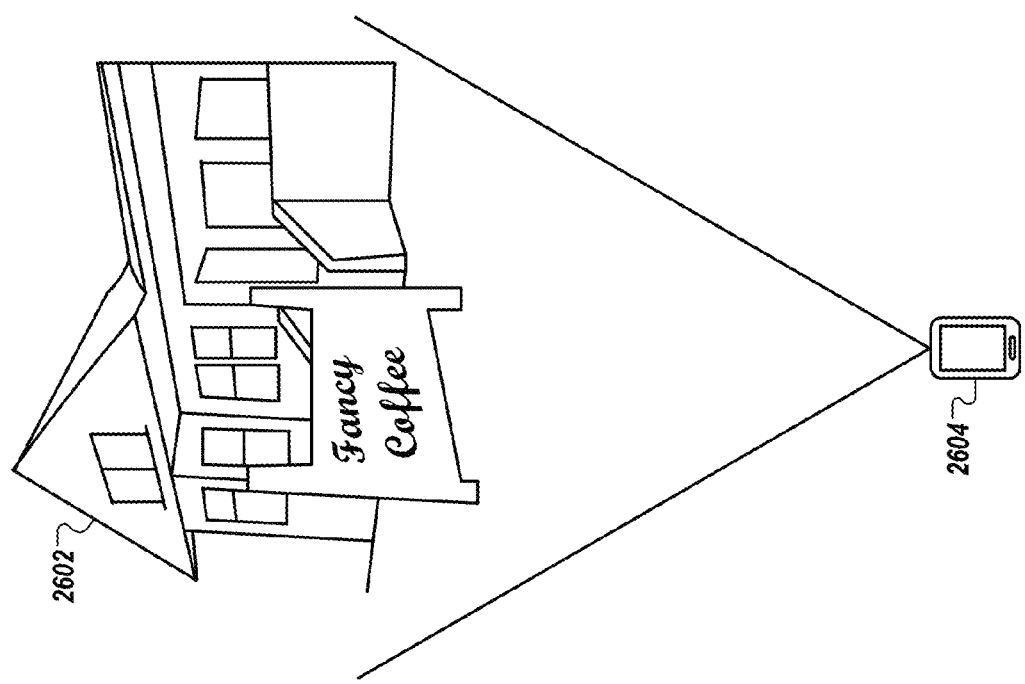
FIG. 26

ENHANCED IDENTIFICATION OF INTERESTING POINTS-OF-INTEREST

BACKGROUND

This specification relates to search engines.

Rather than visiting a local outlet of a popular regional or national chain, a person who is traveling in an unfamiliar area may instead want to patronize nearby points-of-interest ("POIs") which local residents, tourists, business travelers, or others might consider to be particularly affiliated with or tied to that area. Such a POI may be, for example, a boutique or specialty shop, a locally advertised museum, a government building or site, a so-called "for locals" establishment or a "neighborhood gem," or another attraction that is popular among residents of that area.

SUMMARY

Since a visitor to an area might consider those POIs which other people strongly affiliate with that area to be interesting, this specification refers to these types of POIs as "interesting" POIs. Accordingly, this specification describes technologies relating to the identification of interesting POIs using a search engine, including processes that identify interesting POIs in response to a search query which identifies a particular geographic area. The search query may be a general search query, or a particular query to identify the most interesting places around.

In attempting to identify these interesting POIs, an assumption is made that the number of times that a POI has been selected in certain search results directly correlates with how interesting that POI is with respect to a certain particular locality. Accordingly, for each particular locality, a measure of interest (or "score") is assigned to a POI based on the extent to which the POI has been selected in these results by past users, or based on an estimate of the past users' satisfaction with their selections from among these search results. Using search engine click data, scores are collected for multiple POIs across multiple localities, where a high score for a particular POI in connection with a particular locality denotes that past users of the search engine consider that POI to be highly affiliated with that locality, and thus very interesting.

Since past users of the search engine may, to some extent, also select links to other POIs, the "interesting" designation is reserved for those POIs whose score generally meets, exceeds, or otherwise satisfies a predetermined score threshold, or for those POIs whose relative score exceeds the respective score of one or more other POIs. By contrast, this specification refers to those POIs whose score fails to satisfy the predetermined score threshold, or relative score criteria, as either "less interesting," "uninteresting," or "not interesting."

Since the characteristics that make a POI "interesting" are somewhat intangible and are generally inferred from past users' click behavior, techniques for identifying these POIs are often inherently different than, and require a different algorithm from, techniques which merely identify POIs based just on their associated user rating or ranking, popularity, or proximity. For example, a "long click" may occur when a user remains on a website associated with a particular POI for a minimum duration of time, for example sixty seconds. Such a POI may be considered to be more satisfying or interesting than a POI whose website receives fewer long clicks.

In one example use of the enhanced technique described by this specification, a visitor to Brooklyn or Seattle may enter the words "pizza" or "coffee," respectively, as part of a search query. If the search query also includes the location of the user as a query term, the visitor would likely be disappointed if the search results promoted a popular, national pizza or coffee chain that may have a franchise location in those areas, over a lesser-known, local business which local residents might consider to be a neighborhood institution or gem. According to this enhanced identification technique, these smaller, good quality, neighborhood businesses may be promoted in the search engine results over more popular national chains based in part on an affiliation that has been established between the identified neighborhood businesses and the location by measuring or monitoring the behaviors of past users of the search engine. Monitoring of the past users' behaviors may include counting the number of times that the past users have selected links to these neighborhood businesses in certain search results, and/or by estimating how satisfied the past users were with their selections.

The promotion of certain interesting POIs over other uninteresting POIs does not always disfavor nationally or regionally popular businesses. In fact, where past users of the search engine have established that, for a certain category of business, a local outlet of a nationally or regionally popular chain is the business which is most affiliated with the local area, that local outlet may be designated as more interesting than other, smaller local businesses. This same phenomenon may also occur where no competing small businesses of that category exist in the local area. Specifically, where the local outlet of a national chain is the only business of its type in the geographic area, it may be considered, by default, the most interesting. This is true even if its associated score, though relatively high for one geographic area, would be relatively low in another geographic area.

For example, and in contrast to the earlier example, a visitor to a rural town may enter the terms "pizza" or "coffee" as part of a search engine query which also includes the user's location as a query term. As a result, a local outlet of a popular, national pizza or coffee chain may be identified as the most interesting POI in the area for that category of POIs, if no other POIs related to "pizza" or "coffee" are nearby, if past users of the search engine have selected links to the national pizza or coffee chain more frequently than links to other local businesses in certain search results, or if the search engine estimates that past users are more satisfied with their selections of the links to the national pizza or coffee chain over their selections of links to local businesses. Accordingly, a POI may be designated as interesting (or not) with respect to a particular locality regardless of whether the POI is nationally or regionally popular.

As a precursor to identifying interesting POIs, a geographic region in which this identification technique is to be used (i.e., a continent, country, state or province, or city) is divided into smaller geographic areas, and one or more types of databases are generated or established for each area. This specification also refers to these geographic areas into which a larger geographic region is divided as "cells," "localities", "neighborhoods," or "buckets."

For each geographic area, the associated database (or databases) stores information identifying POIs and their associated scores, where each score is determined based upon the frequency and/or nature of a selection of certain search results associated with each respective POI by past users of the search engine. Generally, for a particular database associated with a particular geographic area, POIs having higher scores will be considered by the enhanced identification technique to be more affiliated with the particular area (i.e., more interesting) than those POIs with lower scores.

Using these databases, local, interesting POIs may be distinguished from other POIs which might generally receive more attention by users on a national or regional level, or from other local businesses which others do not yet consider to be especially affiliated with the geographic area. Information identifying these POIs may be displayed to a user who may be searching for a local neighborhood institution or gem, along with navigation, advertisement, rating, or other contextual information that might aid the user in selecting a POI to visit.

Once the databases for multiple geographic areas have been populated with scores for various POIs (or, as discussed in more detail below, for various query term/POI pairs), these databases are used to identify interesting POIs for a particular geographic area. Initially, a target location is selected, where the target location may be a user-selected location, or a location where a user is currently or is expected to be in the future. Geographic areas near a target location are identified, as are candidate POIs which are scored in the databases associated with these identified geographic areas. If query refinement criteria are initially applied, identified POIs which do not satisfy these criteria, such as those POIs which are not associated with a selected category, may be filtered, deleted, or otherwise ignored from further processing.

The scores for the remaining identified POIs are determined from the databases associated with the selected geographic areas. The scores may be adjusted or weighted using a fall-off function based on their distance to the target location, based on their proximity to an expected travel destination of a user, user reviews (e.g., "star" ratings), or using other criteria, and the scores are combined or otherwise aggregated to generate a combined score for each remaining identified POI. These POIs are ranked based on their combined scores, and those POIs with the highest scores, or whose scores exceed a certain threshold, are designated as interesting. Information which identifies the interesting POIs is provided for display to the user, as is other contextual information which may aid the user in selecting a POI to visit.

In one exemplary implementation, the geographic area definitions, at least some of the databases associated with selected geographic areas, and at least some detailed information regarding the interesting POIs (such as review information rating the interesting POIs, or URLs associated with the interesting POIs) are pre-cached to the user's mobile device. When pre-caching is implemented, information identifying the interesting POIs is immediately available for display when the user first looks at or activates the user interface of the mobile device. Since the pre-caching of information occurs in the background (i.e., without user involvement), the user is not required to type or otherwise enter information into their mobile device before viewing information that may be relevant to the surrounding area, nor is the user required to wait to view the relevant information. As the user interacts with the mobile device and begins to make selections or enter query refinement criteria, the mobile device may respond to the user's actions by deleting certain pre-cached information from the local cache, by pre-caching other new information to the mobile device, or by adjusting settings to tailor pre-caching behavior (e.g., to pre-cache more or less detailed information relative to other pre-cached information).

Information identifying the POIs may be pre-cached to the mobile device and provided to the user through the user interface. When the location of the mobile device can be determined or estimated, other information may also be provided, such as a distance and a direction from the mobile device to each POI. For each POI, one convenient approach for aggregating and conveying directional information is to provide a graphical directional icon, such as a two-dimensional or three-dimensional arrow icon, which is animated to remain pointed toward a POI regardless of the orientation of the mobile device.

In addition to or instead of merely pointing toward a POI, the directional indication may also indicate a distance to or an accessibility of the POI. For instance, instead of an arrow icon which might indicate that a user should travel in a certain direction to reach a POI, a bull-eye icon might indicate that the user is already nearby a POI, or an "X" icon might indicate that the POI is too far away to attempt to reach, or that the POI is not handicapped accessible.

In addition to indicating relative direction, other contextual information about a POI may be gleaned from the directional icon, based on the type of icon selected for a POI, or based on certain visual characteristics of the icon. For example, the color, shape, motion, or other visual characteristics of an icon may reflect the distance to a POI, may indicate whether the POI is sponsored (i.e., whether the owner of a POI has paid for the certain advertisement content to appear in the search results), or may indicate that a certain event or condition is occurring at the POI. For example, a flashing icon may indicate that a friend of the user is at a certain identified POI.

In one example, the motion of a directional icon may be used to distinguish POIs which are closer to the user's current location than others, or to distinguish POIs which are within a certain predetermined distance. Specifically, the directional icon associated with the closest POI, or the directional icons associated with the POIs located within a predetermined distance, may be animated to bounce or pulsate. Where such motion is used, a single glance at a particular directional icon indicates not only whether the associated POI is close, but also, based on the relative position of the directional icon on the user interface, how interesting the associated POI is relative to the other identified POIs. The user may find it easier and more enjoyable to obtain information about a POI by quickly glancing at its associated icon, rather than by reading textual data which describes this same information, or which provides more detail than is required to make a snap decision.

Because graphical icons are intended to allow a user to quickly obtain information about POIs and to visually filter or distinguish identified POIs based on this information, a unique problem may occur when a large number of POIs are simultaneously displayed on the user interface. Specifically, if multiple directional icons are displayed, the user may suffer from 'information overload' if each directional icon includes several visual characteristics that are each intended to attract or grab the user's attention.

While a single attention-grabbing directional icon among a large number of directional icons may help the user quickly select a POI to visit, if most or all of the directional icons are attention-grabbing, the user would no longer be able to quickly visually filter one POI from another. Accordingly, the selection of attention-grabbing elements or visually stimulating characteristics of a directional icon may be performed discriminatively, to take the user's limited attention into account, and to increase the user's ability to visually filter or distinguish among multiple POIs, especially where each POI may be noteworthy for different reasons.

Moreover, the identification of interesting POIs may be enhanced by boosting the relevance of POIs that have been rated by past visitors of the POI, by local residents of a particular geographic area in which the POI is located, and/or by other past users who have characteristics or preferences similar to those of the user. Since the usefulness of the identification technique is increased when more ratings are available, users should be encouraged to assign more ratings by removing the barriers which typically prevent or discourage potential raters from critiquing a POI that they have visited.

From the perspective of a potential rater, the hassles associated with typing or otherwise entering information which identifies a particular POI to be rated, or which disambiguates a nearby POI that is to be rated from other POIs which are similarly named but that are nowhere near the user, are often sufficiently burdensome to prevent the potential rater from going through the trouble of assigning a rating. For instance, to assign a rating to a particular outlet of a global coffee shop chain in which a potential rater is standing, the potential rater might need to enter the name of the chain, wait, enter the city of the particular outlet, wait, enter the street on which the particular outlet is located, wait, then perhaps disambiguate among multiple outlets associated with the street, including outlets which are nowhere near the user. This problem is exacerbated when the potential rater is not sufficiently knowledgeable of the specific location to the extent that would be necessary to disambiguate among multiple like-named outlets. Removing the burdens associated with manually identifying a particular POI may make potential raters more inclined to rate POIs.

To accomplish this, a rating control may be automatically displayed on the user interface of the mobile device, to allow the user to quickly assign a rating to the POI, as a user's mobile device physically approaches the stored location of a POI, or perhaps as other criterion are satisfied. Since POIs are automatically identified based in part upon their proximity to the user, a user is no longer required to enter identification information for POIs visited by the user. Such an approach encourages users to enter more ratings for more POIs. These ratings may be factored into the scores that are associated with POIs in the various geographic-area-specific databases, rendering low-rated or high-rated POIs less likely or more likely to be considered interesting or relevant, respectively, than other unrated or differently rated POIs.

The enhanced techniques described in this specification may be used to identify POIs that are predicted to be of interest to a user. Some of these approaches identify POIs based on the user's own past behavior, while others base their identifications on the behavior of other users who have searched for or visited a particular POI in the past, and who have similarities with the user. In either case, once a POI is identified, the user's mobile device displays information that may be used to entice the user to travel outside of their present location in order to visit the POI. For example, by displaying helpful navigation information or detailed review, rating, or other contextual information, the user interface may display information that allows the user to decide that a desire or need will be satisfied at the POI, and that the user's time would be well spent by traveling to the POI.

Aside from displaying information regarding POIs that the user is predicted to be interested in, the mobile device may be used to identify a nearby POI that the user is near and can see, and thus has an actual interest in, and to display corresponding contextual information. Thus, in addition to identifying POIs based on the user's own past behavior or on past behavior of other users, the mobile device can also identify POIs based on the user's present behavior (i.e., based on what the user is looking at when a control is selected), and can display detailed information regarding these identified POIs. In this regard, the enhanced identification technique described by this specification may be used in a greater number of situations, facilitating information retrieval regarding POIs that the user may be interested in (when they have not made a specific identification), or regarding POIs that the user is actually interested in or becomes interested in, in real-time or near real-time, as their interest is piqued.

The identification of a nearby POI by a user could possibly be a better indication that the POI is interesting to the user than other techniques which identify POIs based on past behaviors. That being said, however, a user may manually identify a POI as appearing interesting, may be presented with detailed information about that POI, may determine based on reading the detailed information that the POI is not in fact interesting, and then may wish to revert to one or more other techniques to suggest other POIs that may interest them, based on their or others' past behaviors.

To identify a POI that piques their interest, the user may point their mobile device at the POI and press a designated control on the device. This identification may occur when the user walks or drives by a POI that strikes them as being interesting. This specification refers to the designated control that is used for this purpose as a "Pronto button," which may be a physical button, a soft key, or a software element alone. Upon pressing the Pronto button, the GPS location and compass heading of the mobile device are determined, and information regarding one or more of the POIs that are within the field of view of the mobile device is selected and displayed on the user interface.

If the information regarding the POIs is not stored on the mobile device when the Pronto button is pressed, that information may be pre-cached to the mobile device. Where pointing the mobile device means pointing a camera of the mobile device at the POI, the user interface of the mobile device may display a live video feed or image taken at the time the Pronto button is selected, and detailed information about the POI may be overlaid on the screen.

In general, another innovative aspect of the subject matter described in this specification may be implemented in methods that include the actions of generating a first search engine results page which includes links to one or more POIs that satisfy a query, receiving one or more signals indicating that a link to a particular POI was selected by a user, and responding to receiving the one or more signals by selecting one or more geographic areas. For each of the selected geographic areas, an increment value and a score associated with the particular POI are determined, the score is incremented by the increment value, and the incremented score is stored in association with information identifying the particular POI, in one or more databases. The incremented scores stored in the one or more databases are used to generate a second search engine results page. Other implementations of this aspect include corresponding systems, apparatus, and computer programs, configured to perform the actions of the methods, encoded on computer storage devices.

These and other implementations may each optionally include one or more of the following features. For instance, the one or more databases may include a query database, the query may include a query term entered by the user, and the first search engine results page may include one or more links to the POIs which satisfy the query, overlaid on a map. Selecting the one or more geographic areas may further include determining that the one or more geographic areas are disposed at or near a center of the map. The score may be associated with a query-result pair including the query term and the particular POI, the incremented score for each of the selected geographic areas may be stored in association with the query-result pair in the query database, and the incremented scores stored in the query database may be used to generate the second search engine results page. The actions may include determining a scale of the map, and determining the increment value may further include selecting a value of zero as the increment value when the scale is determined not to exceed a predetermined threshold. The actions may also include providing a search engine query page which includes a pre-query map, and a query field for the user to enter the query terms, where the first search engine results page further includes one or more links to the POIs which satisfy the query, overlaid on a post-query map.

In other implementations, the actions may include determining a geographic location of the particular POI. The one or more databases may include a POI database. The first search engine results page may include one or more links to the POIs which satisfy the query, presented in a list of search results or overlaid on a map. Selecting the one or more geographic areas may further include determining that the one or more geographic areas are at or near the geographic location of the particular POI. The incremented score for each of the selected geographic areas may be stored in association with the particular POI, in the POI database, and the incremented scores stored in the POI database may be used to generate the second search engine results page. Determining the geographic location of the particular POI may further include determining geographic coordinates of the particular POI based on accessing a location database which stores information identifying POIs, and geographic coordinates associated with each identified POI.

In other implementations, using the incremented scores stored in the one or more databases to generate a second search engine results page may further include identifying candidate POIs stored for a target geographic area in the one or more databases, determining the score associated with each candidate POI, and selecting, as relevant POIs, the candidate POIs whose associated scores satisfy a threshold, where the second search engine results page may include links to the relevant POIs. The signal may further indicate a duration between an initial click on the link by the user, and a subsequent click by the user, and determining the increment value may include selecting, as the increment value, a value which is proportional to the duration.

In other implementations, the signal further may indicate a click-through-rate of the link, and determining the increment value may include selecting, as the increment value, a value which is proportional to the click-through-rate. Determining the increment value may include selecting a first increment value for a first selected geographic area, and selecting a second, lesser increment value for the selected geographic areas which surround the first geographic area. Determining the second increment value may further include applying a Gaussian function or a parabolic function to the first increment value.

In other implementations, the actions may also include determining that information identifying the particular POI is stored in the one or more databases for more than a predetermined quantity of the geographic areas. For each of the geographic areas in which the information identifying the particular POI is stored, a decrement value may be determined, the score may be decremented by the decrement value, and the decremented score may be stored in association with the information, in the one or more databases.

In other implementations, the actions may also include identifying a selected category associated with the link, and for the particular POI, incrementing a category score of the selected category by a predetermined value and storing, for the particular POI, the incremented category score in association with the selected category in a category database which stores information identifying the POIs, candidate categories associated with the particular POI, and category scores associated with the candidate categories. The actions may further include selecting, for the particular POI, a predominant category having a highest category score, and storing, for each of the selected geographic areas, the predominant category in association with the information identifying the particular POI, in the one or more databases. Multiple, contiguous geographic areas may be defined within a geographic region, with each exhibiting a uniform size and shape. First and second signals that indicate that the link to the particular POI was selected by the user at a first time and a second time, respectively, may be received, and the second signal may be filtered. The increment value may be normalized into a range between 0 to 1, inclusive.

In general, another innovative aspect of the subject matter described in this specification may be implemented in methods that include the actions of identifying POIs associated with one or more of multiple, selected geographic areas, and determining, for each of the multiple geographic areas, a score associated with the identified POIs. The actions also include generating a combined score for each identified POI based on the determined scores associated with the respective POI, selecting a subset of the identified POIs based at least on the combined scores, and displaying a link to the POIs in the subset. Other implementations of this aspect include corresponding systems, apparatus, and computer programs, configured to perform the actions of the methods, encoded on computer storage devices.

These and other embodiments may each optionally include one or more of the following features. For instance, the actions may also include determining a location of a mobile device, selecting the multiple geographic areas based on the determined location, and receiving, by the mobile device, one or more databases which store the score associated with the identified POIs, for each of the multiple geographic areas. The actions may also include selecting a first geographic area in which the mobile device is located, and selecting a second geographic area adjacent to the first geographic area. Selecting the multiple geographic areas may further include identifying multiple geographic areas which are assigned a non-zero value by a fall-off function.

In other implementations, the actions may include determining an expected destination of the mobile device, and selecting the multiple geographic areas based on the expected destination, or receiving a query refinement, and performing a search query using the query refinement to identify the POIs that are associated with the one or more of the multiple, selected geographic areas, and that that satisfy the query refinement. Performing the search query may further include performing a prefix search using the query refinement. The query refinement may restrict the search query to one or more POI categories. Generating the combined score may further include applying a fall-off function to the scores associated with the identified POIs for each of the multiple geographic areas. The actions may include determining a speed of a mobile device, and selecting the fall-off function based on the determined speed.

In other implementations, the fall-off function may be a Gaussian or parabolic function. The actions may include determining a speed of a mobile device, determining whether the speed of the mobile device exceeds a predetermined threshold, selecting a first quantity of geographic areas when the speed of the mobile device exceeds a predetermined threshold, and selecting a second, lesser quantity of geographic areas when the speed of the mobile device does not exceed the predetermined threshold. Generating the combined score for each identified POI may further include summing the determined scores associated with each identified POI.

In other implementations, the actions may also include, for one or more categories each associated with one or more of the identified POIs, generating a combined category score, selecting a subset of the categories based on the combined category scores, displaying a link identifying the categories in the subset, and receiving a signal indicating that a user has selected one of the categories in the subset, where the subset of the identified POIs is selected further based on the user-selected category. The actions may also include detecting a direction of travel of a mobile device; and selecting the multiple geographic areas based on the detected direction of travel.

In general, another innovative aspect of the subject matter described in this specification may be implemented in methods that include the actions of receiving a query term from a user and identifying query term/POI pairs associated with one or more of multiple, selected geographic areas, the query term/POI pair including the received query term. For each of the multiple geographic areas, a score associated with the identified query term/POI pairs may be determined. A combined score for each identified query term/POI pair may be generated based on the collective scores associated with the respective query term/POI pair in the multiple geographic areas, a subset of the identified POIs may be selected based at least on the combined scores, and a link to the POIs associated with the identified POIs in the subset may be displayed. Other implementations of this aspect include corresponding systems, apparatus, and computer programs, configured to perform the actions of the methods, encoded on computer storage devices.

In general, another innovative aspect of the subject matter described in this specification may be implemented in methods that include the actions of accessing, by a mobile device, two or more search results, each of the search results identifying a respective point-of-interest (POI), and determining a distance between the mobile device and each POI. The actions may also include selecting a directional icon for each POI based on the distance to the respective POI, and displaying, by the mobile device, information identifying the POIs and, for each POI, the directional icon selected for the respective POI. Other implementations of this aspect include corresponding systems, apparatus, and computer programs, configured to perform the actions of the methods, encoded on computer storage devices.

These and other implementations may each optionally include one or more of the following features. For instance, the actions may also include selecting a first type of directional icon for a first subset of the POIs, and selecting one or more different types of directional icons for a second subset of the POIs. The first type of directional icon may be a quickly bouncing icon, a quickly pulsating icon, a color icon, a high contrast icon, a long-tailed arrow icon, or a large size directional icon. The different types of directional icons may include a static icon, a slowly bouncing icon, a slowly pulsating icon, a black-and-white or grayscale icon, a short-tailed arrow icon, or a small size directional icon.

In other implementations, the first subset may include n POIs which are closest to the mobile device, with n being any positive integer, and the second subset may include m POIs which are not members of the first subset, with m being any positive integer. Alternatively, the first subset may include n POIs which are within a predetermined distance of the mobile device, and the second subset may include m POIs which are not within the predetermined distance of the mobile device. Alternatively, the first subset may include n POIs which are sponsored, and the second subset may include m POIs which are not sponsored. The actions may also include receiving a signal which identifies one or more of the POIs, where the first subset may include the one or more POIs identified by the signal, and the second subset may include the POIs which are not identified by the signal.

In other implementations, the actions may also include detecting that an orientation of the mobile device has changed, where selecting the directional icon for each POI further includes selecting different types of arrow-shaped directional icons for first and second POIs, and displaying the information further includes animating the different types of arrow-shaped directional icons to remain pointed toward the associated POIs despite the change in the orientation of the mobile device. Determining the distance between the mobile device and each POI may further include determining the distance between the mobile device and a first POI at a first time and at a second time, and selecting the directional icon may further include selecting first and second bouncing arrow-shaped directional icons at the first and second times, respectively. The second arrow-shaped directional icon may be animated to bounce at a faster rate or a slower rate than the first arrow-shaped directional icon, when the distance between the mobile device and the first POI decreases or increases, respectively, between the first time and the second time.

In other implementations, determining the distance between the mobile device and each POI may further include determining the distance between the mobile device and a particular POI at a first time and at a second time, and selecting the directional icon for each POI based on the distance to the respective POI may further include selecting a first type of directional icon for the particular POI at the first time, with the first type of directional icon bouncing or pulsating at a first rate, exhibiting a first color or contrast characteristic, having a first arrow tail length, or having a first size characteristic. When the distance between the mobile device and the particular POI increases between the first time and the second time, the actions include selecting a second type of directional icon for the particular POI at the second time, with the second type of directional icon bouncing or pulsating slower than the first rate, exhibiting a diminished color or contrast characteristic relative to the first characteristic, having a second arrow tail length which is longer than the first arrow tail length, or having a second size characteristic which is smaller than the first size characteristic. When the distance between the mobile device and the particular POI decreases between the first time and the second time, the actions include selecting a third type of directional icon for the particular POI at the second time, with the third type of directional icon bouncing or pulsating faster than the first rate, exhibiting an increased color or contrast characteristic relative to the first characteristic, having a second arrow tail length which is shorter than the first arrow tail length, or having a second size characteristic which is larger than the first size characteristic.

In other implementations, determining the distance between the mobile device and each POI may further include determining the distance between the mobile device and a particular POI at a first time and at a second time. Selecting the directional icon for each POI based on the distance to the respective POI may further include selecting a first type of directional icon for the particular POI at the first time, the first type of directional icon being a slowly bouncing, slowly pulsating, black-and-white or grayscale, short-tailed arrow, or small size directional icon, and, when the distance between the mobile device and the particular POI decreases between the first time and the second time, selecting a second type of directional icon for the particular POI at the second time, the second type of directional icon being a quickly bouncing, quickly pulsating, color, high contrast, long-tailed arrow, or large size directional icon.

In other implementations, each of the search results may identify a POI which is near the mobile device. The directional icon may be selected from among multiple directional icons. Selecting the directional icon for each POI may further include selecting a bouncing arrow-shaped directional icon for a first POI, and a static arrow-shaped directional icon for a second POI. The actions may also include accessing sponsored content associated with one or more of the POIs, where displaying the information may further include displaying the sponsored content associated with the one or more POIs. Selecting the directional icon may further include selecting a bulls-eye or star-shaped directional icon for a first POI when the distance between the mobile device and the first POI is less than a predetermined distance. The actions may also include receiving a signal specifying a location of the mobile device, where the two or more search results are generated based on the location of the mobile device.

In general, another innovative aspect of the subject matter described in this specification may be implemented in methods that include the actions of generating, by a search engine, two or more search results, each of the search results identifying a respective POI, determining a distance between a mobile device and each POI, and selecting a directional icon for each POI based on the distance to the respective POI. The actions may also include generating code which, when invoked by the mobile device, causes the mobile device to display information identifying the POIs and, for each POI, the directional icon selected for the respective POI, and transmitting the code from the search engine to the mobile device. Other implementations of this aspect include corresponding systems, apparatus, and computer programs, configured to perform the actions of the methods, encoded on computer storage devices.

In general, another innovative aspect of the subject matter described in this specification may be implemented in methods that include the actions of determining a location of a mobile device, automatically identifying a POI located within a predetermined distance of the location, providing, on a user interface of the mobile device, a rating control for allowing the user to rate the identified POI, and receiving the rating for the identified POI from the user, using the rating control. Other implementations of this aspect include corresponding systems, apparatus, and computer programs, configured to perform the actions of the methods, encoded on computer storage devices.

These and other implementations may each optionally include one or more of the following features. For instance, the identified POI may be automatically identified and the rating control may be provided without requiring the user to input identification information associated with the identified POI. The actions may also include storing the rating in association with the identified POI, or automatically identifying one or more candidate POIs located within the predetermined distance of the location of the mobile device, and providing information identifying the candidate POIs on the user interface, where the identified POI further includes a user selected one of the candidate POIs.

In other implementations, the actions may also include providing, on the user interface, a disambiguation control for identifying the candidate POIs and for allowing the user to select the one of the candidate POIs, and identifying the user selected one of the candidate POIs using the disambiguation control. The actions may also include determining a category associated with the identified POI, determining a criterion associated with the category, and determining that the criterion associated with the category has been satisfied, where rating control is provided on the user interface based on determining that the criterion has been satisfied. The criterion may be a minimum continuous linger time of the mobile device within the predetermined distance of the POI, a current time-of-day requirement, or a current day-of-the-week requirement. The rating control may be a star rating bar.

In other implementations, the actions may include incrementing or decrementing a score associated with the POI in one or more databases associated with a geographic area based on the rating, or clustering the user with other users of a search engine, based on a similarity of the rating with the ratings for the POI collectively received from the other users. The actions may include identifying a recommended POI that the other users rated highly, and providing information identifying the second POI on the user interface, or, responsive to automatically identifying the POI, providing, on the user interface, a rating interest control for allowing the user to indicate whether they are interested in rating the identified POI. Upon detecting a user interaction with the rating interest control, and determining that the user has indicated that they are interested in rating the identified POI, based on the user interaction, the rating control may be provided on the user interface based on determining that the user has indicated that they are interested in rating the identified POI.

In other implementations, the actions may include, responsive to receiving the rating, providing a text entry field on the user interface for allowing the user to input comments regarding the identified POI. Automatically identifying the POI may further include defining a zone of interest within the predetermined distance from the location, determining geographic coordinates associated with the zone of interest, and querying a POI directory using the geographic coordinates associated with the zone of interest, the POI directory storing POIs and geographic coordinates associated with the POIs.

In general, another innovative aspect of the subject matter described in this specification may be implemented in methods that include the actions of determining a position and a heading of a mobile device, defining a zone of interest based on the position and heading of the mobile device, identifying one or more points of interest (POIs) that are located within the zone of interest, determining, for each of the identified POIs, a distance between the mobile device and the respective POI, selecting one or more of the identified POIs based on the distances, and displaying information identifying the selected POIs on a user interface of the mobile device. Other implementations of this aspect include corresponding systems, apparatus, and computer programs, configured to perform the actions of the methods, encoded on computer storage devices.

These and other implementations may each optionally include one or more of the following features. For instance, the actions may also include determining, for each of the identified POIs, an angle between the mobile device and the respective POI, where the one or more of the identified POIs are selected further based on the determined angles. Selecting the one or more of the identified POIs may further include scaling, for each of the identified POIs, the distance between the mobile device and the respective POI based on the angle, where the one or more of the identified POIs are selected based on the scaled distances. Scaling the distance between the mobile device and the respective POI based on the angle may further include increasing the scaled distance as a magnitude of the angle increases. Selecting the one or more of the identified POIs may further include scaling, for each of the identified POIs, the distance between the mobile device and the respective POI based on a combination of the angle and the determined distance, where the one or more of the identified POIs are selected based on the scaled distances.

In other implementations, the zone of interest may be defined based on a field of view of a camera of the mobile device. Selecting one or more of the identified POIs may further include selecting the one or more identified POIs which are closest to the mobile device. The zone of interest may represent a two-dimensional area or a three-dimensional volume, or may include a triangle or a circular sector, with one vertex of the zone of interest occurring at the position of the mobile device. The triangle or circular sector may extend 60° around the heading of the mobile device, and the height or radius of the triangle or circular sector, respectively, may extend one quarter of a mile. The actions may also include determining a speed of the mobile device, and selecting the height or radius of the triangle or circular sector, respectively, based on the determined speed of the mobile device.

In other implementations, the actions may also include displaying one or more user reviews or ratings for the selected POIs on the user interface of the mobile device. Identifying the one or more POIs may further include identifying coordinates which define the zone of interest, and querying a database that stores POIs and coordinates associated with each POI, using the coordinates which define the zone of interest. The actions may include pre-caching information associated with the selected POIs to the mobile-device, responsive to selecting the one or more of the identified POIs, or the actions may include generating an image using a camera on the mobile device, where displaying the information further comprises overlaying the information over the image.

In other implementations, the actions may include determining that no POIs are located within the zone of interest, and redefining the zone of interest based on determining that no POIs are located within the zone of interest, where identifying the one or more POIs that are located within the zone of interest may further include identifying the one or more POIs that are located within the redefined zone of interest. Determining the heading of the mobile device may further include detecting a compass heading using a compass on the mobile device, determining a path of the mobile device using a global positioning system (GPS) module on the mobile device, or determining a compass heading toward which a camera of the mobile device is pointing.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIGS. 4 to 6, 8, 12A to 12C, 14A to 14G, 16, 20, 21, and 26 illustrate example user interfaces.

Figure 11:
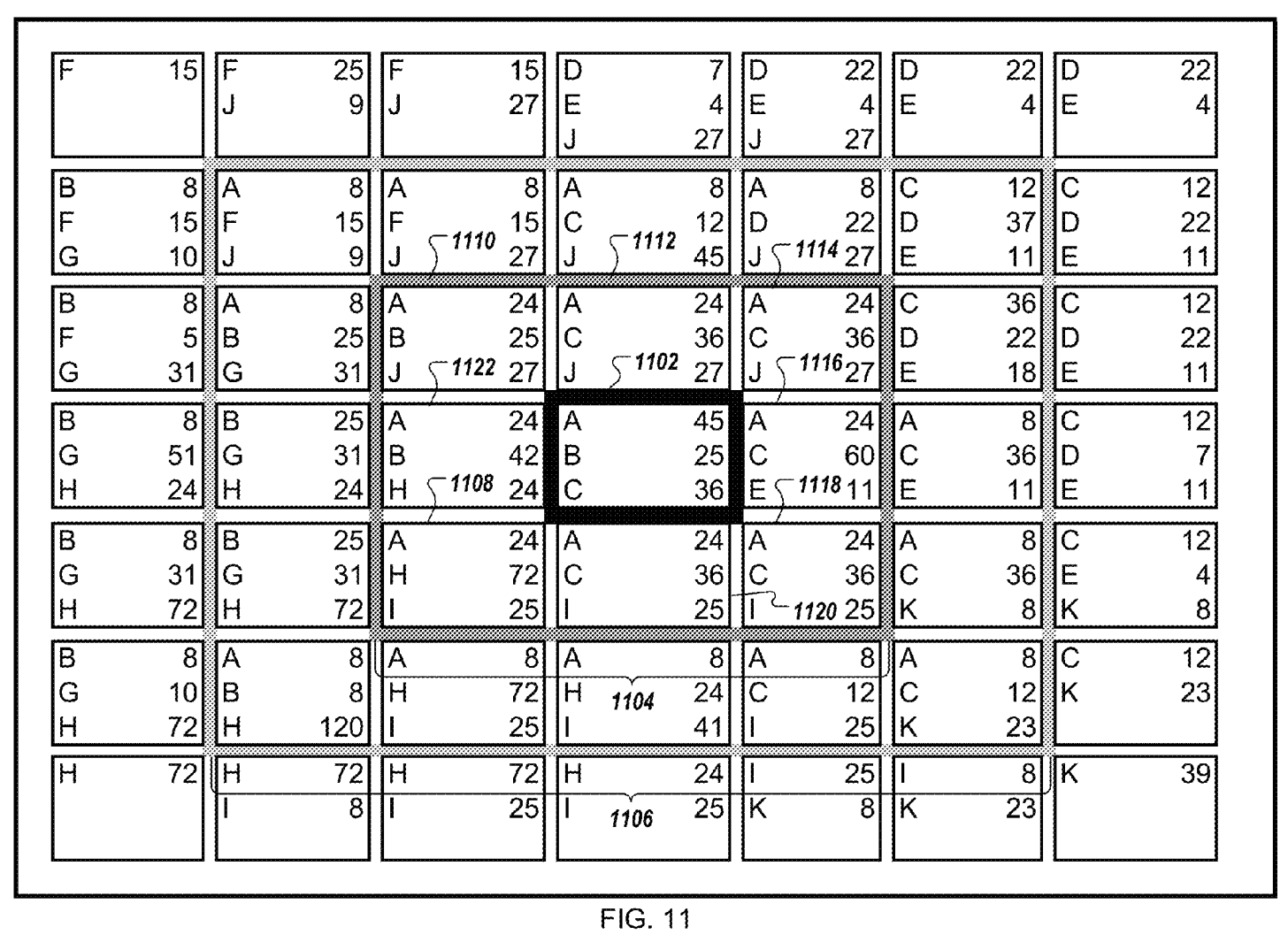

FIG. 11 illustrates score calculation for POIs.

FIGS. 19 and 23 to 25 illustrate identifying a POI within a zone of interest.

Like reference numbers represent corresponding parts throughout.

DETAILED DESCRIPTION

Figure 1:
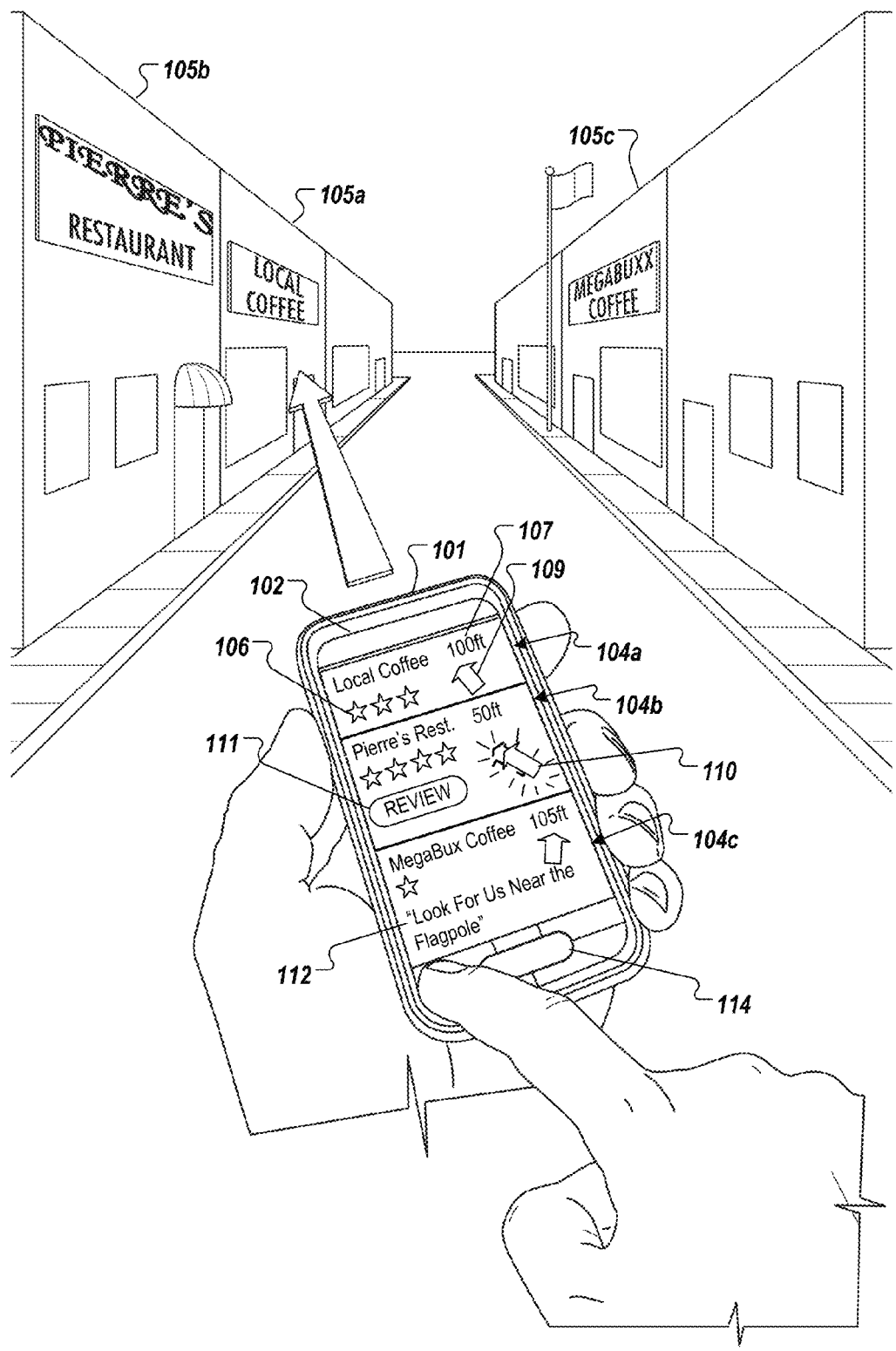
FIG. 1 is a contextual diagram demonstrating the identification of interesting POIs using an example of a mobile device.

FIG. 1 illustrates an example overview of the results of identifying interesting POIs using a mobile device 101, as shown from the perspective of a user who has entered an unfamiliar geographic area. Specifically, an application executing on the mobile device 101 generates a user interface 102 which displays information identifying nearby interesting POIs. The POIs are identified as being interesting based on information stored in one or more databases associated with the geographic area, and/or one or more surrounding areas.

The user interface 102 displays entries 104a to 104c, which provide information identifying nearby POIs that are considered interesting, and that are associated with the user-selected category "Coffee." The interesting POIs include "Local Coffee" (associated with entry 104a), "Pierre's Restaurant" (associated with entry 104b), and "Megabuxx Coffee" (associated with entry 104c). In this example, the entries 104a to 104c are displayed in a specific order, ranked from most interesting to least interesting based on aggregated scores associated with each POI. "Local Coffee," the POI with the highest score among the three identified POIs, is considered to be more interesting than "Megabuxx Coffee," since the associated entry 104a is positioned at the top of the user interface 102.

In addition to information identifying a corresponding POI, each of entries 104a to 104c may include a past-user rating 106 of the corresponding POI (e.g., obtained from a rating application or database), a distance indicator 107 which specifies the distance between the mobile device and the corresponding POI (e.g., expressed in feet, meters, kilometers or miles, or in units of time when the speed of the mobile device 101 is known or may be estimated), a directional icon (e.g., as static arrow icon 109 or bouncing arrow icon 110) which points toward the corresponding POI, a review control 111 which allows the user to rate the POI without typing in the name of the POI, POI-provided information 112, advertising information, and/or other contextual information.

The type and arrangement of elements on the user interface 102 are selected to allow the user to quickly visually filter among a large amount of information that may be presented on the display. For instance, information associated with more interesting POIs may be displayed at the top, the bottom, the center, the right or the left of the user interface 102, allowing the user to look at this portion of the display first when they are scanning for interesting POIs. Font or icon characteristics, color and/or motion may also be used to highlight certain information, allowing the user to quickly identify data that may be useful at a particular moment.

For example, by glancing at the POI entry 104a associated with "Local Coffee," the user can quickly determine that "Local Coffee" is considered to be the most interesting POI in the area for a particular category of POIs (e.g. coffee shops), that previous reviewers of the POI have given it a "three out of four star" rating, and that it is located one hundred feet approximately straight ahead, relative to the current position and heading of the mobile device 101.

Similarly, by glancing at the POI entry 104b, the user can quickly determine that "Pierre's Restaurant" is considered to be less interesting than the "Local Coffee" (but more interesting than other POIs), that previous reviewers of the POI have given it a "four out of four star" rating, and that it is located fifty feet ahead and to the left relative to the current position and heading of the mobile device 101. Arrow icon 110 is animated to appear to bounce or vibrate, alerting the user that the POI is nearby (i.e., within a predetermined distance), or is the closest of the identified POIs. In this regard, when the user first looks at the user interface 102, the bouncing arrow icon 110 may grab the user's attention, even though the POI is considered to be less interesting than other POIs. Depending upon their own preferences and circumstances, the user may use this information to decide to visit a closer, less interesting POI instead of a further, more interesting POI.

Glancing at the POI entry 104c, the user can quickly determine that "Megabuxx" is considered less interesting than the other two displayed POIs, that previous reviewers of the POI have given it a "one out of four star" rating, and that the POI is located one hundred and five feet ahead and to the right relative to the current position and heading of the mobile device 101. In addition to the contextual information provided in the POI entries 104a and 104b, the POI entry 104c includes sponsored information 112 provided by the owner of the POI, which may include advertising or other sponsored content. In this instance, the sponsored information ("Look For Us Near the Flagpole") identifies a local landmark that the owner of the POI may use to steer customers to their business.

Although in this illustrated example the sponsored information is textual, in other examples this information may include image or video content. Furthermore, although the user interface 102 is illustrated as including three POI entries, in other implementations fewer or more entries may be shown, where the number of entries shown may depend upon the number of nearby POIs that are identified as interesting. The user interface 102 may also display entries for POIs that are located behind or to the side of the user or mobile device. The directional icons (e.g. arrow icon 109 and bouncing arrow icon 110) may, as illustrated, be animated to rotate within a single plane, to thereby point to their associated POI in two dimensions, or they may be animated to appear to rotate inside of a three-dimensional cube or sphere, to thereby point to their associated POI in three dimensions as the user rolls, tilts, or otherwise reorients the mobile device 101.

The mobile device 101 includes hardware, such as a GPS receiver, a camera, an accelerometer or a compass, which is used to determine the current position and heading of the mobile device 101. As the position or heading changes, the directional icons associated with each entry (including the static, non-bouncing directional icons) are animated to remain pointed toward the corresponding POI. For example, if the user rotates the mobile device 101 toward "Megabuxx," the static arrow icon 109 would be animated to point ahead and to the left, instead of straight ahead as illustrated.

In a further example, if the mobile device 101 moves to the rear, linearly away from "Pierre's Restaurant," the speed of the bouncing arrow icon 110 may increase or decrease, although the bouncing arrow icon 110 would remain pointed at the POI regardless of the orientation of the mobile device 101. When the mobile device 101 moves farther than a predetermined distance away from the POI, or when a different POI becomes closer to the mobile device than the POI, however, the bouncing arrow icon 110 might change to a static arrow icon or other icon. The directional icons may appear to bounce, shake, pulsate, change color or contrast, vibrate or otherwise move at different speeds, depending on the distance between the mobile device 101 and the POI toward which that icon is pointing. For example, the bouncing arrow icon 110 may bounce at a faster speed when the mobile device 101 draws closer to "Pierre's Restaurant."

In addition to or instead of using directional icons, other types of icons may be used to visually convey distance or directional information to the user. For instance, a "smiley face" icon or a bull's-eye icon may be selected and employed instead of using the bouncing arrow icon 110 to indicate that a POI is nearby. Different symbols can be used to indicate whether the POI is handicapped accessible or not. Alternatively, the user interface 102 may display an airplane icon to point to a POI that is a great distance away or is inaccessible by car, a boat icon to point to a POI that is located disposed across water, a car icon to point to a POI that is driving distance away (e.g. greater than one mile, either as the crow flies, or as routed along streets), or a walking man icon to point to a POI that is located within walking distance (e.g. less than two miles, or less than a quarter of a mile). In addition to or instead of using visual icons, the mobile device 101 may provide distance or directional information to the user by playing a sound, vibrating, or by using a text-to-speech (TTS) module to speak pertinent information.

If the mobile device 101 is within a threshold distance of a POI, the information displayed in a corresponding POI entry may change to include fewer, more, or different directional icons, or to include fewer, more, or different items of textual, graphical, or video information. The threshold distance may be, for example, twenty or fifty feet if the device 101 is traveling at walking speeds, or a quarter of a mile or a half of a kilometer if the device 101 is traveling at driving speeds. The threshold distance may depend on the heading of the mobile device 101, for instance setting a threshold distance of one hundred feet for POIs in front of the device, and five hundred feet for POIs to the rear of the device.

The display of the review control 111 or the POI-provided information 112 may occur as a result of the mobile device 101 moving to within a close proximity of the POIs, or as a result of the mobile device 101 remaining within the close proximity, continuously or non-continuously, for more than a predetermined amount of time. For example, if the user remains at a known location of a restaurant for longer than thirty minutes during a typical meal time, an assumption can be made that the user has eaten at the restaurant, and the mobile device 101 may automatically display a meal rating control to allow the user to quickly rate the restaurant, without requiring the user to type in the name of the restaurant or identify what type of service was rendered by the restaurant. Prior to displaying the meal rating control, the user interface 102 may also include a control which allows the user to disambiguate between two or more POIs that the user may want to rate.

While pointing the mobile device 101 at a POI, the user may select a button 114 to obtain detailed information regarding that POI. The button 114 may be a physical button, a soft button displayed on a touch screen display, or any other hardware or software control. The detailed information may include other information about the POI, including contact information, discount offers as provided by the operator of the POI or by third parties, or more detailed rating information, such as the typed comments of one or more past reviewers of the POI.

When displaying the detailed information, the user interface 102 may also include a control which allows the user to disambiguate between two or more POIs that the mobile device 101 might be pointed toward. For instance, when the mobile device 101 is oriented as shown in FIG. 1, the user interface 102 may display detailed information regarding "Local Coffee," as well as a disambiguation control labeled "Did you intend to select 'Pierre's Restaurant'?" The use of a disambiguation control is particularly useful at shopping centers where, in official legal or governmental records, multiple businesses may officially share a single address or set of GPS coordinates, or where the mailing address of multiple businesses is differentiated by unit, store, or box numbers which have no practical correlation to geography.

Figure 2:
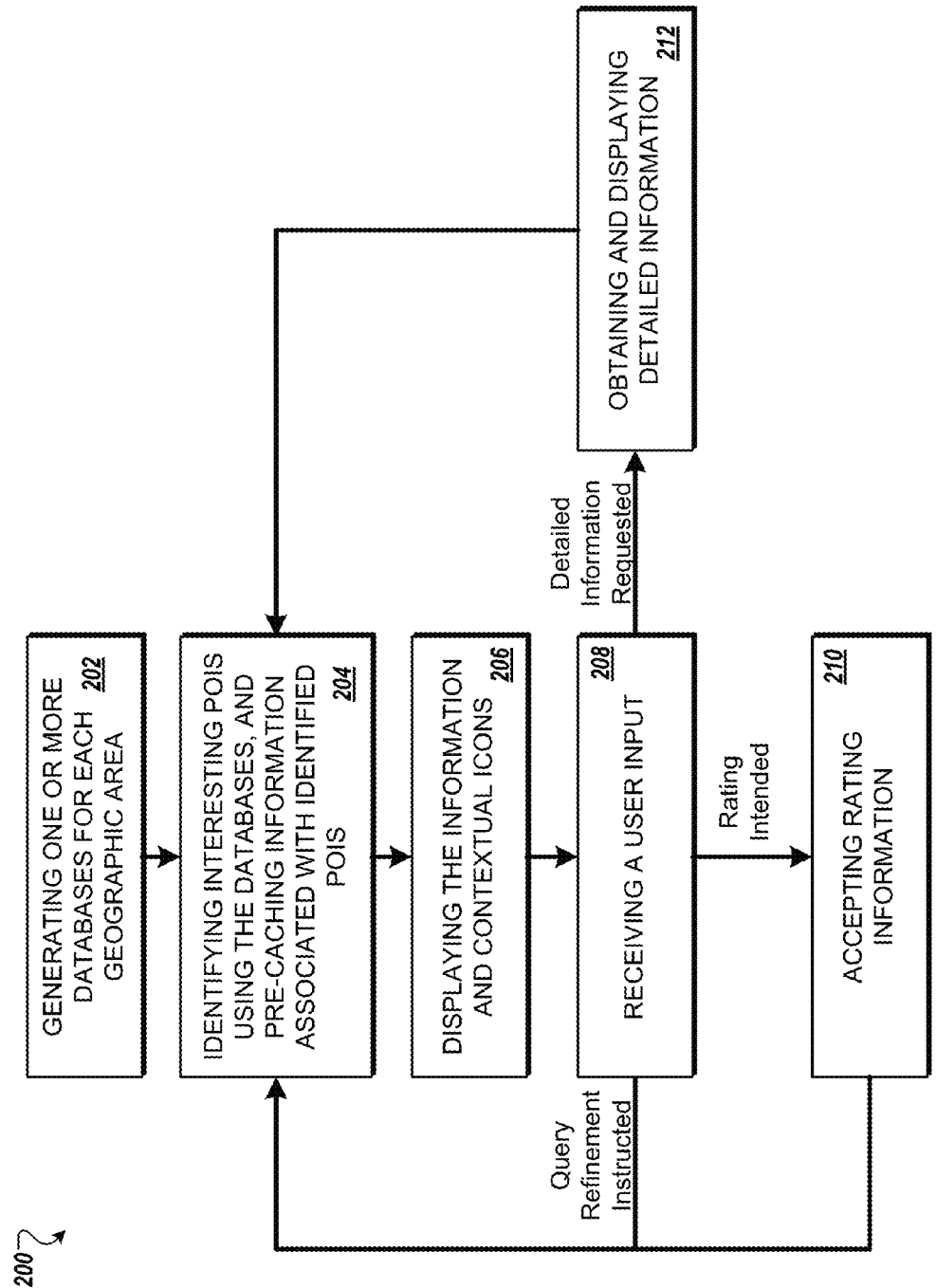
FIGS. 2, 7, 9, 13, 17, 18 and 22 illustrate example processes.

FIG. 2 is a flowchart illustrating the relationship between a number of actions which, when performed, provide for the enhanced technique for identifying interesting POIs as depicted in FIG. 1. Briefly, the actions include generating one or more databases for each geographic area (202), identifying interesting POIs using the databases and pre-caching associated information (204), displaying the information and directional icons (206), receiving user input (208), accepting rating information (210), and obtaining and displaying detailed information (212).

In general, the action of generating one or more databases for each geographic area (202) is illustrated in FIGS. 4 through 8; the action of identifying interesting POIs using the databases and pre-caching associated information (204) is illustrated in FIGS. 9 through 12; the action of displaying the information and directional icons (206) is illustrated in FIGS. 13 through 17; the action of receiving a user input (208) and accepting rating information (210) is illustrated in FIGS. 18 to 21; and the action of receiving a user input (208) and obtaining and displaying detailed information (212) is illustrated in FIGS. 22 to 26. FIGS. 1 to 3 and 27 relate to all of these actions.

Figure 3:
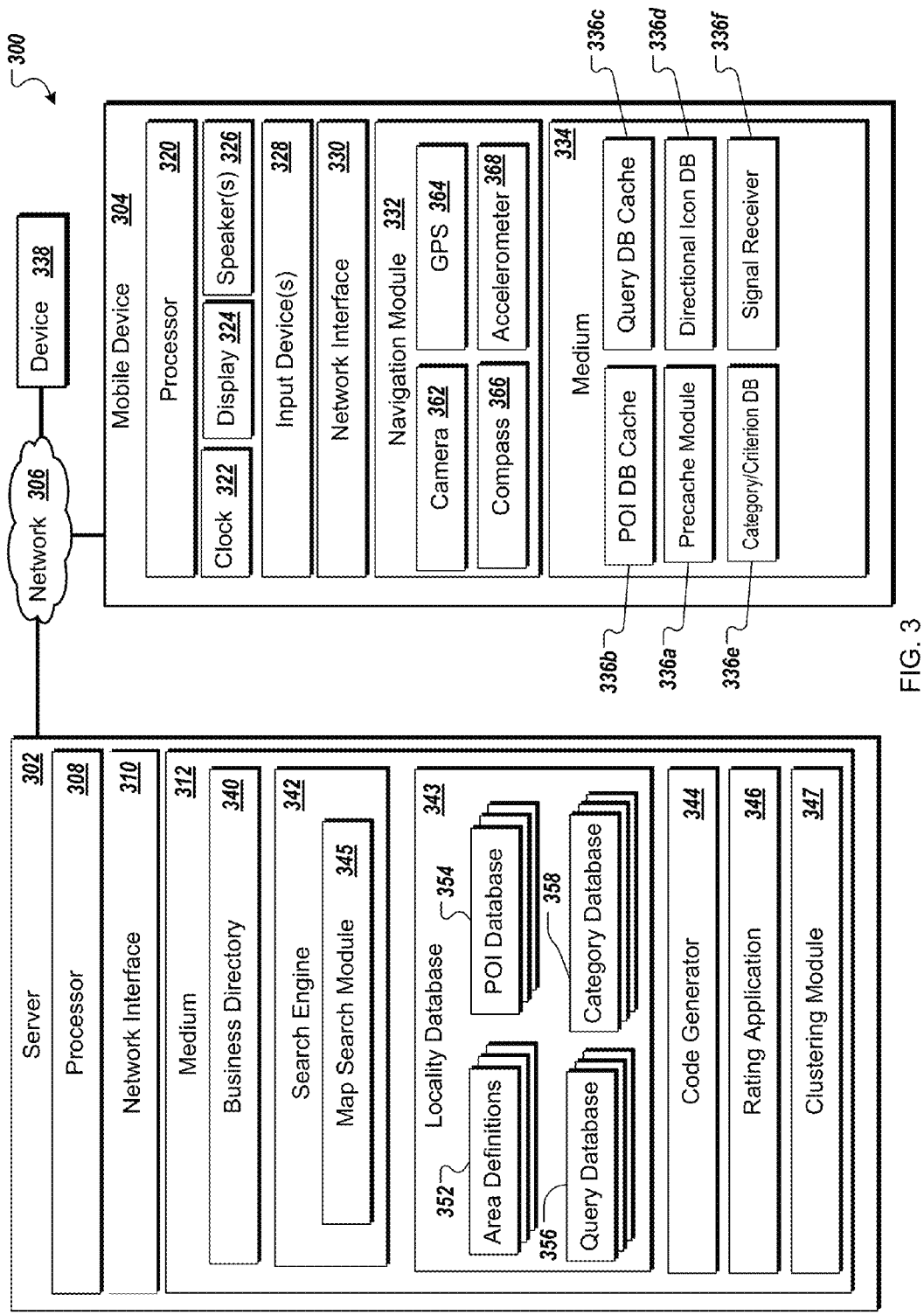
FIG. 3 illustrates a example of a system for identifying interesting POIs.

FIG. 3 illustrates a system 300 that may be used for identifying interesting POIs. The system 300 includes a server 302 connected to a mobile device 304 over a network 306. The server 302 includes one or more processors 308, network interfaces 310, and media 312. The mobile device 304 may be a mobile phone, a laptop computer, a PDA (Personal Digital Assistant), a smart phone, a Blackberry™ or another handheld or mobile device. The mobile device 304 includes one or more processors 320, a clock 322, a display 324, one or more speakers 326, one or more input devices 328, a network interface 330, a navigation module 332, and a medium 334. In another implementation, the client device 304 is not portable or mobile, but rather is a desktop computer or a server. In a further implementation, some of these structural elements are omitted or combined.

The server 302 may be connected to the network 306 and possibly to one or more other networks over the network interface 310. Similarly, the mobile device 304 may be connected to the network 306 and possibly to one or more other networks over the network interface 330. The network 306 may include, for example, one or more of the Internet, Wide Area Networks (WANs), Local Area Networks (LANs), analog or digital wired and wireless telephone networks (e.g., a PSTN, Integrated Services Digital Network (ISDN), and Digital Subscriber Line (xDSL)), radio, television, cable, satellite, and/or any other delivery or tunneling mechanism for carrying data services. Networks may include multiple networks or subnetworks, each of which may include, for example, a wired or wireless data pathway.

The medium 312 stores and records information or data, and may be an optical storage medium, magnetic storage medium, flash memory, or any other storage medium type. The medium 312 includes a business directory 340, a search engine 342, a locality database 343, a code generator 344, a rating application 346, and a clustering module 347. The search engine 342 includes a map search module 345. The business directory 340 stores information identifying POIs and geographic coordinates associated with each identified POI, as well as disambiguation information where multiple business share a same address. The code generator 344 generates code (e.g., HyperText Markup Language (HTML) code) that, when processed by a code reader (e.g., a web browser) on the mobile device 304, causes information to be displayed on the display 324. The map search module 344 identifies POIs matching a query search term. The medium 312 may include other information, such as POI ratings, and a user grouping application.

The locality database 343 includes one or more geographic area definitions 352, and different types of databases, including a POI database 354, a query database 356, and a category database 358. Geographic area definitions 352 may include area coordinates, area size, or other information. The POI database 354 may store associations between a geographic area, a POI, and a score. The query database 356 may store associations between a geographic area, a query term/POI pair, and a score. The query database 356 may be a single database including information for each geographic area, or the query database 356 may be a collection of databases, with each database corresponding to a single geographic area.

Similarly, the POI database 354 may be a single database including information for each geographic area, or the POI database 354 may be a collection of databases, with one or more databases corresponding to a single geographic area. The structure and function of the POI database 354 and the query database 356 will be discussed in further detail below, in association with the descriptions of FIGS. 4 to 8.

The medium 312 may also include a rating application 346 which obtains and stores reviews and ratings for POIs, for example by soliciting users to rate POIs that they have visited. Although the ratings or reviews of a particular POI may affect the scores that are used to determine whether the particular POI is considered to be interesting, a highly rated POI is not automatically considered to be highly interesting, and a low rated POI is not automatically considered to be uninteresting. The medium 312 may also include a clustering module 347 for clustering users based on similarity of provided ratings and POI selections.

The medium 334 includes a pre-cache module 336a, a POI database cache 336b, a query database cache 336c, a directional icon database 336d, a category/criterion database 336e, and a signal receiver 336f. The pre-cache module 336a may determine which POI and query databases to cache in the POI database cache 336b and query database cache 336c. The query database cache 336c may include a full or partial query database for the current and surrounding geographic areas. Similarly, the POI database cache 336b may include a full or partial POI database for the current and surrounding geographic areas.

The directional icon database 336d stores directional icons which may be selected for display on to indicate a direction and distance of a respective POI relative to the location of the mobile device 304. The directional icon database 336d may, for instance, store tables which indicate which directional icons should be displayed in association with particular POIs which are identified in search results, or may indicate which visual characteristics of a directional icon should be adjusted for the particular POIs. For each directional icon or visual characteristic, the directional icon database may specify the conditions under which the associated directional icon or visual characteristic should be displayed or altered. The selection of a particular directional icon or visual characteristic may depend upon several factors including travel speed and direction of the mobile device 304, sponsorship status of the associated POI, user preferences, or other factors. For instance, an icon that the user purchased may be selected for display, instead of selecting a default icon.

The signal receiver 336f is configured to receive signals from one or more devices 338 over the network 306 using the network interface 330, and to process those signals. For example, the signal receiver may receive signals from other computing devices, such as automobile computing devices, point-of-sale computing devices, WiFi (Wireless Fidelity) equipment, other mobile devices, or any other type of device. The criterion/category database 336e may store, grouped by POI category, criteria that may need to be satisfied before a rating control used to review a POI of the respective category is provided to a user. The medium 334 may also include other components, such as a local search application, user preferences, a directional icon selection application, and a durable query database.

The display 324 may display video, graphics, images, and text that make up the user interface for the software applications used by the mobile device 304, and the operating system programs used to operate the mobile device 304. Among the possible elements that may be displayed on the display 324 are various indicators (e.g., new mail, active phone call, data transmit/send, signal strength, battery life) and application icons (e.g., web browser, phone application, search application, contacts application, mapping application, email application). In one example implementation, the display 324 is a quarter video graphics array (QVGA) thin film transistor (TFT) liquid crystal display (LCD), capable of 16-bit or better color.

The navigation module 332 includes a camera 362, a GPS (Global Positioning Satellite) receiver 364, a compass 366, and an accelerometer 368. The camera 362 allows the mobile device 304 to capture digital images, and may be a scanner, a digital still camera, a digital video camera, or other digital input device. In one example implementation, the camera 362 is a 3 mega-pixel (MP) or more camera that utilizes a complementary metal-oxide semiconductor (CMOS).

The GPS receiver 364 receives GPS signals in order to determine a current location. The compass 366 determines a direction pointed to by the mobile device 304. The one or more speakers 326 allow the mobile device 304 to convert an electrical signal into sound, such as a voice from another user generated by a telephone application program, or a ring tone generated from a ring tone application program. The accelerometer 368 may, for example, measure tilt, motion, or acceleration of the mobile device 304. The navigation module 332 may include other functionality, such as the ability to determine the location of the mobile device 304 using triangulation techniques based on WiFi signals and/or cellular tower signals.

The processor 308 processes operating system or application program computer instructions for the server 302. Similarly, the processor 320 processes operating system or application program computer instructions for the mobile device 304. The clock 322 may calculate a current time and may be used, for example, for time-based query refinements. The input devices 328 may include, for example, a keyboard and a pointing device. A keyboard may be used for entering text data and user commands into the mobile device 304. A pointing device may be used for pointing, selecting, and adjusting objects displayed on the display 324. A pointing device may be, for example, a joystick, a trackball, a touch-pad, a camera, a voice input device, a touch screen device implemented in combination with the display 320, or any other input device.

While FIG. 3 illustrates on exemplary system for implementing the enhanced POI identification techniques described by this specification, other exemplary systems are possible. For instance, one or more of the functionalities described in association with the server 302, above, may actually be performed by the mobile device 304, and vice versa. Further, at least a portion of one or more of the modules, caches, databases and applications shown as being stored in medium 312 may actually be stored on the medium 334, and vice versa. Similarly, the user interface may be generated and displayed at the mobile device 304 using information received from the server 302. Alternatively, the user interface may be generated at the server 302, where the server 302 transmits code (i.e., HTML code) that, when invoked by the mobile device 304, causes the mobile device 304 to display the user interface.

Figure 4:
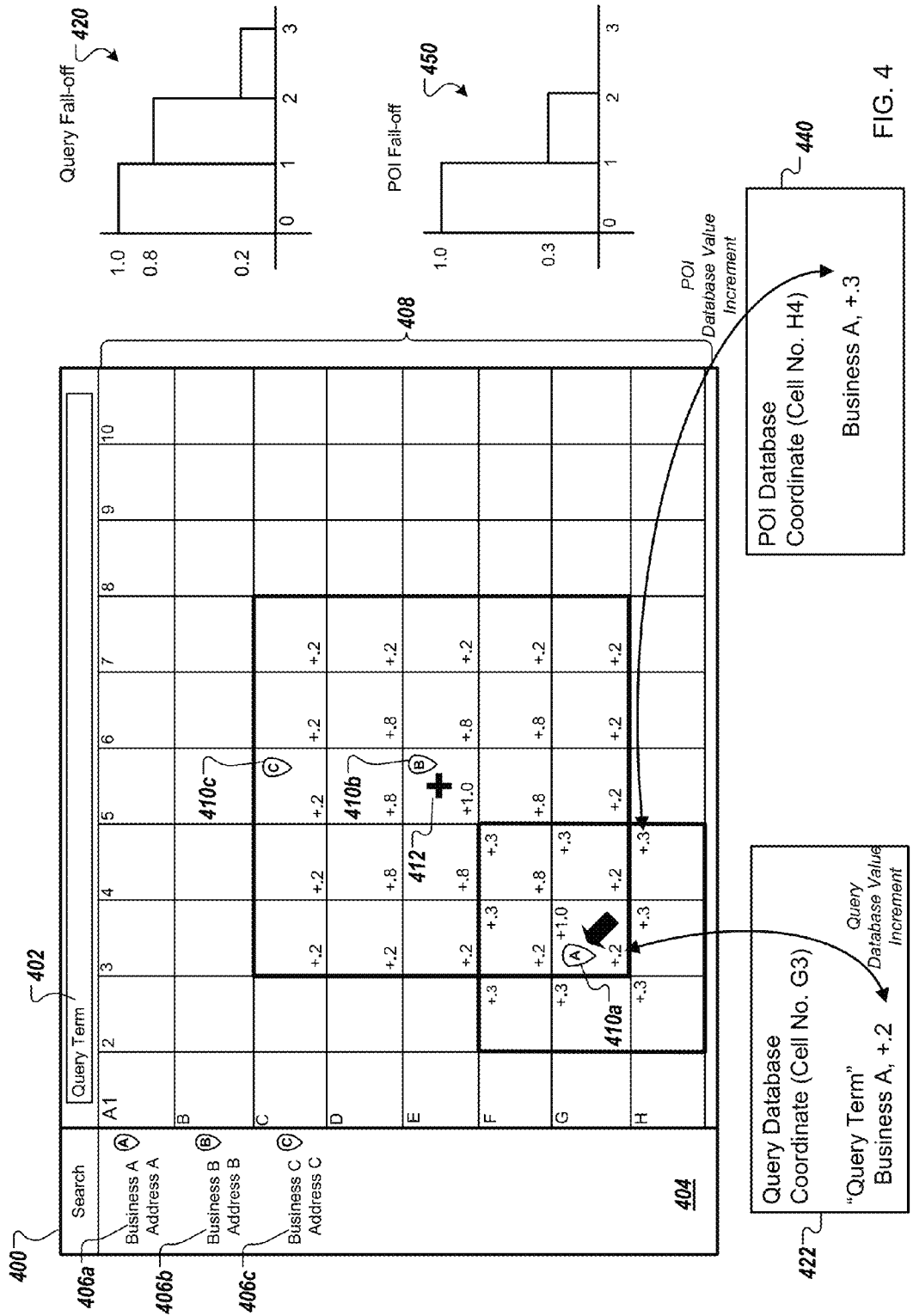

FIGS. 4 through 8 generally illustrate the action of generating one or more databases (or one or more types of databases) for each geographic area (FIG. 2, 202). FIG. 4, for example, depicts the selection of a search result associated with a POI on a map of search results, and illustrates the fall-off effect of the selection on a query database and a POI database.

As noted above, before interesting POIs can be identified, a larger geographic region in which the enhanced technique is used (or is to be effective) is divided into smaller, constituent geographic areas, and one or more databases are generated for each geographic area. Each database scores POIs based upon the frequency and/or nature of the selection of search results associated with each POI by past users. When the databases are generated, POIs having higher scores are generally considered to be more interesting than those with lower scores.

Where the geographic region represents a country or continent, for example, the geographic areas may represent states, provinces, counties, cities, districts, localities, neighborhoods, zones, or other irregularly shaped divisions or districts. Alternatively, a geographic region such as a country, continent, or other land mass may be divided using a grid system to define uniform square-shaped geographic areas, each defining, for example, a quarter-mile or half-mile square geographic area. The geographic areas may be uniformly shaped or dissimilarly shaped, may or may not overlap, and may or may not be contiguous or tessellate. For each area, one or more databases store information identifying POIs and their associated scores, where each score is determined based upon the frequency and/or nature of the selection of search results associated with each POI by past users.

At least two types of databases may be generated and used, either alone or in combination, for the purpose of identifying interesting POIs: a "query database," and a "POI database." The former type, referred to by this specification as the "query database," stores information identifying query term/POI pairs and their associated scores, for each geographic area. In essence, the query database scores the strength of a relationship between a particular query term, a particular POI, and a particular geographic area. The score stored in the query database for a particular query term/POI pair is initially generated or is adjusted when a user executes a search query using the query term, views a search result associated with the particular POI overlaid on a map of search results, and selects the search result associated with the particular POI. The score may also be upwardly or downwardly adjusted on other occasions as well, such as when a user rates the POI, or when a local visitor walks by the POI and indicates that the POI appears interesting.

A single selection of a search result associated with a particular POI on a map of search results may alter the score associated with the query term/POI pair for a plurality of query databases. Specifically, the score associated with the query term/POI pair increases by a larger amount for query databases associated with geographic areas displayed nearer to the center of the map of the search results, while the score associated with the query term/POI pair increases by a smaller amount (or does not change) for query databases associated with geographic areas displayed further from the center of the map of the search results.

The quantity of query databases affected by a single selection may be constant, or it may depend upon a predetermined fall-off function associated with the query databases. For instance, if the fall-off function provides for a gradual diminishment of the score increment as the distance from the center of the map increases, the quantity of query databases affected by a single selection will be large. By contrast, if the fall-off function provides for a sharp or abrupt diminishment of the score increment as the distance from the center of the map increases, the quantity of query databases affected by a single selection may include as few as one, such that only the one query database associated with the single geographic area displayed at the center of the map is affected.

For a particular geographic area and query term/POI pair, the effect of a single selection of the POI is variable, depending at least upon the distance between the geographic area associated with the selected POI, and the center of the map. A small score change (or a lack of change) may indicate that the particular geographic area was far from the center of the map of search results, that the score increment was reduced based on estimating a lack of user satisfaction in the selection or based on detecting a duplicate selection, or that the particular geographic area was not displayed at the center of the map of the search results and the fall-off function provided for a steep diminishment of the score increment.

Conversely, a large score change may indicate that the particular geographic area was at or near the center of the map of search results, that the score increment was increased based upon estimating a high user satisfaction in the selection, or that the particular geographic was not at the displayed at the center of the map of the search results but that the fall-off function provided for a gradual diminishment of the score increment. In selecting the score increment, user satisfaction may be estimated based upon determining a length of a click on a link associated with the search result, by calculating a click-through-rate, by direct solicitation of or input by the user, or through other approaches. The score increment may also be affected by the quality of the associated click, for example the length of the click, the quantity of information about a POI that has been browsed by a user, or other information.

Once data has been collected for multiple users, a high query term/POI pair score reflects that past users who, while looking at a map of a location at or near a particular geographic area, frequently selected the particular POI as a result of a query which was executed using the query term. A high query term/POI pair score thus indicates that a strong correlation exists between the geographic area, the query term, and the search result, suggesting that past users found the search result particularly relevant to that query term and for the geographic area. When a subsequent user enters a similar query term in relation with that geographic location, the query database for that geographic location is used to identify candidate query term/POI pairs for that query term, and the candidate pair or pairs having the highest scores are used to identify POIs which are most interesting.

In one example usage of the query database, a search engine results page (referred to as a "post-query" page) is generated in response to a user entering a query term on a search engine query page (referred to as a "pre-query") page. The pre-query page and the post-query page may both display maps. The post-query, search engine results page includes one or more links to one or more POIs which satisfy the query, and overlays these results on a map. If the user selects a link associated with a particular POI, it is assumed that the user considers the selected POI to have a stronger relationship to the geographic areas located at or near the center of the displayed map than POIs which were not selected, even if the unselected POIs are physically disposed in an area closer to the center of the displayed map.

For each of one or more geographic areas near the center of the map, an increment value is determined. For example, the single geographic area located at the center may have a high associated increment value (e.g., one) and the geographic areas located one area distance away from the center may have a lower associated increment value (e.g., 0.8), where the diminishment in value is dictated by the fall-off function. For the query databases associated with each geographic area, the respective increment value is added to a score associated with the query term/POI pair.

The adjustment of scores may be an iterative process that begins with the databases associated with the center of the map, then iteratively moves outwards to databases associated with surrounding geographic areas that are assigned a non-zero increment value by the fall-off function. When a distance is reached where the fall-off function provides an increment value of zero, the iterative score adjustment process ends for that particular user selection. Different fall-off functions may be applied, depending upon the direction to the center of the map, based upon estimated user satisfaction, or based on other factors.

The latter type of database that may be used by this identification technique, referred to by this specification as the "point-of-interest database" (or "POI database"), stores information identifying POIs and their associated scores for each geographic area, where the scores are determined based in part on the number of times past users have selected a search result associated with the POI. In essence, the POI database scores the strength of a correlation between a selected POI and a particular geographic area.

The selection of the search result associated with the POI may occur by selecting a link to the POI overlaid on a map of search results, or by selecting a link to the POI in a listing of search results. Unlike the approach taken with the query databases, the POI databases to select and the scores to increment are not affected by the distance between a geographic area and a center of a map of search results, but rather by the distance between a geographic area and the geographic location of the selected POI itself. In other words, the scores in the POI database may be incremented even if the users do not view search results on a map.

Similar to the approach taken with the query databases, however, a single selection of a search result associated with a particular POI may alter the score associated with the particular POI in multiple POI databases. Specifically, the score associated with a particular POI may increase by a larger amount for a POI database associated with the geographic area in which the POI is physically located, and may increase by a lesser amount (or may not change) for a POI database associated with surrounding geographic areas.

For a particular geographic area and POI, the selection of the POI may not affect the score associated with the POI, or it may affect the score by a large amount. A small score change (or a lack of change) may indicate that the particular geographic area was far from the geographic location of the POI, that the score increment was reduced based on estimating a lack of user satisfaction in the selection or based on detecting a duplicate selection, or that the selected POI is not physically located in the particular geographic area and a fall-off function provided for a steep or abrupt diminishment of the score increment.

Conversely, a large score change may indicate that the selected POI is physically located in or near the particular geographic area, that the score increment was increased based upon estimating a high user satisfaction in the selection, or that the selected POI is not physically located in the particular geographic area but that the fall-off function provided for a gradual diminishment of the score increment. The fall-off function for the POI database may be the same as the fall-off function or functions used for the query database, or different fall-off functions may be used.

Accordingly, for a particular geographic area, a high score reflects that a POI in or near that geographic area was frequently selected as a result of search queries executed by other users, suggesting that past users found that POI interesting for that geographic area. When a geographic area is specified for a subsequent user, this enhanced technique may identify those POIs that might be interesting to the subsequent user by selecting those POIs in the POI database for that geographic area that have high scores.

Thus, and for use in identifying interesting POIs, each geographic area of a larger geographic region may include one or more of a query database, a POI database, or another type of database. In practice, the specific query term/POI pairs (query database) or POIs (POI database) identified in databases associated with neighboring geographic areas are likely to differ. In the case where, by chance, a particular query term/POI pair or POI happens to be stored in multiple databases (i.e. for neighboring geographic areas), the respective scores aggregated for the query term/POI pair or POI are likely to be different in each database, particularly where a fall-off function is applied to the score increments.

Multiple query databases or POI databases may be associated with a single geographic area, where each database is associated with a time period or other characteristics. In response to a user selection of a search result, the databases selected for update may be those associated with the current time in the user's time zone. For example, if the user selects a search result in the morning hours (e.g., 6 a.m. to 12 p.m.), a "morning" POI database or a "morning" query database may be updated. Similarly, one or more "afternoon," "evening," or "nighttime" database may be updated if the user selects a search result during the hours of 12 p.m. to 6 p.m., 6 p.m. to 12 a.m., or 12 a.m. to 6 a.m., respectively. The time period may also refer to a particular day of the week, a particular month, season, daytime or nighttime, year or other identifiable segment of time.

The use of multiple databases for a single geographic area, segmented by time or other characteristic, is predicated on the assumption that the time-of-day at which the user selects a search result affects whether the search result is considered interesting at that time. In other words, what the user may deem interesting in the morning hours may be different than what they would deem interesting during the evening hours. For example, where a nightclub and a law firm are physically located in the same geographic area, the same user might be more interested in the law firm during the daylight hours or on the weekdays, and may be more interested in the nightclub during the nighttime hours or on weekends.

For that geographic area, the preference that other users might have for the law firm during the day, and for the nightclub during the night, would be expressed in a high score for the law firm and a low score for the nightclub in the daytime POI database, and a low score for the law firm and a high score for the nightclub in the nighttime POI database. As will be described in more detail below, this time-period-specific information may be used to identify interesting POIs, depending upon the time that the identification is requested. Similarly, the operating hours of POIs, if known, may be used to avoid identifying a POI that is closed as being an interesting POI.

POI and query databases may also be segregated based on other factors, such as by user cluster. For instance, and n addition to score information, the databases may include information which describes a relationship between POIs, based on user interests. For instance, user queries and clicks may be used to discover relationships between POIs. Co-click data may also be used to extract user preferences, for example to identify users who select certain POIs, in sequence. This information may be used to provide users with recommendations regarding other POIs that might be interesting to them, once they have expressed interest in a certain POI.

In one example, users may be clustered together based on similarity of POI ratings and POI selections. For example, users who frequently rate or select coffee shops, or who have similarly rated a specific coffee shop, may be clustered with other users who have behaved similarly. For a particular geographic area, multiple query and multiple POI databases may exist, where each query or POI database is associated with a user cluster. For a particular geographic area, a "default" query and "default" POI database may exist, for storing search results for users who are not associated with a specific user cluster. These default databases may, for example, be populated with data that is aggregated from all of the separate, user-cluster-specific query and POI databases, or with data generated from monitoring users that are themselves not assigned to a specific user cluster.

One example process for clustering users based upon their past selections is described in U.S. patent application Ser. No. 11/204,922, which is titled "Scalable user clustering based on set similarity," was filed on Aug. 15, 2005, and is hereby incorporated by reference. Using that process, an interest set of low-rated or high-rated POIs can be generated for each user, and users with similar POIs in their various interest sets can be clustered together.

FIG. 4 illustrates an example user interface 400 which allows a user to select a search result on a map of search results. The interface 400 is both a post-query interface, since it includes a map 408 of search results which results from performing a search engine query, and a pre-query interface, since it includes a query term entry field 402 for initiating a different search query which may generate a different map. The user interface 400 may be displayed on a mobile device, such as a mobile phone, or a non-portable device such as a desktop computer.

As used by this specification, a "search query" includes the one or more query terms that the user submits to a search engine when the user requests the search engine to execute a search. Among other things, a "result" of the search includes information that references a resource which the search engine determines to the be responsive to the query. The information may just be textual information, a URL, or other information. The result may include other things, such as a snippet of text from corresponding resource. Furthermore, a search query may include no user-entered query terms. For instance, a search query may be executed using just the current location of the client device as a query term, resulting in the identification of local POIs or categories of POIs that are considered to be interesting. If the user begins entering text, that text may be used to execute a new query which includes user-entered text, or to filter the displayed POIs or categories.

Where this specification refers to scoring a query term/POI pair based on a distance between a particular geographic area and geographic area located at a center of a map, it is intended to refer to a distance between the particular geographic area and a geographic area located at the center of a post-query map which results from executing a search query using the query term. The "center" may be the center of the post-query map as determined when the map is initially generated and output by the search engine, or the center may be the center of an adjusted post-query map, as determined after the user has manipulated the size, scale, orientation, position, or view of the original post-query map that was generated and output by the search engine.

In FIG. 4, the user has entered a query term 402 (the example term "query term") in a pre-query interface, to search for a POI which satisfies the query term 402. A search results area 404 lists search results 406a to 406c ("Business A" to "Business C," respectively), where each of search results 406a to 406c includes a link to a POI which satisfies the query term 402.

Icons (or "markers") 410a to 410c corresponding to search results 406a to 406c, respectively, are overlaid on a map 408. Center mark 412, which is illustrated for reference purposes and could be, but would ordinarily not be, displayed to the user, denotes the center of the map 408. Although the map 408 displays gridlines which define the boundaries of the geographic areas, these gridlines are also illustrated for reference purposes and could be, but would ordinarily not be, displayed to the user.

In this example, the geographic areas are contiguous, non-overlapping, and each tessellates and has a uniform size and shape (e.g., one half mile square). In some implementations, geographic areas may not tessellate, and may exhibit a non-uniform size, such as where a geographic area represents a neighborhood, county, state, province, district, city, or other demographic zone. In FIG. 4, each geographic area is identified by a row-column identifier, starting with row A, column 1 at the top left of the map 408. For example, the center mark 412 and the marker 410b are located in geographic area "E5", the marker 410a is located in geographic area "G3", and the marker 410c is located in geographic area "C5."

The markers 410a to 410c may each include references or links to information associated with the corresponding search results. For example, the markers 410 to 410c may include hypertext links to web pages for Businesses A to C, respectively. A user may select one of markers 410a to 410c or one of search results 406a to 406c to indicate their interest in a particular POI. For example, the user may select the marker 410a in order to follow a Uniform Resource Locator (URL) to a web page associated with the search result 406a. In response to the selection of one of markers 410a to 410c or a link included in one of the search result 406a to 406c, one or more query databases and/or one or more POI databases may be updated to increment the score associated with the query term/selected POI (query database), or the selected POI itself (POI database).

As noted above, for each geographic area, the query database may store a score which reflects a strength of the correspondence or relationship between a particular query term, a particular selected POI, and the geographic area. When a POI is selected, the score for a particular query term/POI pair is incremented by a larger amount for query databases associated with geographic areas closer to the center of the map, and is incremented by a smaller amount for query databases associated with geographic areas further from the center of the map. Put another way, when the user selects a POI from among multiple POIs while viewing a map, it is assumed that the selected POI has a stronger relationship to one or more geographic areas displayed at or near the center of the map than with the geographic areas which lie in the periphery of the map.

In response to the selection of a marker or link to a POI, an increment value (also referred to as a "score increment") is determined, and the increment value is added to a score already stored in the query database. If an associated score does not already exist in the query database, the initial score is assumed to be zero, or a new record may be added to the query database which stores the determined increment value as an initial score. A higher increment value will be selected for a geographic area nearer to the center of the map 408 (e.g., geographic area "E5") and a smaller increment value will be selected for geographic areas further from the center of the map 408. The value of the score increment may be determined using an equation or predetermined fall-off function.

For example, an increment value of "1.0" may be selected for geographic area "E5", located at the center of the map 408, and an increment value of "0.8" may be determined for the geographic area "D4," since it is located one geographic-area-distance from the center of the map 408. Increment values may fall-off as the distance from the center geographic area increases. For example, as shown in a graph 420 of the query database fall-off function, an increment value of "1.0" may be used for a center geographic area, an increment value of "0.8" may be used for geographic areas located one geographic-area-distance away from the center (e.g., geographic areas "F6", "D6"), and an increment value of "0.2" may be used for geographic areas located two geographic areas away from the center (e.g., geographic areas "D3", "G7"). According to this particular exemplary fall-off function, scores are not incremented for geographic areas located more than two geographic areas away from the center (e.g., geographic areas "B2", "E10").

In the example of FIG. 4, the query databases and the POI databases use different fall-off functions. Increment values selected for the query database are displayed in the lower left corner of each respective geographic area located at or around the center marker 412. Increment values would not actually be displayed to the user on the interface 400. As shown in table 422, which illustrates a data structure of an exemplary query database associated with geographic area "G3", a record in the query database may include a reference to the associated geographic area ("Cell. No"), the query term, the selected POI, and a score, as incremented by the increment value of "+0.2." Since, for example, both fall off functions result in a zero increment value being calculated for geographic area E2, the databases associated with that cell are not accessed or modified.

The POI databases may also be updated in response to the selection of a POI. The POI database stores scores which indicate, for a particular geographic area, which POIs located within that geographic area have been selected most frequently, although the scores may be adjusted to compensate for duplicated selections, unsatisfying user visits (i.e. clicks for shorter than a predetermined period of time), or other factors. To select a POI, the user may select a search result 406a-c, a marker 410a-c, or may select a link referencing the POI through a list of search results or other interface. The location of the selected POI is determined, such as by determining geographic coordinates of the POI based on accessing a location database which stores information identifying POIs, and geographic coordinates associated with each identified POI.

A single selection of a link to a POI on a map of search results may result in both the query databases and the POI databases being updated, or in one or the other being updated. Since the determination of an increment value for the query databases requires that a map of search results be generated, a selection of a link to a POI in a listing of the search results (i.e. without a map) may result in the POI database alone being updated.

In response to the selection of a POI, an increment value is selected for the POI databases, and the increment value is added to existing scores stored in the POI databases. If an associated score does not already exist in a particular POI database, a new record may be added, storing the selected increment value as an initial score. As shown in table 440, which illustrates a data structure of an exemplary POI database associated with geographic area H4, a record in the POI database may include a reference to the geographic area number ("Cell No."), the selected POI, and a score as incremented by the increment value of "+0.3."

For the POI databases, the increment value is generally higher for the geographic area in which the POI is physically located, and is generally lower as the distance between a particular geographic area and the physical location of the POI increases. For example, if the user selects marker 410*a*, an increment value of "1.0" is selected for geographic area "G3." Based on the POI fall-off function 450, lesser increment values are selected for geographic areas adjacent or near to the geographic area where the POI is located. For example, if the user selects marker 410*a*, an increment value of "0.3" may be used for geographic areas located one geographic-area-distance away from "G3", such as geographic areas "H2" and "F4".

POI increment values may "fall-off" as the distance from the geographic area in which the selected POI is physically located increases. For example, as shown in the POI fall-off function 450, an increment value of "1.0" is used for the geographic area in which the selected POI is physically located, and an increment value of "0.3" may be used for geographic areas located one geographic-area-distance away from that geographic area (e.g., geographic areas "G2", "F3").

Depending on the fall-off function, scores may not be incremented (i.e., an increment value of zero is used) for geographic areas located more than a certain physical or geographic-area-distance away from the geographic area in which the selected POI is physically located. For instance, in the FIG. 4 example, the POI fall-off function provides that geographic areas further than one geographic-area-distance away (e.g., geographic areas "F1", "H5") from the geographic area in which the selected POI are physically located are not affected by the selection of a POI.

Accordingly, increment values for the nine geographic areas located at or around the marker 410*a* are shown in the upper right of each respective geographic area. Increment values are not actually displayed to the user on the interface 400. The fall-off behavior of query database increment values and POI database increment values may be determined, for example, by a Gaussian or parabolic function.

Figure 5:
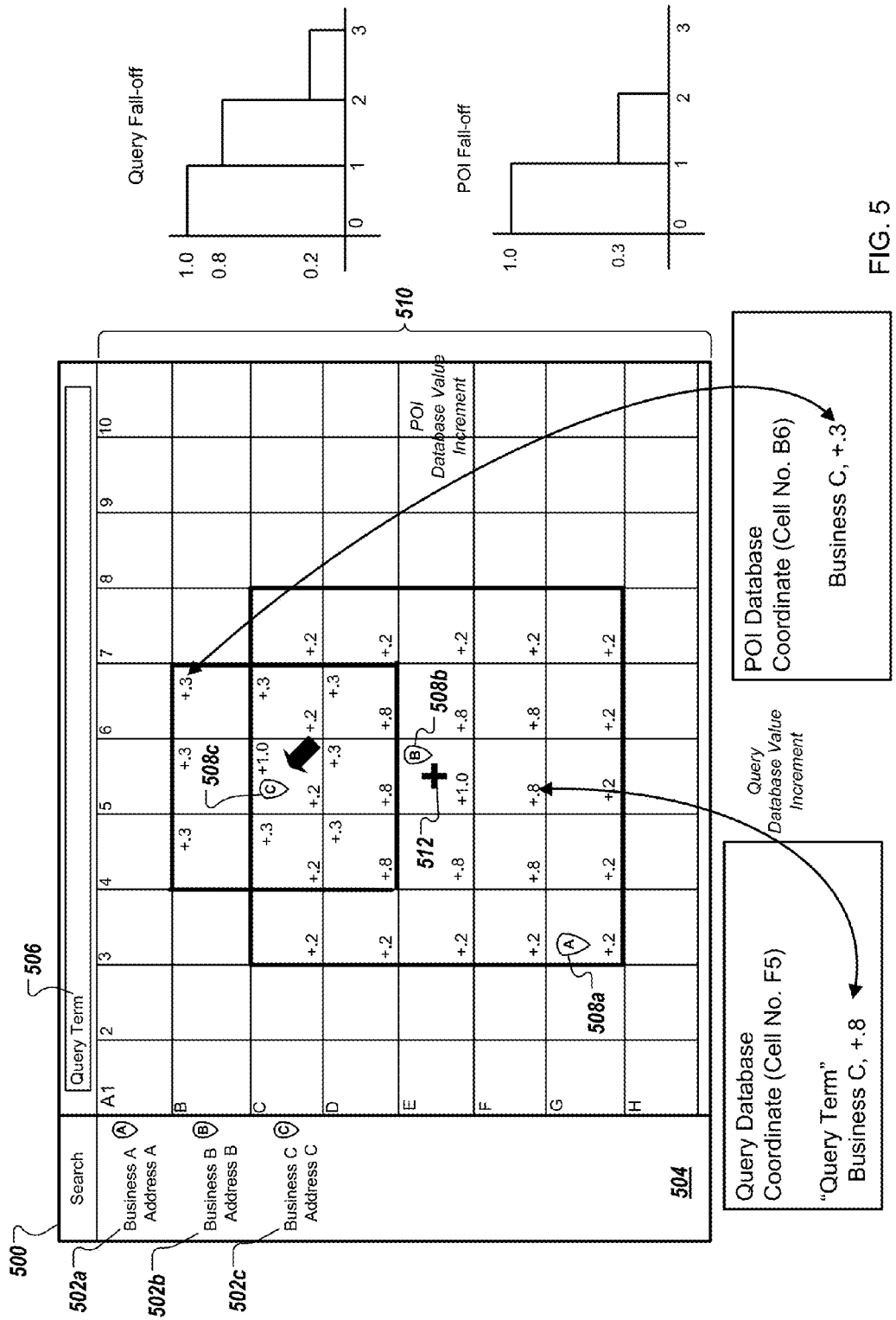

FIG. 5 illustrates another example user interface 500 for viewing and selecting search results. Similar to the interface 400, the interface 500 may be a post-query interface displaying search results 502*a*-502*c* in a search results area 504, where the search results 502*a*-502*c* satisfy an entered query term 506. Markers 508*a*-508*c* correspond to the search results 502*a*-502*c*, respectively, and are overlaid on a map 510. A center mark 512 indicates the center of the map 510.

A user may select one of the markers 508*a*-508*c* or one of the search results 502*a*-502*c* to indicate their interest in a particular POI. For example, the user may select the marker 508*c*. In response to the selection of the marker 508*c*, a query database and a POI database may be updated. For the query database, the geographic areas at or near the center mark 512 are to be updated. For the POI database, the geographic areas located at or near the marker 508*c* are to be updated.

For each identified geographic area, an increment value is selected. For the query database, an increment value of "1.0" may be selected for the center geographic area (i.e., "E5"), an increment value of "0.8" may be determined for geographic areas one geographic area away from the center geographic area (e.g., geographic areas "D4", "E4", "F4", "F5", "F6", "E6", "D6", "D5"), and an increment value of "0.2" may be determined for geographic areas two geographic areas away from the center geographic area (e.g., geographic areas "C3", "D3", "E3", "F3", "G3", "G4", "G5", "G6", "G7", "F7", "E7", "D7", "C7", "C6", "C5", "C4"). An increment value of zero may be used for geographic areas located more than two geographic-area-distances away from the center geographic area.

For the POI database, an increment value of "1.0" may be determined for the geographic area including the marker 508*c* (e.g., geographic area "C5"), and an increment value of "0.3" may be determined for geographic areas located one geographic area away from the geographic area including the marker 508*c* (e.g., geographic areas "B4", "C4", "D4", "D5", "D6", "C6", "B6", "B5"). An increment value of zero may be used for geographic areas located more than one geographic-area-distance away from the geographic area including the marker 508*c*.

Figure 6:
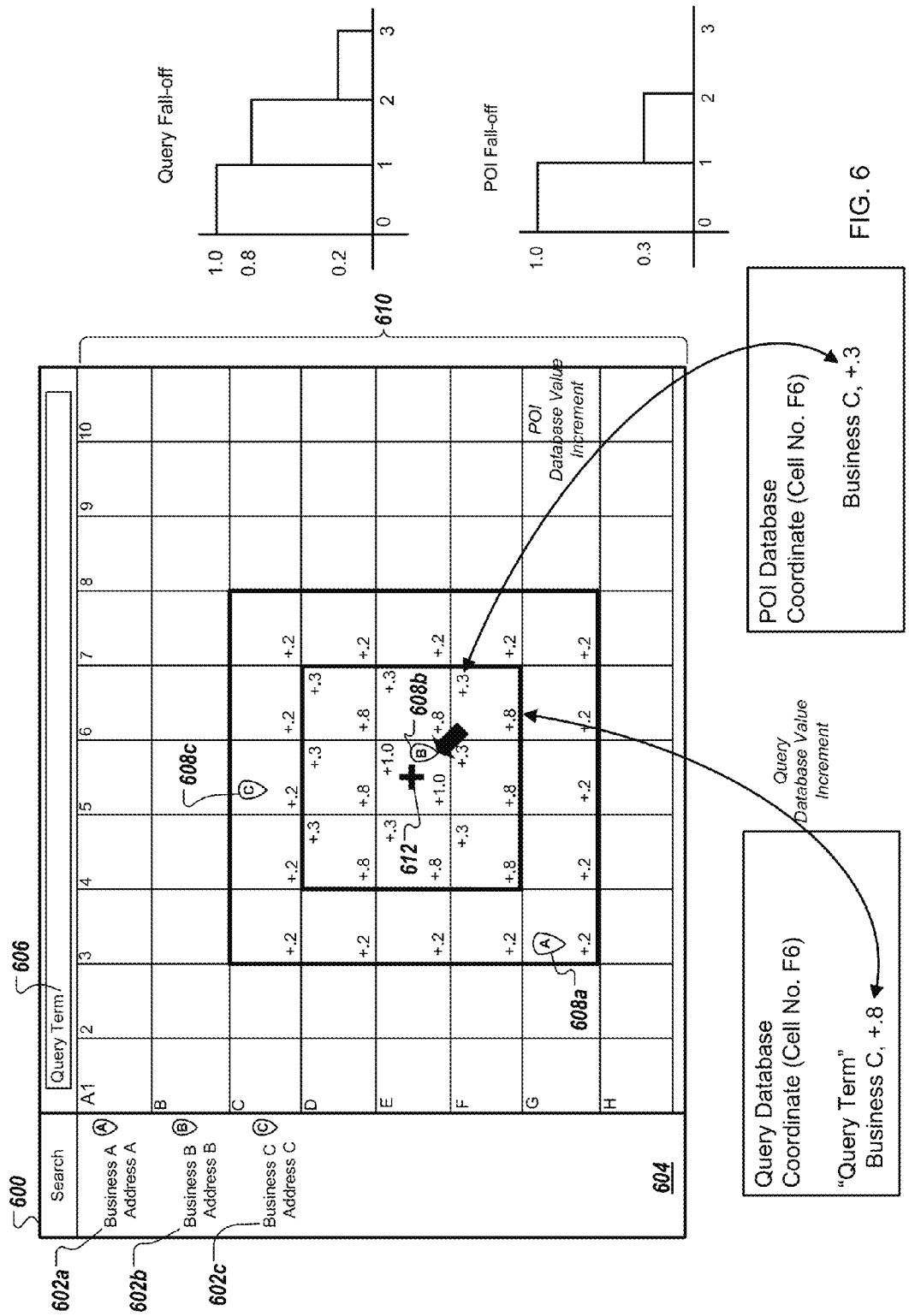

FIG. 6 illustrates another example user interface 600 for viewing search results. Similar to the interface 500, the interface 600 may be a post-query interface displaying search results 602*a*-602*c* in a search results area 604, where the search results 602*a*-602*c* satisfy an entered query term 606. Markers 608*a*-*c* correspond to the search results 602*a*-602*c*, respectively, and are overlaid on a map 610. A center mark 612 denotes the center of the map 610.

A user may select one of the markers 608*a*-608*c* or one of the search results 602*a*-602*c* to indicate their interest in a particular POI. For example, the user may select the marker 608*b*. In response to the selection of the marker 608*b*, a query database and a POI database may be updated. For the query database, geographic areas located at or around the center mark 612 are updated. For the POI database, geographic areas located at or around the marker 608*b* are updated.

For each identified geographic area, an increment value may be selected. For the query database, an increment value of "1.0" may be selected for the center geographic area (i.e., "E5"), an increment value of "0.8" may be selected for geographic areas one geographic-area-distance away from the center geographic area (e.g., geographic areas "D4", "E4", "F4", "F5", "F6", "E6", "D6", "D5"), and an increment value of "0.2" may be selected for geographic areas two geographic areas away from the center geographic area (e.g., geographic areas "C3", "D3", "E3", "F3", "G3", "G4", "G5", "G6", "G7", "F7", "E7", "D7", "C7", "C6", "C5", "C4"). An increment value of zero may be used for geographic areas located more than two geographic-area-distances away from the center geographic area.

For the POI database, an increment value of "1.0" may be selected for the geographic area including the marker 608*b* (e.g., geographic area "E5"), and an increment value of "0.3" may be selected for geographic areas located one geographic area away from the geographic area including the marker 608*b* (e.g., geographic areas "D4", "E4", "F4", "F5", "F6", "E6", "D6", "D5"). An increment value of zero may be used for geographic areas located more than one geographic area away from the geographic area including the marker 608*b*.

Increment values may also be determined based on a scale of the map 610. As noted above, the extent to which a particular POI is considered to be interesting is assumed based on an extent to which that POI has been selected in certain search engine results, including some map search results. In this regard, this assumption may begin to break down when the map scale does not exceed a certain threshold, such as where the user is looking at a map of a very large area instead of a map of a neighborhood, or a cluster of neighborhood within a walkable distance. To compensate for this possible breakdown, an increment value of zero may be used for all geographic areas, for a particular type of database, if a map scale does not exceed a certain threshold. Conversely, if a map scale exceeds a threshold, a non-zero increment value may be determined, as provided by the appropriate fall-off equation.

The popularity of a query term/POI pair in other geographic areas might be used to diminish or increase a score for a particular geographic area. In the case where a query term/POI pair is popular across many geographic areas, a score might be diminished since this query does not bring any particular information about this location. In the case where a query term/POI pair is not popular in other geographic areas, or its frequency of its occurrence has very few spikes across a larger region, then the associated score might be increased since the low popularity suggests that the query term/POI is particularly interesting in that geographic area.

For instance, increment values may be ignored (e.g., not stored) or scores may be reduced for POIs associated with chains, franchises, or national or regional brands, where these types of POIs are identified by their existence in a large quantity of geographic databases. For example, a reference to a particular chain store may exist in numerous query databases or POI databases. If the number of databases which reference a particular POI (or like-named POIs) exceeds a threshold (e.g., if more than half of the databases include a reference to a like-named POI) then a decrement value may be determined (or a decrement function may be applied) and an associated score may be decremented in a query or POI database. In one example, if references to a like-named nationally popular coffee chain are found to exist in databases associated with more than two thirds of all defined geographic areas, the scores associated with each of the references to the coffee chain may be halved, effectively rendering each franchise location "half as interesting."

Figure 7:
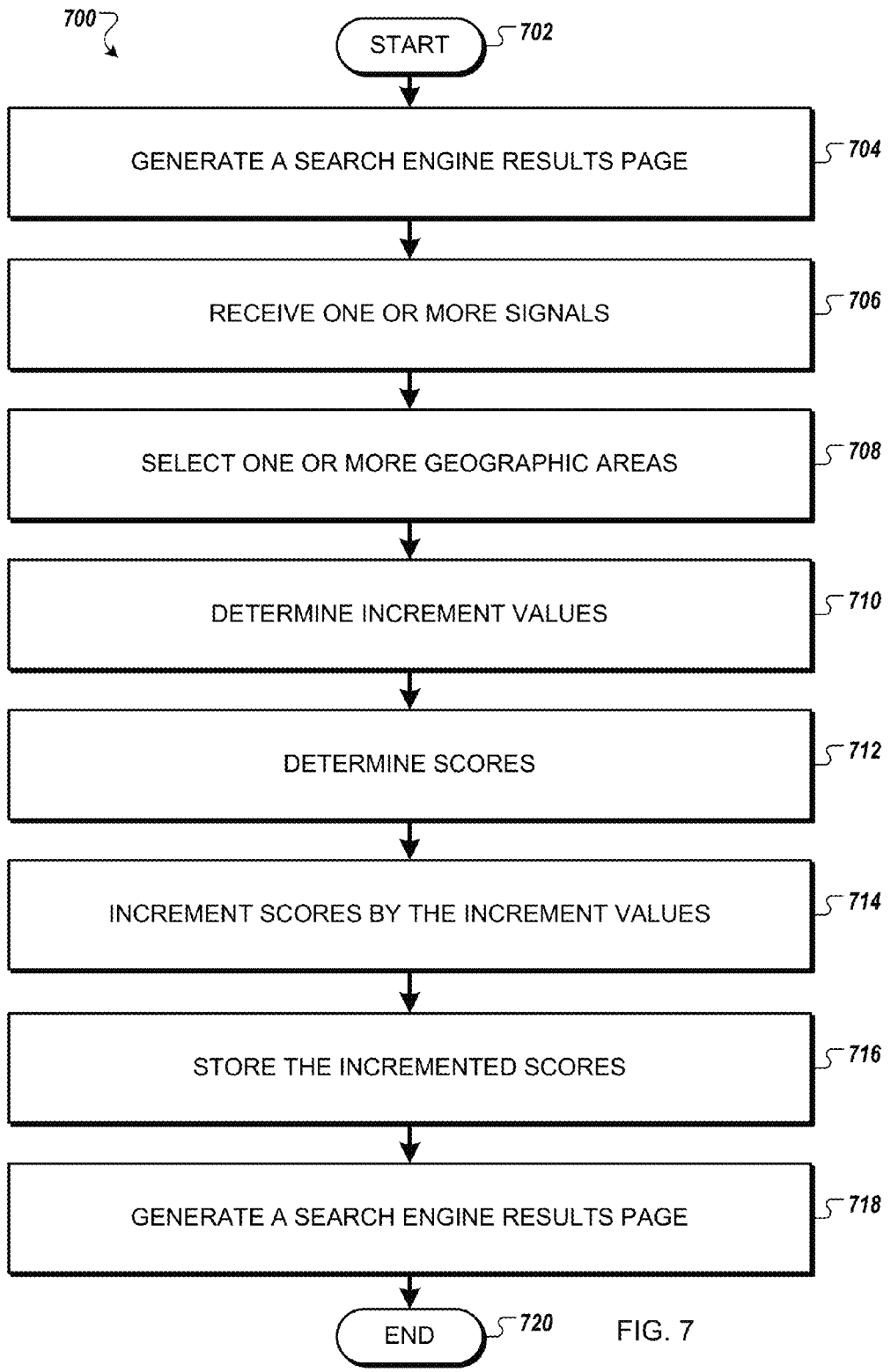

FIG. 7 is a flowchart illustrating a computer-implemented process 700 for identifying POIs. Briefly, the process 700 includes: generating a first search engine results page which includes links to one or more POIs which satisfy a query; receiving one or more signals indicating that a link to a particular POI was selected by a user; selecting one or more geographic areas; determining, for each of the selected geographic areas, an increment value; determining, for each of the selected geographic areas, a score associated with the particular POI; incrementing, for each of the selected geographic areas, the score by the increment value; storing, for each of the selected geographic areas, the incremented score in association with information identifying the particular POI, in one or more databases; and using the incremented scores stored in the one or more databases to generate a second search engine results page.

In further detail, when the process 700 begins (702), a first search engine results page which includes links to one or more POIs which satisfy a query is generated (704). For example, a user may enter a query term on a pre-query interface and select a search control. The pre-query interface, may be, for example, a map search interface. A search engine may perform a search for the query term and may identify one or more POIs which match the query term. A search engine results page may be generated which includes a search results list of matching POIs, and in some implementations, the matching POIs are overlaid on an included map.

One or more signals indicating that a link to a particular POI was selected by a user are received (706). For example, the user may select a link to a particular POI from a list of links displayed in a search results list. The user may select a POI link which is overlaid on a map, a link to the POI on a list of search results, or a link to a review of a particular POI.

In the case where a particular POI may be classified under two or more categories, the signal may also indicate the category associated with the selection of the link, if known. The received signal may further indicate a duration between an initial click on the link by the user, and a subsequent click by the user. A received signal may also further indicate a click-through-rate of the link. As another example, first and second signals may be received which indicate that the link to a POI was selected by the user at a first time and a second time, respectively, and consequently the second signal may be filtered or otherwise ignored.

One or more geographic areas are selected (708). For example, one or more geographic areas disposed at or near a center of a displayed map may be selected. As another example, one or more geographic areas at or near the physical location of the selected POI may be selected.

An increment value is determined for each of the selected geographic areas (710). For example, a first increment value for a first selected geographic area may be determined. The first geographic area may be, for example, the center of a displayed map or the physical location of the selected POI. A second, lesser increment value may be determined for selected geographic areas which surround the first geographic area. The second increment value may be determined by using, for example, a Gaussian or parabolic function.

Increment values may be normalized, for example, to be a value between zero and one, inclusive. For example, the first increment value may be determined to be "1.0" and the second increment value may be determined to be "0.8". The "0.8" increment value may be used, for example, for geographic areas which are one geographic area away from the first selected geographic area. Other increment values (third, fourth, etc.) may be determined for areas that are farther away from (e.g., two or more geographic areas away from) the first selected geographic area. For example, a third increment value may be determined to be "0.2".

A score associated with the particular POI is determined for each of the selected geographic areas (712). For example, a score may be retrieved from a query database or a POI database. The score for each of the selected geographic areas is incremented by the increment value (714). For example, the score retrieved from the query or POI database may be added to the increment value and the result of the addition may be stored in a temporary variable (e.g., memory address).

The incremented score is stored in association with information identifying the particular POI in one or more databases, for each of the selected geographic areas (716). For example, the incremented score may be stored in association with information identifying the selected POI in a query database, where the selected geographic areas include the geographic area nearest to the center of a displayed map and one or more geographic areas surrounding that area. As another example, the incremented score may be stored in association with information identifying the selected POI in a POI database, where the selected geographic areas includes the geographic area in which the selected POI is physically disposed, along with one or more geographic areas surrounding that area.

The incremented scores stored in the one or more databases are used to generate a second search engine results page (718). For example, a search engine results page may be generated and displayed on a mobile device. Stored POIs located in proximity to the location of the mobile device may be identified and a score may be determined for each stored POI. Stored POIs whose associated scores satisfy a threshold may be selected as interesting POIs. A second search engine results page which includes links to the relevant POIs may be generated and displayed on the mobile device.

Figure 8:
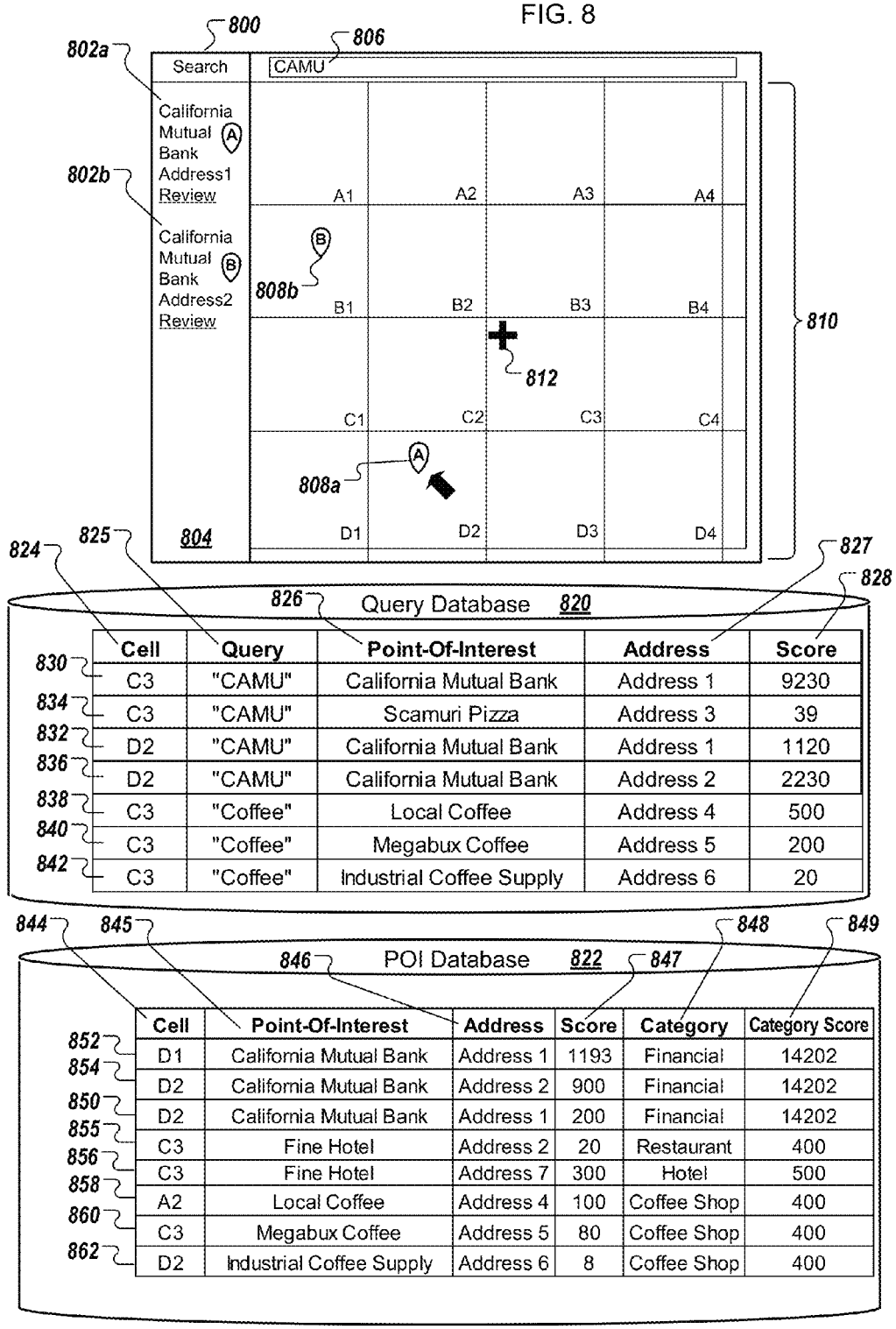

FIG. 8 illustrates an example user interface 800 for viewing search results. The interface 800 may be a post-query interface displaying search results 802a-802b in a search results area 804, where the search results 802a-802b match an entered query term 806. Markers 808a-808b correspond to the search results 802a-802b, respectively, and are overlaid on a map 810. A center mark 812 indicates the center of the map 810.

A user may select a marker 808a-808b or a search result 802a-802b to indicate their interest in a particular POI. For example, the user may select the marker 808a. In response to the selection of the marker 808a, a query database 820 and a POI database 822 may be updated. The query database 820 stores records which may include a geographic area identifier 824, a query term 825, a POI identifier 826, an address 827 of the associated POI, and a score 828. Other implementations are possible. For example, records storing a query, POI identifier, address and score may be stored in a data structure or file which is associated with a particular geographic area, and multiple files or data structures may exist, one for each geographic area.

For the query database 820, geographic areas located at or near the center mark 812 are updated in response to the user selection of marker 808a. For example, a score for the geographic area C3 may be incremented by a value of "1.0". For example, a record 830 in the query database 820 may be updated and an existing score of "9230" may be incremented by "1.0", resulting in a new score of "9231". As discussed above, scores for geographic areas surrounding the center geographic area may be incremented by a lesser value (e.g., "0.8"). For example, a record 832 corresponding to geographic area D2 may be updated and an existing score of "1120.0" may be incremented by "0.8", resulting in a new score of "1120.8". Records 834-842 in the query database 820 correspond to other combinations of geographic areas, queries, and selected POIs.

The POI database 822 stores records which may include a geographic area identifier 844, a POI identifier 845, an address 846 of the associated POI, a score 847, a category 848, and a category score 849. For the POI database 822, geographic areas for which scores may be updated in response to the user selection of the marker 808a may be identified as geographic areas located at or around the marker 808a (e.g., at or around geographic area D2). For example, a record 850 corresponding to the geographic area D2 may be updated, and an existing score of "200.0" may be incremented by an increment value of "1.0", resulting in a new score of "201.0". Scores for geographic areas surrounding the geographic area corresponding to the location of the selected POI may be incremented by a smaller increment value. For example, a record 852 corresponding to the geographic area D1 may be updated, and an existing score of "1193" may be incremented by an increment value of "0.2", resulting in a new score of "1193.2".

The category 848 stored in the POI database 822 may be a category associated with the selected POI. For example, for the record 850, the stored category is "Financial". The category score 849 may be a sum of the scores 847 for all POIs of that category. For example, the category score of "14202" for the record 852 may be a sum of the scores 847 for the records 850, 852, a record 854, and possibly other records having a category of "Financial." One or more category scores for categories associated with a POI may be incremented in response to the user selection of the POI.

A POI may be associated with more than one category. For example, a hotel which includes a restaurant may be associated with both a "Hotel" and a "Restaurant" category. A record 855 is associated with a "Hotel" category and a record 856 is associated with a "Restaurant" category. Records 857-862 in the POI database 822 correspond to other combinations of geographic areas and selected POIs.

One use for this enhanced identification technique is to identify interesting categories of POIs, as a prelude to identifying the interesting POIs themselves. For example, by combining scores of like-categorized POIs, it may be determined that a particular area is more associated with one category of POIs ("coffee shops," or "restaurants") than with another category of POIs ("government buildings" or "museums"), while another area may have the opposite relationship. Accordingly, when the user enters an area, an initial user interface may display a list of prevalent categories.

For example, an initial user interface that is initially displayed may include controls which each identify a different category of POIs. The controls are ordered according to the scores associated with the respective underlying category, where each category is scored based on the scores of their respective constituent POIs, with the controls for the categories having the higher scoring constituent POIs being listed above the controls for the categories having the lower scoring constituent POIs.

Using the POI and/or query databases, local, interesting POIs may be distinguished from other POIs which might generally receive more attention by users on a national or regional level, or from other local businesses which others do not yet consider to be especially affiliated with the geographic area. Information identifying these POIs may be displayed to a user who may be searching for a local neighborhood institution or gem, along with navigation, advertisement, rating, or other contextual information that might aid the user in selecting a POI to visit.

FIGS. 9 through 12 generally illustrate the actions of identifying interesting POIs using one or more databases, and pre-caching information associated with identified POIs (FIG. 2, 204). For example, a full or partial, query or POI database may be downloaded to a mobile device. Scores stored in the query database and POI database may be used to identify interesting POIs located around the physical location of the mobile device, and to display information about the identified POIs.

In more detail, once the databases for multiple geographic areas have been populated with scores for various POIs (or, as discussed in more detail below, for various query term/POI pairs), these databases are used to identify interesting POIs for a particular geographic area. Initially, a target location is selected, where the target location may be a user-selected location, or a location where a user is currently or is expected to be in the future. Geographic areas near a target location are identified, as are POIs which are scored in the databases associated with these geographic areas. If query refinement criteria are initially applied, identified POIs which do not satisfy these criteria, such as those POIS which are not associated with a selected category or which do not include an input query term, may be filtered, deleted, or otherwise ignored from further processing.

The scores for each remaining identified POI are determined from the databases associated with the selected geographic areas. The scores may be adjusted or weighted using a fall-off function based on their distance to the target location, based on their proximity to an expected travel destination of a user, or using other criteria, and the scores are combined to generate a combined score for each remaining identified POI. These POIs are ranked based on combined score, and those POIs with the highest scores are designated as interesting. Information which identifies the interesting POIs is provided for display to the user, as is other contextual information which may aid the user in selecting a POI to visit.

As the mobile device moves from one geographic area to another, or as the mobile device approaches a boundary of a geographic area, data pertaining to interesting POIs in the current and surrounding geographic areas may be pre-cached on the mobile device for quick access by the user. The databases for the selected geographic areas, the list of identified POIs, as well as detailed information regarding the interesting POIs (such as review information rating the interesting POIs, or URLs associated with the interesting POIs) may be pre-cached to the user's mobile device.

The information selected to pre-cache may be based on time-of-day. For instance, since query and POI databases may be segregated by time period, as the end of a time period approaches, the POI and query databases for the upcoming time period may be pre-cached to the mobile device. For example, if a "morning" database is associated with a 6 a.m. to 12 p.m. time period, the download of an "afternoon" database may begin at a time before 12 p.m. (e.g., 11:58 a.m.) so that the download of the "afternoon" database is complete, and detailed information is readily available, by the time the "afternoon" time period actually begins.

Using pre-caching, information identifying the interesting POIs is immediately available for display and use the moment that the user first looks at or activates the user interface of the mobile device. Since the pre-caching of information occurs in the background, the user is not required to type or otherwise enter information into their mobile device before viewing information that may be relevant to the surrounding area. As the user interacts with the mobile device and begins to make selections or enter query refinements, the mobile device may respond to the user's actions by deleting certain pre-cached information from the local cache, by pre-aching other new information to the mobile device, or by adjusting settings which control pre-caching behavior.

Figure 9:
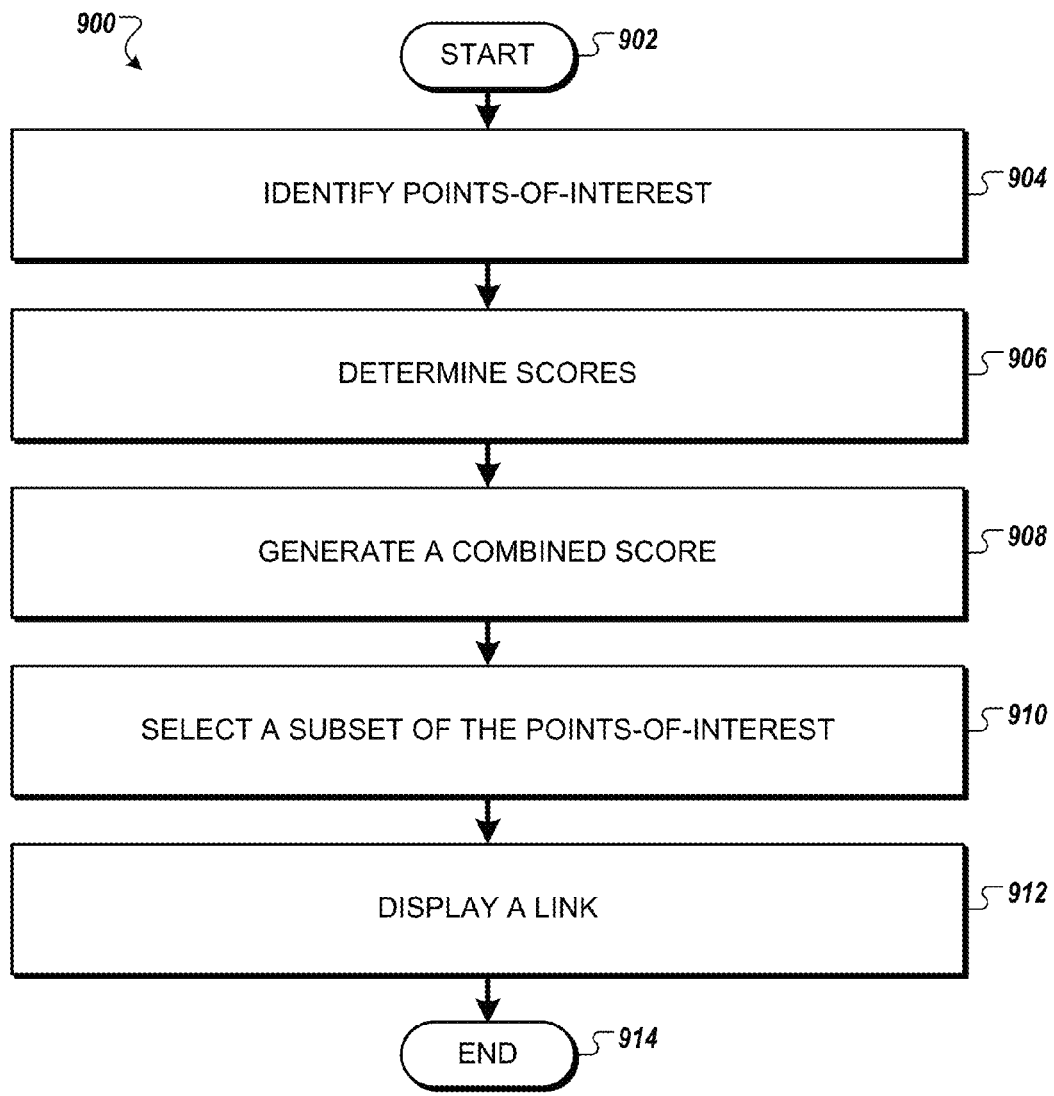

FIG. 9 is a flowchart illustrating a computer-implemented process 900 for identifying POIs. Briefly, the process 900 includes: identifying POIs associated with one or more of multiple, selected geographic areas; determining, for each of the multiple geographic areas, a score associated with the identified POIs; generating a combined score for each identified POI based on the determined scores associated with the respective POI; selecting a subset of the identified POIs based at least on the combined scores; and displaying a link to the POIs in the subset.

As noted above, a geographic area may represent a portion of a geographic region such as a country, continent, or other land mass, and in some implementations a grid system may be defined to form uniform square-shaped geographic areas (e.g., quarter-mile or half-mile squares), where the geographic areas may be overlapping or non-overlapping. In other implementations, non-uniform sized and non-contiguous geographic areas may be defined.

As a precursor to identifying interesting POIs, one or more geographic areas are selected. These geographic areas may include a target geographic area in which the user or their mobile device is located or is expected to be, or nearest to the current or expected location of the user or their mobile device, as well as one or more geographic areas surrounding this target geographic area.

Where the target geographic area is the geographic area in which the user's mobile device is currently located, the location of the mobile device may be determined, for example, using GPS or other approaches. For example, a dead reckoning process may be used to estimate the current position of the mobile device based upon a previously determined, fix position. As another example, a camera on the mobile device may capture an image of a landmark or text (e.g., signage) and the mobile device may determine the current location based on the captured image. As another example, the user of the mobile device may directly input the location of the mobile device, such as by selecting a location on a map or by entering an address or other location identifying information, or by docking or connecting the mobile device with another device which has a known location.

The target geographic area may or may not depend upon the current location of the user or the mobile device. A user may specify a particular location on a user interface of a computing device, such as a desktop computer. For example, a user may be interested in a future travel destination and may use a user interface displayed on the desktop computer to select a location (e.g., on a map, or by entering a location). In this example, the target geographic area is the geographic area in which the particular location is located, or nearest to the particular location.

Figure 10:
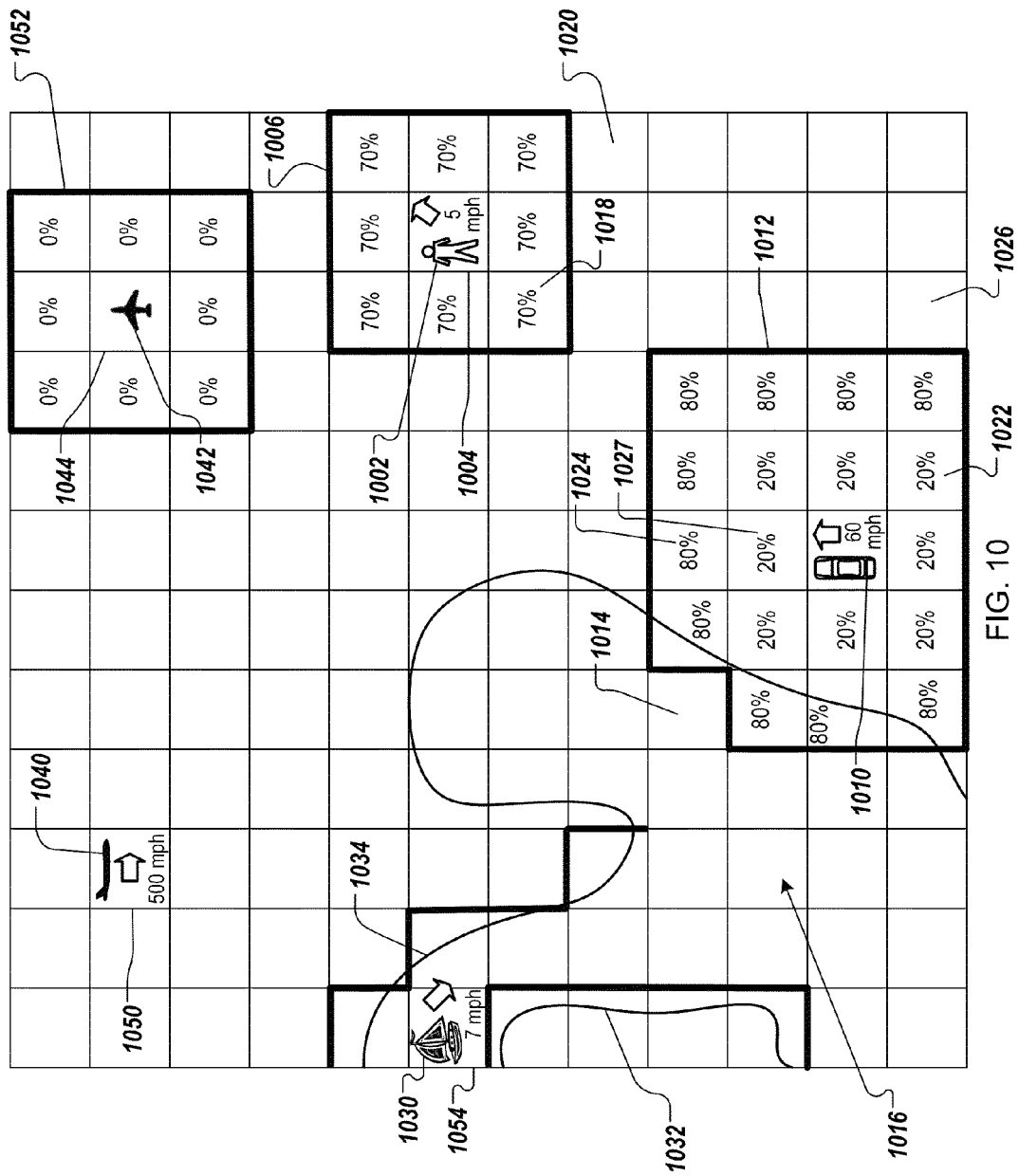
FIG. 10 illustrates the selection of geographic areas.

FIG. 10 illustrates several examples of the selection of geographic areas based on the detected or expected location of a user or their mobile device. For instance, a location of a mobile device in the possession of a user 1002 may be determined, and a target geographic area 1004 in which the user 1002 is presently located and several surrounding geographic areas may be selected as the selected geographic areas. The quantity of surrounding geographic areas to select may be predetermined or constant, or it may be dynamically determined based on the various circumstances. Where the quantity is predetermined, all geographic areas which partially or completely lie within a certain distance (e.g., a half of a mile, or ten miles, or N geographic-area-distances) of the determined location may be selected as the selected geographic areas.

Where the geographic areas are defined using a grid system, the eight geographic areas surrounding the target geographic area (e.g., in which the user 1002 is presently located) may be selected. Specifically, the target geographic area 1004 and the eight geographic areas bordering the target geographic area 1004 may be selected to form a three-by-three grid 1006 of selected geographic areas. As another example, twenty four surrounding geographic areas may be selected by forming a five-by-five grid of selected geographic areas, where each selected geographic area is within two geographic-area-distances from the target geographic area 1004.

Where the location of a mobile device is used to select the target geographic area, the quantity of surrounding geographic areas to select may be based on several factors, such as the average speed of the mobile device during a past predetermined period of time, such as the past five, fifteen or thirty minutes. For example, if, as shown in FIG. 10, the user 1002 has been walking at a speed of five miles-per-hour for the last hour, eight geographic areas surrounding the target geographic area may be selected. If the mobile device is inside of a car 1010 traveling at a speed of sixty miles-per-hour, a larger number (e.g., 19, 20, 25, 36) of geographic areas may be selected, as shown in a grid 1012 of selected geographic areas.

Because a person traveling at walking speed may not be able to conveniently travel the same distance as a person who is driving in a car, the quantity of surrounding geographic areas selected for a walker may be less than the quantity of surrounding geographic areas selected for a driver. Accordingly, the speed of the mobile device is detected to determine whether the user is walking (i.e. whether, over a past period of time, the average speed of the mobile device fails to exceed a predetermined speed threshold, such as twenty miles-per-hour), or whether the user is driving (i.e. whether the predetermined speed threshold has been exceeded). If the speed of the mobile device exceeds the predetermined threshold, a larger quantity (e.g., twenty five) of surrounding geographic areas may be selected. If the speed of the mobile device does not exceed the predetermined threshold, a lesser quantity (e.g., eight) of surrounding geographic areas may be selected.

The selection of surrounding geographic areas may be biased toward the direction of travel of the mobile device. For example, as shown in the grid 1012 of selected geographic areas, if the mobile device is inside of the car 1010, more surrounding geographic areas located in front of the direction of travel of the car 1010 may be selected than surrounding geographic areas located behind the direction of travel of the car 1010.

The selection of surrounding geographic areas may be based on terrain. For example, if the mobile device is inside of a traveling car, it may be determined that some surrounding geographic areas are entirely water, mountain peaks or canyons, etc. Such geographic areas whose terrain would preclude the inclusion of accessible POIs may be excluded from selection. For example, a geographic area 1014 has been excluded from the grid 1012 of selected geographic areas, because the geographic area 1014 is located entirely over a body of water 1016.

The quantity of surrounding geographic areas to select may be based on values returned from a fall-off function selected for the user's circumstances, such as a fall-off function that is used to weight scores based on distance when combining scores from neighboring geographic areas. Using a fall-off function, the scores associated with a target geographic area may be weighted to receive a full score, while the scores associated with surrounding geographic areas may be weighted for reduced effect based on their distance to the target geographic area. In this regard, a geographic area may be selected if a fall-off function would assign a non-zero value to the scores of that geographic area, while geographic areas which are assigned a zero-value by the fall-off function are not selected.

For example, for the geographic areas in the grid 1006 of selected geographic areas, the fall-off function may provide full weighting (i.e., 0% percent reduction or fall-off) to scores associated with the target geographic area 1004 and a 70% weighting (i.e., a 30% reduction) may be applied to scores associated with each adjacent geographic area (e.g., geographic area 1018). Geographic areas may be selected if the fall-off function returns a non-zero value, and may be excluded if the fall-off function returns a zero value. For example, a geographic area 1020 may be excluded from the grid 1006 of selected geographic areas because a fall-off function would return a "zero" value for the scores associated with geographic area 1020.

As another example, within the grid 1012 of selected geographic areas, geographic areas located one geographic-area-distance away from the car 1010 (e.g., geographic area 1022) receive an 80% weighting of their full score, and geographic areas located two geographic-area-distances away from the car 1010 (e.g., geographic area 1024) received a 20% weighting of their full score. In both cases, the fall-off function assigns a non-zero value to the scores associated with each geographic area. However, the fall-off function provides that geographic areas located three geographic-area-distances away, such as geographic area 1026, would receive a "zero" value for their associated scores. Accordingly, geographic areas located three or more geographic-area-distances away from the car 1010 are not selected.

Data, such as the POI and query databases for the current and surrounding geographic areas, may be pre-cached on the mobile device, so that the stored information can be accessed and presented to the user quickly. The data to pre-cache may be selected based on the speed and expected travel direction of the mobile device. The historical travel path of the mobile device may be used as an indication of the expected travel direction rather than, for example, a snapshot of the current heading of the mobile device. The mobile device may, for example, be in the pocket of the user and the orientation of the mobile device may be randomly shifting. A historical travel path may be calculated based on the recorded location of the mobile device at various points in time. For example, the historical path of the mobile device traveling in the car 1010 may be plotted over the past minute, five minutes, or hour, and an expected travel path may be calculated such that it may be anticipated that the car 1010 will be moving into a geographic area 1027.

Pre-caching of databases for the current and surrounding areas may be configured such that more databases for geographic areas located in the direction of the expected travel path of the mobile device are pre-cached than for geographic areas located in the historical travel path of the mobile device. That is, more databases for geographic areas located in "front" of the mobile device may be pre-cached than for geographic areas located "behind" the mobile device.

The target geographic area (and corresponding surrounding geographic areas) may be determined based on an expected destination of a user. For example, a user of a mobile device may be on an airplane 1040 traveling to an airport 1042 located in a geographic area 1044. The airport 1042 may be known as the user's destination based, for example, on the user's speed and heading, on a user input, on a random selection from among the possible airports, on an automatic parsing of emailed travel documents, or by using other approaches. The geographic area 1044 in which the airport 1042 is located is selected as the target geographic area. This geographic area and the geographic areas adjacent to it are selected, although geographic area 1050, the area in which the user is currently flying over, is not.

As such, the target geographic area is not always the geographic area in which the user or their mobile device are currently located. For example, where the mobile device is on the airplane 1040, the airplane may be over the geographic area 1050, which is not included in a grid 1052 of geographic areas that form the selected geographic areas around the airport 1042.

In the example of the airplane 1040, the geographic areas adjacent to the geographic area 1044 have no associated fall-off (i.e., they are assigned a non-zero value by the fall-off function). Selection of a fall-off function itself may also be based on the speed of the mobile device. For example, a first fall-off function may be selected if the mobile device is traveling five hundred miles-per-hour, such as when the user is flying in the airplane 1040, a second fall-off function may be selected if the mobile device is traveling sixty miles-per-hour, such as when the user is driving in the car 1010, and a third fall-off function may be selected if the mobile device traveling at five miles-per-hour or may be standing still, such as where the user 1002 is walking or standing still. The expected destination of the user may be determined through other approaches, such as my determining the location of the user's scheduled appointments.

The selected geographic areas may form a shape other than a rectangular shape, and the selected geographic areas may or may not be contiguous. Where a mobile device is determined to be on the body of water 1016 (for example, when the user is on a boat 1030), the geographic areas along coastlines 1032 and 1034 may be selected. As in the airplane example, the selected geographic areas do not necessarily include the geographic area 1054 in which the boat 1030 is currently located.

When the process 900 begins (902), POIs associated with one or more of multiple, selected geographic areas are identified (904). The POIs may be identified, for example, by querying the one or more POI databases associated with the selected geographic areas to identify the POIs that are assigned scores for any of the geographic areas, or by querying the one or more query databases associated with the selected geographic areas to identify the POIs that are paired with an input query term in any of the geographic areas. POIs may be further filtered based on a selected category or based on a match of a query refinement (e.g., a prefix search), to reduce the quantity of POIs under consideration. Where the databases for a particular geographic area are segmented based on time period, user cluster, or other factor, the databases to query may depend upon the current time or date, the cluster to which the user is assigned.

For each of the identified POIs, a score associated with that POI is determined for each of the multiple geographic areas (906). To illustrate this process, FIG. 11 illustrates example scores that are stored for various POIs for a target geographic area 1102, and for surrounding geographic areas that make up a three-by-three grid 1104 or a five-by-five grid 1106 of selected geographic areas.

More specifically, the target geographic area 1102 may, for example, be a geographic area in which the user or their mobile device is, or is expected to be. The selected geographic areas may include the target geographic area 1102 and eight adjacent geographic areas to form a three-by-three grid 1104 of surrounding geographic areas, or the selected geographic areas may include geographic areas located one or two geographic-area-distances away from the geographic area 1102, to form a five-by-five grid 1106 of selected geographic areas.

When the selected geographic areas includes those geographic areas located inside of the three-by-three grid 1104, the databases associated with each selected geographic area are queried to determine the scores stored for each identified POI. For example, based on querying the database associated with geographic area 1102, it is determined that a score of forty five is associated with POI "A", a score of twenty five is associated with POI "B", a score of thirty six is associated with POI "C." Based on this query, It may also be inferentially determined that a score of zero is associated with POIs "E," "H," "I", and "J".

Where FIG. 11 represents the contents of a POI database, the POI "A" may represent, for example, a particular POI of a particular category of POIs. Since scores in a POI database are incremented based on the proximity between a selected POI and a geographic area in which the POI is located, the existence of scores for POIs "A," "B" and "C" in the POI database for target geographic area 1102 indicate that these POIs are physically located at or near the target geographic area 1102. On the contrary, the score of zero associated with POIs "E," "H," "I", and "J" indicate that these POIs are not physically located at or near the target geographic area 1102.

Where FIG. 11 represents the contents of a query database, the POI "A" may represent a particular POI associated with a particular query term that has been input by the user of the mobile device. For example, in FIG. 11, "A," "B," and "C" may represent the query term/POI pairs "sample query term X:POI A," "sample query term X:POI B," and "sample query term X:POI C," respectively. Scores in a query database are incremented based on the proximity between a selected POI and a geographic area at a center of a map when the POI was selected. As such, the existence of scores for POIs "A," "B" and "C" in the POI database for target geographic area 1102 indicate that, in response to the user executing a query using the query term "sample query term X," these POIs were frequently selected while the post-query interface displayed a map centered over or near the target geographic area 1102. On the contrary, the score of zero associated with POIs "E," "H, "I", and "J" indicate that these POIs are infrequently selected, or were not selected, while the post-query interface displayed a map centered over or near the target geographic area 1102.

In the case where two or more databases are used for a particular geographic area, the scores from both of the databases may be determined and processed separately. Specifically, when a query term is initially entered as an initial query refinement, query scores can be gathered and aggregated from the query database, while POI scores can be separately gathered and aggregated from the POI database. These different scores may be used to identify two separate groups of interesting POIs, where these two separate groups may later be combined into a single group.

For scores corresponding to the geographic area 1108, a score of twenty four is associated with the POI "A", a score of seventy two is associated with the POI "H", a score of twenty five is associated with the POI "I," and a score of zero is associated with POIs "B," "C," "E," and "J." These scores, as well as the scores for the seven remaining geographic areas located within the grid 1104 of selected geographic areas, are determined by querying the respective databases associated with each selected geographic area. Where the selected geographic areas define a five-by-five grid 1106 instead of a three-by-three grid 1104, the scores for the sixteen additional geographic areas located two geographic-area-distances away from geographic area 1102 would also be obtained.

Returning to FIG. 9, a combined score is generated for each identified POI based on the scores determined for each respective POI (908). For example, Table 1 illustrates the scores stored in the database for the target geographic area 1102 for each identified POI (geographic-area-distance, or 'd,' equals 0 in the target geographic area), the scores stored in the databases for geographic areas located one geographic-area-distance away (d=1) from geographic area 1102, and the total combined score. In Table 1, no fall-off is applied based on distance.

TABLE 1

| | No Fall-Off | | |
|---|---|---|---|
| POI | d = 0 | d = 1 | Total |
| A | 45 | 192 | 237 |
| B | 25 | 67 | 92 |
| C | 36 | 204 | 240 |
| E | | 11 | 11 |
| H | | 96 | 96 |
| I | | 75 | 75 |
| J | | 81 | 81 |

As shown in Table 1, the total combined score for POI "A" is determined by adding the score of forty five for the POI "A" for geographic area 1102 to the scores for the POI "A" for the other geographic areas within the grid 1104 that are located one geographic area away from the geographic area 1102. For example, a score of twenty four is determined for the POI "A" for each of the geographic areas 1108-1122, and summing together these eight scores equals a subtotal of one hundred ninety two. Adding the subtotal of one hundred ninety two to the score of forty five associated with the geographic area 1102 results in a combined score of two hundred thirty seven for the POI "A". Similarly, a combined score of ninety two is calculated for the POI "B" and a combined score of two hundred forty is calculated for the POI "C".

Where no fall-off is applied, the total score for POI "C" is highest, indicating that POI "C" is the most interesting of the identified POIs for geographic area 1102. POI "A" would be considered second most interesting since it has the second highest score, and POI "E" would be considered least interesting (or uninteresting), since it has the lowest score.

The databases associated with the geographic areas surrounding the target geographic area may reference POIs which are not scored in the database associated with the target geographic area itself. For example, the databases for geographic areas 1108, 1118 and 1120 assigned scores to POI "I," but target geographic area 1102 does not assign a score to POI "I" (or, inferentially, assigns a score of zero to POI "I"). Because this identification process selects surrounding geographic areas which may score POIs that are not scored in the target geographic area, the most interesting POIs for a target geographic area may include POIs which are not located in the target geographic area itself.

For instance, since the combined scores for the POIs "I" and "J," which are not scored in the database associated with target geographic area 1102, are lower than the combined scores for POIs "A," "B," and "C," which are associated with the geographic area 1102, POIs "I" and "J" are not considered to be more interesting than the POIs "A," "B," and "C". However, POI "H", whose combined score is ninety six, is considered to be more interesting than POI "B", even though POI "B" is identified in the databases associated with geographic area 1102 and POI "H" is not.

The example of Table 1 does not apply a fall-off function in generating the combined score, but in other examples, fall-off may be applied. It may be helpful to apply fall-off based on the characteristics of a particular area, or based on characteristics, conditions or the preferences of the user. For example, fall-off may be applied to account for the user's mobility. As noted above, when a larger number of geographic areas are selected, the POIs which are selected as interesting to that larger area may include those which are located in geographic areas that are located far from the user's current location. If the user is highly mobile (e.g., driving), the user may be more willing to travel a farther distance to visit a POI which is more interesting than those POIs within the user's immediate vicinity. Conversely, if the user has low mobility (e.g., walking), the user may value closer POIs over more interesting POIs which are further away.

The decision to value distant POIs over closer POIs, or vice versa, occurs through the selection and use of one or more fall-off functions which may be applied to the scores of the POIs associated with selected geographic areas. Since mobility is a major factor to the value determination, the particular fall-off function to use may be selected based on the speed that the user's mobile device is traveling, or on the mobility characteristics of the user.

In the Table 1 example, the fall-off function applies no-fall off for those geographic areas located one geographic-area-distance away from the target geographic area 1102. The decision to not apply fall-off regardless of distance may be appropriate for a user driving in a car, who may easily reach POIs located within the user's immediate vicinity (i.e., geographic area 1102) as well as geographic areas outside the user's immediate vicinity (i.e. geographic area 1116). Put another way, because the user is driving and is highly mobile, there is no need to devalue moderately distant POIs by applying a fall-off function.

A person who, for example, is walking, biking, riding a scooter or a wheelchair, or pushing a baby in a stroller may find POIs in adjacent geographic areas less accessible and, thus, less desirable. Under these circumstances, a fall-off function that provides for a reduction in score value as the distance to the user increases may be selected and used. Fall-off may be gradual and slowly diminishing, steep and abrupt, or some combination thereof. For example, a gradual fall-off may be applied to values that are very close to a target geographic area, and a steep fall-off may be applied to values that are not very close to the target geographic area. The fall-off function may be a Gaussian or parabolic function.

For example, Table 2 illustrates the application of a 20% fall-off at one geographic-area-distance (d=1) to the scores of Table 1, and Table 3 illustrate the application of an 80% fall-off at one geographic-area-distance (d=1) to the scores of Table 1.

TABLE 2

20% Fall-Off @ d = 1

| POI | d = 0 | d = 1 | Total |
|---|---|---|---|
| A | 45 | 154 | 199 |
| B | 25 | 54 | 79 |
| C | 36 | 163 | 199 |
| E |  | 9 | 9 |
| H |  | 77 | 77 |
| I |  | 60 | 60 |
| J |  | 65 | 65 |

TABLE 3

80% Fall-off @ d = 1

| POI | d = 0 | d = 1 | Total |
|---|---|---|---|
| A | 45 | 38 | 83 |
| B | 25 | 13 | 38 |
| C | 36 | 41 | 77 |
| E |  | 2 | 2 |
| H |  | 19 | 19 |
| I |  | 15 | 15 |
| J |  | 16 | 16 |

The gradual, 20% fall-off applied in Table 2 may be well-suited for a user with a moderate level of mobility (e.g., bicycle, scooter). Using this fall-off function, scores for surrounding geographic areas (e.g., geographic areas that are one geographic-area-distance away from the target geographic area 1102) receive a small reduction or devaluation in score, reducing their effect on the combined score. This small reduction reflects the reality that, given the existence of a significantly more interesting POI a short distance away, a person with a moderate level of mobility would be willing to travel this short distance, but not if the distance was too far, and not unless the POI was substantially more interesting than those found in the immediate vicinity.

In Table 2, POIs "A" and "C" have the highest score, and are thus considered to be most interesting. By contrast to Table 1, in which no fall-off was applied and POI "C" was considered most interesting, the application of a fall-off function based on distance and speed can affect the ranking of POIs to provide search results which are tailored to the user's particular circumstances. Thus, given a user's mobility, a user who views the results shown in Table 2 may determine that it is not worth the bother to travel to visit POI "C," which is outside the target geographic area 1102, since POI "A", located inside the target area 1102, is equally interesting.

The sharp, 80% fall-off applied in Table 3 may be well-suited for a user with a low level of mobility (e.g., walking) in that scores for surrounding geographic areas are significantly reduced. This steep reduction reflects the reality that a person with a limited level of mobility is likely to want to remain within the user's current geographic area unless an extremely interesting POI exists a short distance away. In Table 3, POI "A" has the highest combined score, and is thus considered to be most interesting.

Comparing the results shown in Tables 1 through 3, it is evident that the POI with the highest score for a particular geographic area, which is thus considered most interesting, can vary depending upon the ability or willingness of a user to travel short or long distances from the user's present location. In Table 1, for instance, where the no fall-off is applied, for example based on high mobility of the user, POI "C" is considered to be most interesting. In Table 3, where steep fall-off is applied, for example based on low mobility of the user, POI "A" is considered to be most interesting.

As shown by this comparison, the designation of a particular POI as interesting can vary based upon the fall-off function applied to the scores stored for the identified POIs in the various databases for the selected geographic areas. While the above example uses mobility or speed as the primary criteria for selecting a fall-off function, other criteria may be used. For instance, the amount of available time may be used to select a fall-off function, where a gradual fall-off function may be selected for a user with plenty of spare time, while a steep fall-off function may be selected for a user who is in a hurry. The amount of spare time that a user has may be determined based on examining the user's schedule of appointments or comparing the current day and time with the user's typical work week, by receiving a signal from the user indicating that they are in a hurry, or by otherwise determining that the user is short on time (e.g. detecting, through a microphone, the user stating "I'm really hungry"). In another variation, the fall-off function may apply a more abrupt fall-off to geographic areas behind the user and a more gradual fall-off to geographic areas ahead of the user, reflecting the desire of the user to not reverse travel direction.

In addition to the fall-off function selected, the quantity of geographic areas selected may also have an effect on which POI has a maximum combined score, and is thus considered to be most interesting. Contrasted with Tables 1 to 3, which combine scores from a three-by-three grid 1104 of selected geographic areas, Tables 4 through 6, below, combine scores from a five-by-five grid 1106 of selected geographic areas. Table 4 is a high mobility example, in which no fall-off is applied. Table 5 is a moderate level of mobility example, in which a 40% fall-off is applied at one geographic-area-distance (d=1), and an 80% fall-off is applied at two geographic area distances (d=2). Table 6 is a low level of mobility example, in which an 80% fall-off is applied at one geographic-area-distance (d=1), and a 90% fall-off is applied at two geographic area distances (d=2).

TABLE 6

80% @ d = 1,
90% @ d = 2

| POI | d = 0 | d = 1 | d = 2 | Total |
|---|---|---|---|---|
| A | 45 | 38 | 10 | 93 |
| B | 25 | 13 | 8 | 47 |
| C | 36 | 41 | 16 | 92 |
| D |  | 0 | 8 | 8 |
| E |  | 2 | 4 | 6 |
| F |  | 0 | 3 | 3 |
| G |  | 0 | 9 | 9 |
| H |  | 19 | 31 | 50 |
| I |  | 15 | 9 | 24 |
| J |  | 16 | 11 | 27 |
| K |  | 0 | 3 | 3 |

TABLE 4

No Fall-Off

| POI | d = 0 | d = 1 | d = 2 | Total |
|---|---|---|---|---|
| A | 45 | 192 | 96 | 333 |
| B | 25 | 67 | 83 | 175 |
| C | 36 | 204 | 156 | 396 |
| D |  |  | 81 | 81 |
| E |  | 11 | 40 | 51 |
| F |  |  | 30 | 30 |
| G |  |  | 93 | 93 |
| H |  | 96 | 312 | 408 |
| I |  | 75 | 91 | 166 |
| J |  | 81 | 108 | 189 |
| K |  |  | 31 | 31 |

TABLE 5

40% @ d = 1;
80% @ d = 2

| POI | d = 0 | d = 1 | d = 2 | Total |
|---|---|---|---|---|
| A | 45 | 115 | 19 | 179 |
| B | 25 | 40 | 17 | 82 |
| C | 36 | 122 | 31 | 190 |
| D |  |  | 16 | 16 |
| E |  | 7 | 8 | 15 |
| F |  |  | 6 | 6 |
| G |  |  | 19 | 19 |
| H |  | 58 | 62 | 120 |
| I |  | 45 | 18 | 63 |
| J |  | 49 | 22 | 70 |
| K |  |  | 6 | 6 |

In the examples of Tables 4 through 6, the scores for each POI are summed for the target geographic area 1102 (d=0), for surrounding geographic areas located one geographic-area-distance away (d=1) from the target geographic area 1102, and for surrounding geographic areas which are located two geographic-area-distances away (d=2) from the target geographic area 1102.

In Table 4, no fall-off has been applied, regardless of distance. This approach may be well suited for a person driving in a car, who may easily reach POIs located within the geographic area 1102 as well as geographic areas adjacent to the geographic area 1102, rendering the need for fall-off moot. Without applying fall-off, POI "H" has the highest combined score, and is thus considered to be most interesting, despite the fact that POI "H" is located two or more geographic-area-distances away from the user. This may indicate that the POI "H" is considered to be highly interesting and "worth seeing"

even if it is some distance away. The fact that no fall-off is applied may indicate that the user is highly mobile or has more available free time, and may be more interested in visiting highly interesting POIs even if they are further away, or if more travel time is required. However, a person walking, biking, riding a scooter or a wheelchair, or pushing a baby in a stroller may find POIs in adjacent geographic areas less accessible and, thus, less desirable.

Under these circumstances, the fall-off functions used to generate Tables 5 and 6 respectively provide for gradual or steep fall-off as distance increases. In Table 5, in which gradual fall-off is applied, the POI "C" has the highest combined score, and is thus considered to be most interesting. In Table 6, in which steep fall-off is applied, the POI "A" has the highest combined score, and is thus considered to be most interesting. By comparing the results of Tables 1 to 6, it is evident that the identification of interesting POIs can be tailored, using different combinations of fall-off functions and quantities of selected geographic areas, to identify interesting POIs which are most appropriate to the user's circumstances.

Because each of the selected geographic areas may be associated with more than one type of database (e.g. a POI database and a query database), the identification of interesting POIs can occur by combining the scores stored for each identified POI in one type of database, and separately combining the scores stored for each identified POI in the other type of database. As a result, two separate rankings of POIs are generated, one for each type of database, and each POI on each separate ranking including a combined score generated using one type of database. These separate rankings can be merged to identify POIs which are considered to be most interesting on the basis of both types of databases, such as by combining the separate combined scores. Combining the separate combined scores may occur by averaging or summing the separate combined scores, selecting the highest or lowest score, selecting a random score from scores retrieved from multiple database, or assigning different weights to scores retrieved from different databases. Alternatively, the various scores can be ignored, and the two separate lists can be merged based on the relative ranks of each identified POI on each list.

Returning to FIG. 9, a subset of the identified POIs is selected based at least on the combined scores (910). For example, as discussed with respect to Tables 1 through 6, the POI with the highest combined score may be designated as interesting. Or, as another example, POIs having the top N combined scores may be designated as interesting, where N is any positive integer. As another example, the combined scores for POIs may be used to select the top N most popular categories of POIs. As yet another example, the top N most popular POIs of a particular category may be selected based on a user-selected category (e.g., the most popular POIs of a particular category may be displayed after a user selects a category).

The number of categories or POIs selected may be based on the size of the mobile device display. For example, when a mobile device is only able to display twelve POIs, the top twelve POIs may be selected. The search results may also include one subset of interesting POIs, as well as another subset of popular or highly ranked POIs that are identified through another POI identification technique.

A link to the POIs in the subset is displayed (912), thereby ending the process 900 (914). For example, links to categories or links to POIs may be displayed on a mobile device. As discussed above, the selection of a category may result in the subsequent display of the most interesting or popular POIs of that category. Because the identification of interesting POIs can be initiated using a target location as the only input or query term, the interesting POIs can be identified, and links to these POIs can be displayed, without requiring any user input.

FIGS. 12A to 12C illustrate several exemplary mobile device user interfaces. In FIG. 12A, an application executing on a mobile device 1202a may initially generate a user interface 1204a. The user interface 1204a displays a category list 1206 which displays categories of POIs. The category list 1206 may list categories in order of category popularity or interest. The category list 1206 may display categories that have nearby interesting POIs of that category and may exclude (e.g., not show) categories for which there are no nearby interesting POIs. If the user selects a category in the category list 1206, a subcategory list may be displayed. For example, if the user selects a "restaurant" category 1208, a sub-category list may be displayed which displays different types of restaurants (e.g., Chinese, That or Mexican), where the sub-categories may also be ranked based on interest.

As another example, if the user selects a category in the category list 1206 and no subcategories exist, a POI list 1210 may be displayed in a user interface 1204b, as shown on a mobile device 1202b of FIG. 12B. The POI list 1210 displays information about POIs of the selected category. As another example, the POI list may be displayed when a user first turns on the mobile device 1202b (e.g., not in response to the selection of a category) and may display the most popular POIs regardless of category (e.g., the POI list 1210 may display POIs of multiple categories).

The POI list 1210 may display popular POIs based upon the time-of-day. For example, the most popular POIs associated with a "morning" query database or a "morning" POI database may be displayed in the POI list 1210 during the morning hours and the most popular POIs associated with an "afternoon" query database or an "afternoon" POI database may be displayed during the afternoon hours. The POI list 1210 may also be based upon a user cluster with which the user is associated. For example, if the user is associated with a cluster of users who frequently select or rate coffee shops, the POI list 1210 may display the most popular POIs which are associated with that user cluster.

The display of POIs based on user cluster may integrate with or override the display of POIs based upon time-of-day. For example, a user associated with a "nightlife" user cluster may be presented with popular nightclub POIs in the POI list 1210 during morning hours even though the nightclub POIs are closed and might not be popular POIs in a morning query or morning POI database. The "nightlife" user may not be presented with "business" POIs, such as law firm POIs, during morning hours even though the law firm POIs are popular POIs in a morning database. Similarly, a lawyer who is associated with a "lawyer" user cluster may be presented with law firm POIs during nighttime hours, even though the law firms are closed and are not popular POIs in a nighttime database. The lawyer user may not be presented with nightclub POIs during nighttime hours, even though the nighttime POIs are popular POIs in a nighttime database.

The POI list 1210 may be displayed if the user enters a query term 1212. For example, assume that the user has entered the query term "that" to search for That restaurants. In response to the entry of the query term 1212, the POI list 1210 is displayed, showing a list of entries such as entries 1214a to 1214f. Each entry 1214a-f displays information about the respective POI. For example, the entry 1214a displays a POI name 1216 of "Amarin That," a distance indicator 1218 of "0.01 ml", a past-user rating 1220 of three out of four stars, and a directional icon 1222. The directional icon 1222 indicates that the "Amarin That" POI is located behind and to the right of the current position and heading of the mobile device 1204*b*.

Information used to display the category list 1206 and/or the POI list 1210 may be pre-cached to the mobile device 1202. Pre-caching allows for the mobile device 1202 to have pertinent information displayed at the moment when the user looks at or turns on the mobile device 1202. That is, the user is not required to wait for information to download before the user interface 1204*a* or 1204*b* is displayed. For example, a full or partial query database and a full or partial POI database may be downloaded, for example, from the server 302 (FIG. 3) to the mobile device 1202. As the mobile device 1202 is moved, data corresponding to the current and surrounding geographic areas may be downloaded and pre-cached on the mobile device 1202. Pre-caching may be based, for example, on stored user preferences and past user POI and category selections. For example, if a user has historically frequently selected a "coffee shop" category, priority may be given to pre-caching information about POIs that include the "coffee shop" category attribute.

Detailed information regarding one or more POIs may also be downloaded and pre-cached on the mobile device 1202. Pre-caching of detailed information may be based on the speed of the mobile device 1202. For example, if the mobile device 1202 is traveling at a high speed (e.g., in a car), databases corresponding to a relatively large quantity of geographic areas may be downloaded, but with a lesser amount of detailed information about particular POIs being downloaded. In contrast, if the mobile device 1202 is traveling at a lower speed (e.g., walking speed), databases corresponding to a relatively lesser quantity of geographic areas may be downloaded, but with a larger volume of detailed information being downloaded (if available) for each POI.

Due to bandwidth limitations, certain bandwidth amounts may be dedicated to the pre-caching of databases and to the pre-caching of detailed information. A ratio of pre-caching of databases to pre-caching of detailed information may vary according to the speed at which the mobile device is moving. For example, if the mobile device is moving at a high speed, the percentage of bandwidth allocated to pre-caching databases may be higher than the percentage of bandwidth allocated to pre-caching of detailed information, and if the mobile device is moving at a low speed, a higher percentage of bandwidth may be allocated to downloading detailed information.

If the speed of the mobile device is above a certain threshold (e.g., a "high-speed" threshold), pre-caching may be suspended. For example, if the mobile device is traveling in an airplane, the mobile device may be passing by and through geographic areas very quickly, and too quickly for pre-caching to be useful. If the speed of the mobile device falls below the high-speed threshold, pre-caching may resume. As another example, if it is determined that the mobile device has stopped or is traveling at a very low speed (e.g., below a low-speed threshold for an extended amount of time), pre-caching may be suspended and may resume if it is later determined that the speed of the mobile device has risen above the low-speed threshold.

The amount of pre-cached data may be determined based on an expected destination of the mobile device. For example, if an expected travel path indicates that the mobile device is heading into a geographic area which includes many POIs, most or all available bandwidth may be allocated to pre-caching. As another example, if the expected travel path indicates that the mobile device is heading towards a geographic area which includes few and/or sparsely located POIs, pre-caching may occur at a lower rate using less than one hundred percent of available bandwidth. Information specifying the amount and types of data to pre-cache under various conditions may be stored in a look-up table or other module (e.g., the pre-cache module 336*a* of FIG. 3).

Detailed information may be displayed in response to the selection of an entry 1214*a-f*. For example, if the user selects entry 1214*a*, detailed information about the "Amarin That" POI may be displayed in a user interface 1204*c*, as shown in a mobile device 1202*c* of FIG. 12C. Detailed information may include an address 1230, a map 1232, past individual user reviews 1234*a-b*, and an average past user review score 1236. Detailed information may also include, among other information, other textual information, digital images (e.g., of storefronts, menus or menu selections) or videos. The user may select a control 1238 to return to the user interface 1204*b*, or a control 1240 to return to the user interface 1204*a* (e.g., the interface 1204*a* may be regenerated to show popular categories based on the current location of the mobile device 1202*a*).

One or more POI and/or query databases may be updated in response to user selection of an entry such as the entry 1214*a*. In other words, one or more databases may be updated to record the fact that the user expressed interest in the POI associated with the entry 1214*a*. Selection of an entry on a mobile device is another trigger to update the POI or query databases, in addition to updates triggered from user selection of a POI on an interface such as the user interface 400 (FIG. 4). A mobile user is "on-the-scene" and may have a better perspective than, for example, a user using interface 400 who is perhaps a far distance away from the selected POI. Accordingly, POI selections from mobile devices positioned near the POI may be given more weight than POI selections from interfaces such as the user interface 400.

The POI and query databases that may be updated may be based upon time-of-day or upon user cluster. For example, if the user selects the entry 1214*a* during the morning hours, a morning POI database and a morning query database may be updated. If the user is associated with a user cluster, a POI or query database associated with that user cluster and/or a default user cluster may be updated.

Similar to the process illustrated in FIG. 7, when an "on-the-scene" user expresses interest in a POI, one or more geographic areas are selected, an increment value is selected for each of the selected geographic areas, a score associated with the particular POI is determined for each of the selected geographic areas and is incremented, and the incremented score is stored in association with information identifying the particular POI for each of the selected geographic areas. Because the "on-the-scene" user may have a better perspective of whether a particular POI is a neighborhood gem than a user of a search engine, the increment value selected for the "on-the-scene" user may be higher than the increment value that would be selected for the user of the search engine.

The mobile device 1202 may notify the user if the user is in proximity of a POI that matches their interests. For example, the user may enter a list of interests, or the user's interests may be tracked based on the user's past selections. For example, the user may configure an interest list to include an interest in That food. The interest list may be stored in association with a user's profile. As another example, an application may recognize that a user has frequently selected That POIs or has frequently entered a query for That POIs. If, for example, the user walks by a That restaurant, or otherwise comes into close proximity to a That restaurant, the mobile device 1202 may alert the user, such as by displaying a message or playing an audio sound or recording. Alerts may be configured, such as by setting time restrictions, proximity limits, or whether notifications are based only on the current location or on an expected path.

Figure 12:
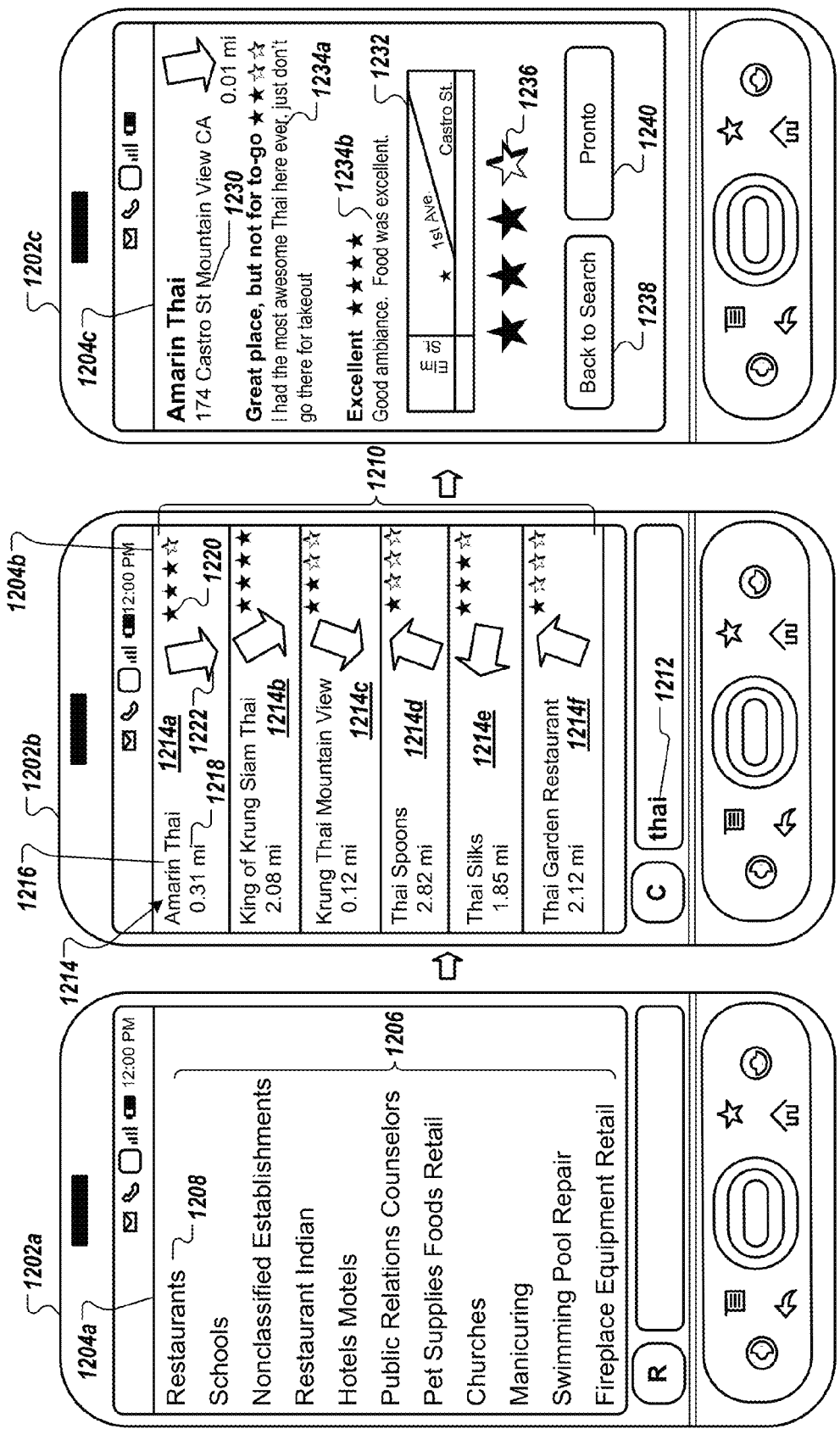

Referring briefly back to FIG. 1, the entries 104a to 104c displayed on the interface 102 may be displayed, for example, in a manner similar to the display of the POI list 1210 of FIG. 12, in response to the user selection of a "coffee shop" category or in response to a "coffee shop" query term entry. The information displayed on the interface 102 may be pre-cached to the mobile device 101. In addition, detailed information may be pre-cached, such as the full text of the review accessible from the review control 111. The POIs associated with entries 104a to 104c may be selected according to the method described above with respect to FIG. 9, using, for example, scores retrieved from one or more query databases and/or POI databases such as the databases 820 and 822 described in FIG. 8. Since it appears that the user is walking on the street in the example of FIG. 1, the selection of POIs to display may be based on scores associated with a three-by-three grid of surrounding geographic areas, with applied fall-off for low-mobility, as described for the user 1002 walking in the example of FIG. 10.

FIGS. 13 through 17 generally illustrate the action of displaying multiple search results (FIG. 2, 206). Each search result includes data that identifies a POI, and one or more icons which provide information regarding the corresponding POI. An icon may, for example, be a directional icon which indicates a relative direction from the mobile device to a POI, or the icon may indicate other information such as relative distance to, or the popularity or rating of, the POI.

Figure 13:
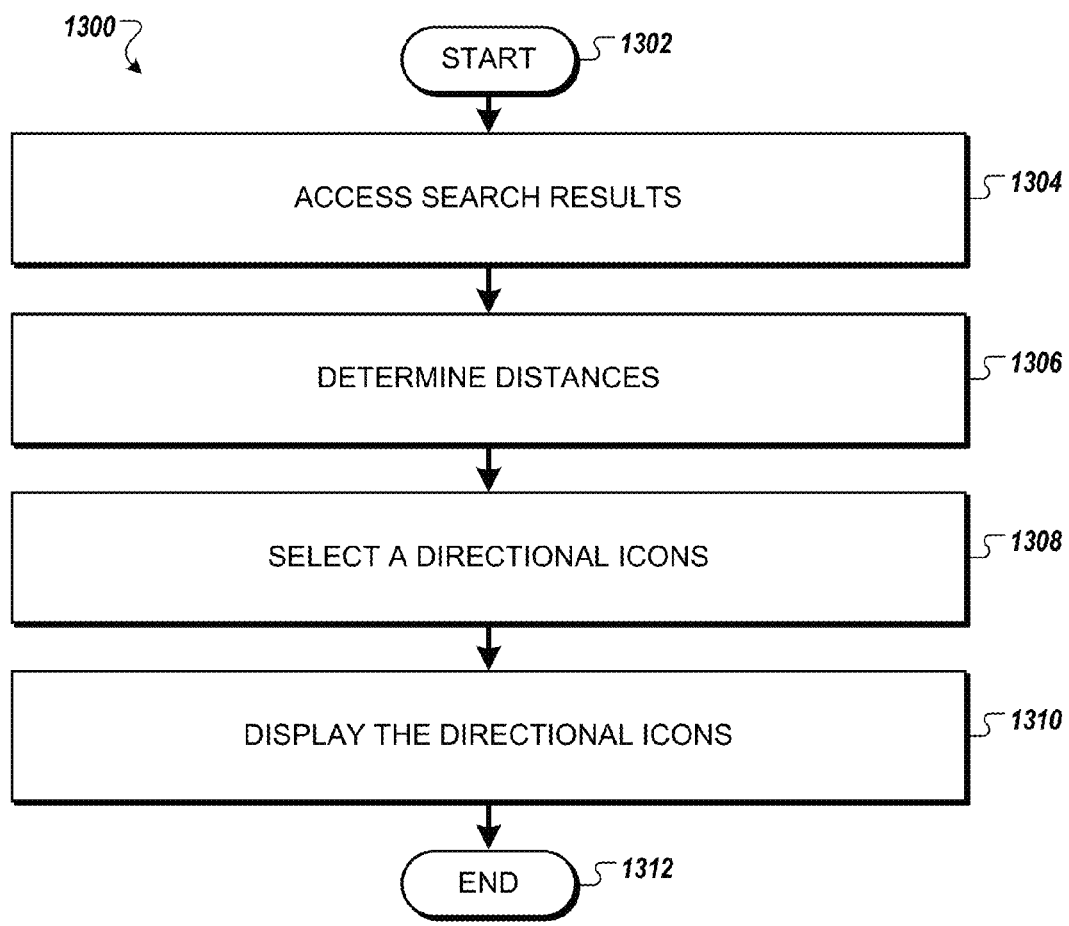

FIG. 13 is a flowchart illustrating a computer-implemented process 1300 for selecting directional icons for POIs that are identified in search results. Briefly, the process 1300 includes: accessing, by a mobile device, two or more search results, each of the search results identifying a respective POI; determining a distance between the mobile device and each POI; selecting a directional icon for each POI based on the distance to the respective POI; and displaying, by the mobile device, information identifying the POI and, for each POI, the directional icon selected for the respective POI.

In further detail, when the process 1300 begins (1302), two or more search results are accessed by a mobile device, with each of the search results identifying a POI (1304). Search results may be received through a network connection with a search engine. For example, a user may enter a query term through a user interface of the mobile device, and may indicate that a query should be executed by the search engine. In this case, the mobile device may transmit the query term to the search engine over the network connection, and the search engine may execute the query and transmit the search results back to the mobile device over the network connection. The query may be executed without the user's direct intervention, such as, for example, by having the mobile device automatically transmit its location to the search engine in order for the search engine to identify nearby, interesting POIs, using the processes described above.

Alternatively, when the mobile device includes a search application, the search results may be generated by the mobile device itself. For example, if the mobile device includes the POI databases or query databases for several surrounding geographic areas, the mobile device may use these databases to identify nearby, interesting POIs. Whether the search results are generated by the search engine and are transmitted to the mobile device, or whether the search results are generated by the mobile device, they may be stored on a computer readable medium (or other signal carrier) on the mobile device, and accessed by the mobile device from this medium.

In addition to the techniques for identifying interesting POIs described above, the search results may be generated using any type of search techniques, including a relevance-based or popularity-based search technique. The search results may include information identifying the POIs, as well as information identifying the location of the identified POIs. This information may include data, or links to data. The search results, and detailed information regarding POIs identified in the search results, may be pre-cached to the mobile device for display to the user through the user interface.

A distance between the mobile device and one or more of the POIs is determined (S1306). The location of the mobile device may be determined using GPS functionality, dead reckoning, or any other location determining technique. The location of the POIs may be determined by accessing a location database (e.g., business directory 340, FIG. 3) which stores information identifying POIs, and geographic coordinates associated with each identified POI. A distance may be calculated for all of the POIs identified in the search results, or for some subset of these POIs. For instance, distances may be calculated for the POIs that will be displayed on the user interface in an initial state, while distances for the POIs that will not be displayed on the user interface in the initial state may not be calculated.

Once the location of the mobile device and the POIs are identified and the distances to each POI are determined, other information may also be determined, including a relative direction from the mobile device to each POI. Since the mobile device may include an internal compass, the relative direction may correspond to a compass heading from the mobile device to the POI. Alternatively, the default viewing or usage orientation of the mobile device may be taken into consideration when determining a relative direction to a POI. In most instances, a POI located directly ahead of the physical top or front of the mobile device, or viewed through a camera viewfinder of the mobile device, has a relative direction of 0°, a POI located to the physical left side or right side of the mobile device has a relative direction of 90° or 270°, respectively, and a POI located toward the physical bottom or rear of the mobile device has a relative direction of 180°.

These relative directions may be automatically or manually adjusted in response to changes in the default viewing orientation, for example if the user switches from a "portrait" viewing mode to a "landscape" viewing mode by rotating the mobile device 90° counterclockwise. In this instance, a POI located directly ahead of the physical top or front of the mobile device has a relative direction of 270°, a POI located to the physical left side or right side of the mobile device has a relative direction of 180° or 0°, respectively, and a POI located toward the physical bottom or rear of the mobile device has a relative direction of 90°.

A directional icon is selected for each POI, based on the distance to the respective POI (S1308). The directional icon is selected from among multiple possible directional icons, and may be a two-dimensional directional icon or a three-dimensional directional icon. At a minimum, the directional icon indicates the direction or position of a POI relative to the mobile device, although the directional icon may also convey other information.

Figure 14C:
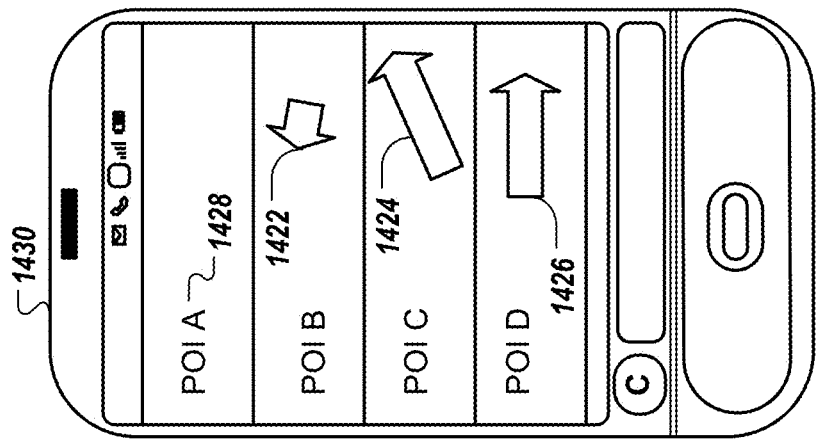
Figure 14B:
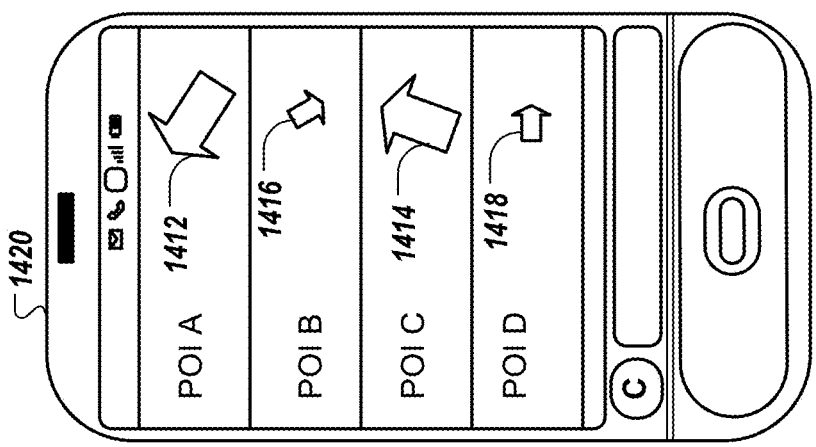
Figure 14A:
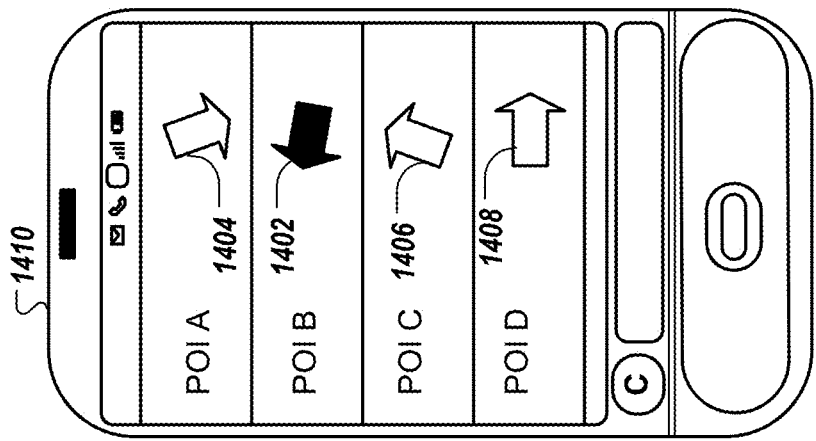

One type of icon (e.g., a colored directional icon) may be selected for one subset of the POIs, and another type of directional icon (e.g., a black-and-white directional icon) may be selected for another subset of the POIs. As shown in FIG. 14A, a black directional icon 1402 is selected for one of POIs ("POI B"), and white directional icons 1404-1408 are selected for the remaining POIs ("POI A," "POI C," and "POI D"). A black directional icon may be selected, for example, for the POI that is closest to the current location of the mobile device 1410, and white directional icons may be selected for those POIs which are not closest to the current location of the mobile device 1410. Alternatively, black directional icons may be selected for the N closest POIs, where N is any positive integer (e.g., 3), and white directional icons may be selected for the remaining displayed POIs which are not the N closest POIs.

The black directional icon 1402 may have a solid or persistent black color, or the black directional icon 1402 may flash or change color back and forth between black and white, to grab the user's attention. In selecting a flashing or color-changing directional icon, the user may visually filter the POIs more quickly, to identify the closest POI and the relative direction to the closest POIs.

Depending upon the distance between the mobile device and corresponding POI, the directional icons may bounce at different speeds, pulsate, appear to expand or contract, flash or be otherwise highlighted to indicate that a POI is nearby, or that a particular POI is relatively closer than other displayed POIs. The flashing or change of color of the black directional icon 1402 may occur at a predetermined rate, such as three changes or flashes per second.

In addition to or instead of merely pointing toward a POI, the directional indication may provide some other indication of the user's position in relation to the POI. For instance, instead of an arrow icon which might indicate that a user should travel in a certain direction to reach a POI, a bull's-eye icon might indicate that the user is already near a POI, or an "X" icon might indicate that the POI is simply too far away for the user to attempt to reach. Thus, other contextual information about a POI may be gleaned from the directional icon based on the type of icon selected for a POI, or based on certain visual characteristics of the icon. For example, the color, shape, motion, or other visual characteristics of an icon may reflect the distance to a POI, may indicate whether the POI is sponsored, or may indicate that a certain event or condition is occurring at the POI.

In one example, the motion of a directional icon may be used to distinguish POIs which are closer to the user's current location from others POIs which are further away, or to identify all POIs that are located within a certain predetermined distance of the mobile device. Specifically, the directional icon associated with the closest POI, or the directional icons associated with the POIs located within a predetermined distance, may be animated to bounce or pulsate. If more than a certain number (or percentage) of the POIs are determined to be within the predetermined distance, a bouncing or pulsating directional icon may only be selected for some subset of the qualifying POIs, to reduce the number of attention-grabbing directional icons displayed on a single user interface.

Where such motion is used, a single glance at a particular directional icon indicates not only whether the associated POI is close, but also, based on the relative position of the directional icon on the user interface, how interesting the associated POI is relative to the other identified POIs. The user may find it easier and more enjoyable to obtain information about a POI by quickly glancing at its associated icon, rather than by reading textual data which describes this same information.

While a single attention-grabbing directional icon among a large number of directional icons may help the user quickly select a POI to visit, if most or all of the directional icons are intended to grab the user's attention, the user might not be able to quickly visually filter one POI from another. Accordingly, the selection of attention-grabbing elements or visually stimulating characteristics of a directional icon may be performed selectively, to take into account the limited attention of the user, and to increase the user's ability to visually filter or distinguish among multiple POIs, especially where each POI may be noteworthy for different reasons.

Other than color and motion, different visual characteristics of the directional icons may be adjusted to grab the user's attention. Specifically, the size of the directional icon may be used as another discriminator to distinguish one POI from another. FIG. 14B illustrates large directional icons 1412-1414 and small directional icons 1416-1418 displayed on a mobile device 1420. The large directional icons 1412-1414 may be selected for POIs that are within a predetermined distance (e.g., one hundred feet, one quarter mile) of the mobile device 1420.

The size of the directional icons 1412-1418 may be inversely proportional to the distance to the respective POI. For example, the directional icon 1412 may be larger than the directional icon 1416 to indicate that the "POI A" (associated with the directional icon 1412) is closer to the mobile device 1420 than the "POI B" (associated with the directional icon 1416). Larger directional icons may be considered more attractive or easier to notice, and may thus be used to draw more attention to nearby POIs. In contrast, the size of the directional icon may be proportional to the distance to the respective POI. For example, the directional icon 1418 may be smaller than the directional icon 1414 to indicate that the distance to the "POI D" is less than the distance to the "POI C".

Other approaches and types of directional icons may be used to indicate relative distance to an associated POI. For example, FIG. 14C illustrates a short-tailed arrow directional icon 1422 and long-tailed arrow directional icons 1424-1426 displayed on a mobile device 1430. The short tail on the directional icon 1422 may indicate that the distance to the respective POI "B" is relatively short, as compared to longer distances represented by the long tails on the directional icons 1424 and 1426. For some POIs, a directional icon may not be shown. For example, no directional icon is shown for a "POI A" 1428, perhaps because the distance to the "POI A" 1428 is greater than a threshold distance, or because the distance to the "POI A" cannot be determined.

Figure 14D:
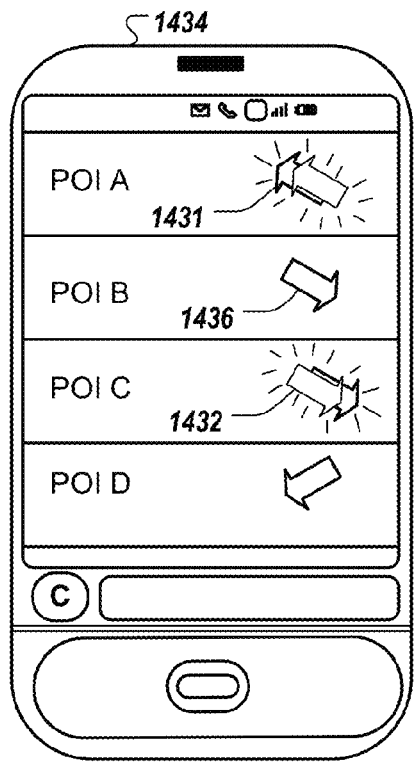

A directional icon may be animated to appear to bounce or pulsate to attract the user's attention. For example, FIG. 14D illustrates bouncing-arrow directional icons 1431 and 1432 displayed on a mobile device 1434. A bouncing directional icon 1431 or 1432 may be selected instead of a non-bouncing directional icon 1436 if the distance to the respective POI is less than a threshold distance (e.g., one mile). As another example, a quickly-bouncing directional icon may be selected for POIs located within a threshold distance of the mobile device 1434, and a slowly bouncing directional icon may be selected for POIs located greater than a threshold distance from the mobile device 1434. For example, if a threshold is defined as five hundred feet and if the POI "A" is two hundred feet away from the mobile device 1434, the directional icon 1431 may bounce "quickly" at a rate of one hundred times per minute and if the POI "C" is one half mile away from the mobile device 1434 the directional icon 1432 may bounce "slowly" at a rate of thirty times per minute. The definition of "quickly" versus "slowly" may be based on constant values, such as one hundred bounces per minute (for quickly) or thirty bounces per minute (for slowly), or "quickly" and "slowly" may be relative terms that may be based, for example, on a known "slow" or "quick" value. For example, "quickly" may be defined as "twice as fast as slowly" (e.g., if "slowly" is defined as twenty bounces per minute, "quickly" may be defined as two times twenty, or forty bounces per minute).

As the mobile device 1434 moves, directional icons may change in appearance to become more or less attention-grabbing, based on a change in distance between respective POIs and the mobile device 1434. For example, the distance between "POI A" and the mobile device 1434 may be determined at a first time and at a second time. If the distance between the mobile device 1434 and "POI A" has decreased, the respective directional icon 1431 may be animated to bounce at a faster rate. Conversely, if the distance between the mobile device 1434 and "POI A" has increased, the directional icon 1431 may be animated to bounce at a slower rate.

Other types of directional icons may change in appearance to become more or less attention-grabbing based on a change in distance between a respective POI and a mobile device. For example, the directional icon 1402 (FIG. 14A) may change to have a lighter color if the distance between the mobile device 1410 and POI "B" increases, and the directional icon 1404 may change to have a darker color if the distance between the mobile device 1410 and POI "C" decreases. As another example, the directional icon 1412 (FIG. 14B) may change to a smaller size if the distance between the mobile device 1420 and POI "A" increases, and the directional icon 1416 may change to a larger size if the distance between the mobile device 1420 and POI "B" decreases. As yet another example, the directional icon 1422 (FIG. 14C) may change to have a longer tail if the distance between the mobile device 1430 and POI "B" increases, and the directional icon 1424 may change to have a shorter tail if the distance between the mobile device 1430 and POI "C" decreases.

Figure 14E:
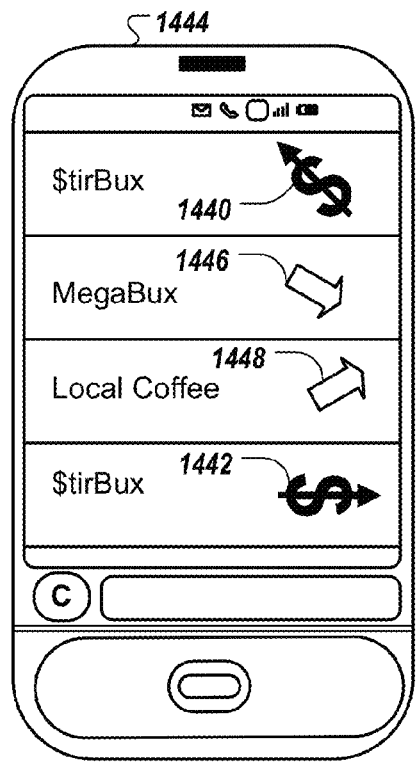

Directional icons may be selected based on whether respective POIs are sponsored. A directional icon for a sponsored POI may be a logo or symbol which represents or identifies the POI. For example, FIG. 14E illustrates directional icons 1440 and 1442 displayed on a mobile device 1444. The directional icons 1440 and 1442 are logos of a sponsored "$tirBux" coffee house POI. The directional icons 1440 and 1442 point to different "$tirBux" locations. The directional icon 1440 indicates that a first "$tirBux" location is located forward and to the left of the current location and heading of the mobile device 1444 and the directional icon 1442 indicates that a second "$tirBux" location is located to the right of the current location and heading of the mobile device 1444. Default directional icons 1446-1448 point to unsponsored "MegaBux" and "Local Coffee" POIs, respectively. The directional icons 1440 and 1442 may change in appearance to become more or less attention-grabbing based on a change in distance between the respective POI and the mobile device 1444. For example, the directional icons 1440 and 1442 may bounce more quickly or more slowly, grow larger or become smaller, become darker or lighter in color, or become higher contrast or lower contrast.

Figure 14F:
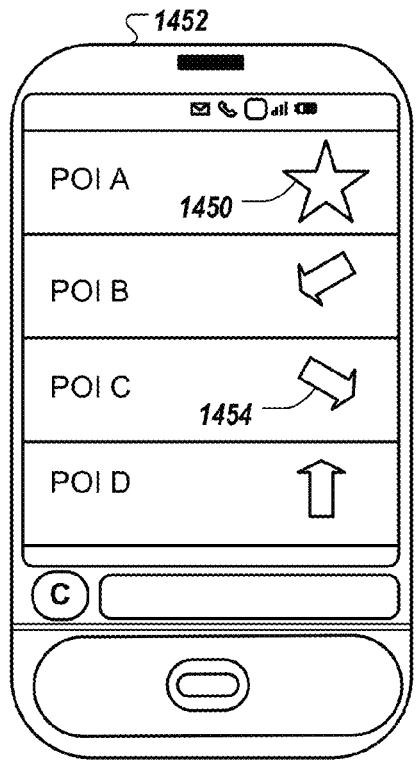

A "star", "bull's eye" or other-shaped directional icon may be used to indicate that a mobile device has "arrived" at a POI (e.g., moved to within a predetermined distance, such as one hundred feet, of a POI). For example, FIG. 14F illustrates a star directional icon 1450 displayed on a mobile device 1452. The star directional icon 1450 indicates that the mobile device 1452 is within a threshold distance (e.g., one hundred feet) of "POI A". If the mobile device 1452 moves such that the distance between the mobile device 1452 and "POI A" is more then the predetermined distance, the star directional icon 1450 may change to another icon, such as an arrow-shaped directional icon 1454 (with the arrow pointing at POI "A").

Figure 14G:
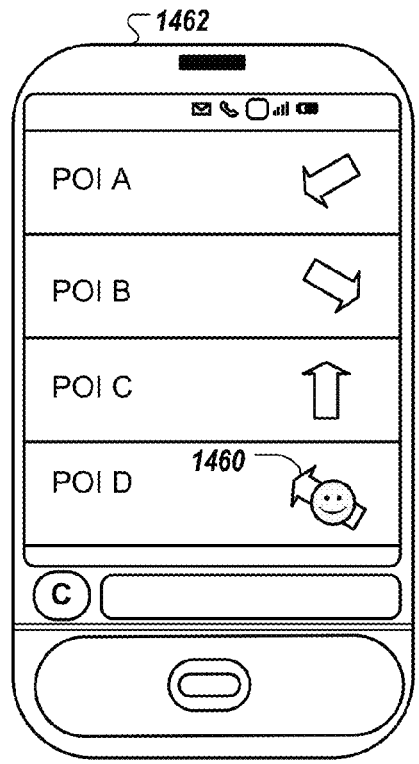

A directional icon may be selected based on the receipt of a signal which identifies one or more POIs. The signal may indicate, for example, that a friend is visiting a nearby POI. A signal may be received by a user's mobile device from the friend's mobile device or a signal may be sent from the friend's mobile device to a server, with the server sending a signal to the user's mobile device. FIG. 14G illustrates a directional icon 1460 displayed on a mobile device 1462. The directional icon 1460 includes a "smiley face" to indicate that a friend is located at POI "D". The directional icon 1460 may include other shapes, such as an icon of a person, or may include a digital image of the friend, if available.

As another example, a signal may be received which indicates that a sale or promotion is occurring at the POI. A promotional directional icon which indicates the occurrence of the promotion may be selected for the POI. The owner or operator of the POI may pay for the promotional directional icon to be selected for the POI.

If a search result does not correspond to a particular POI, for example where the search result identifies a franchise with constituent POIs in multiple geographic areas, no directional icon may be selected, or a directional icon may be selected based on the closest constituent POI, a randomly selected constituent POI, or a most frequently visited constituent POI.

Figure 15:
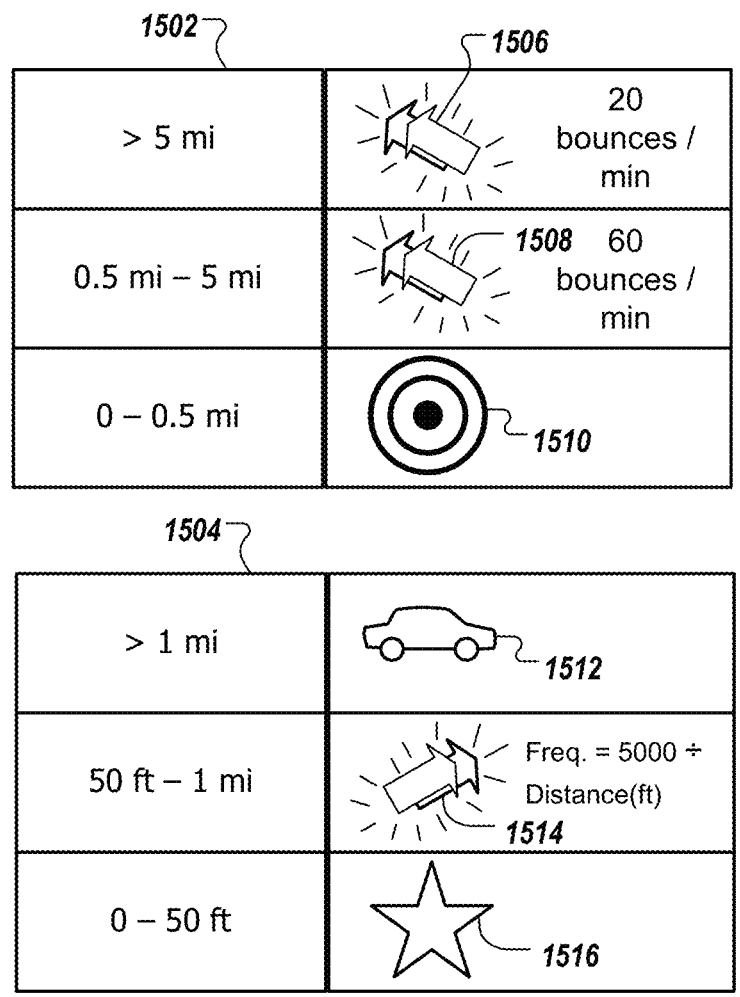
FIG. 15 illustrates the selection of directional icons.

FIG. 15 illustrates two example tables that may be used for selecting directional icons based on the speed of a mobile device and distance between the mobile device and a POI. Table 1502 illustrates a high mobility scenario (e.g., the mobile device is traveling in a car) and table 1504 illustrates a low mobility scenario (e.g., the speed of the mobile device is walking speed). For the high mobility scenario, a slowly bouncing arrow directional icon 1506 may be used for a POI if the distance between the mobile device and the POI is greater than five miles, and a quickly bouncing arrow directional icon 1508 may be used if the distance is between one half mile and five miles.

The directional icons 1506-1508 may bounce at different speeds, based on the distance between the respective POI and the mobile device. For example, the directional icon 1506 may bounce at a rate of twenty bounces per minute and the directional icon 1508 may bounce at a rate of sixty bounces per minute. A bull's-eye directional icon 1510 may be used if the distance between the POI and the mobile device is less than one half mile, to indicate that the mobile device has "arrived" at the POI.

For the low mobility scenario shown in table 1504, a car-shaped directional icon 1512 may be selected for POIs located more than one mile away from the mobile device. Since the user may be walking or otherwise traveling at a low speed in the low mobility scenario, the car-shaped directional icon 1512 indicates that the distance to the respective POI is likely "too far to walk". A bouncing arrow directional icon 1514 may be selected for POIs located between fifty feet and one mile from the mobile device. A star directional icon 1516 may be used if the distance between the POI and the mobile device is less than fifty feet, to indicate that the mobile device has "arrived" at the POI.

A formula may be used to determine the bounce or pulsation frequency for animating the directional icon 1514, where the frequency represents the quantity of bounces or pulsations per unit time. For example, the quantity of bounces or pulsations per minute may be calculated as shown in Equation (1), below:

$$\text{Frequency(bounces or pulsations/minute)} = \frac{5000}{\text{distance from mobile device to POI(ft)}} \quad (1)$$

Using Equation (1), the bounce or pulsation frequency increases as the distance between the mobile device and the respective POI decreases. If, for example, the distance is two hundred feet, the directional icon 1514 bounces or pulsates slowly at twenty five times per minute. If the distance is fifty feet, the directional icon 1514 bounces quickly at one hundred times per minute.

Returning to FIG. 9, information identifying the POIs is displayed on the mobile device, as are the directional icons selected for the POIs (S1310), thereby ending the process 1300 (S1312). For example, FIGS. 14A to 14G illustrate mobile devices 1410, 1420, 1430, 1434, 1444, 1452, and 1460 which each display POI names along with respective directional icons.

Figure 16:
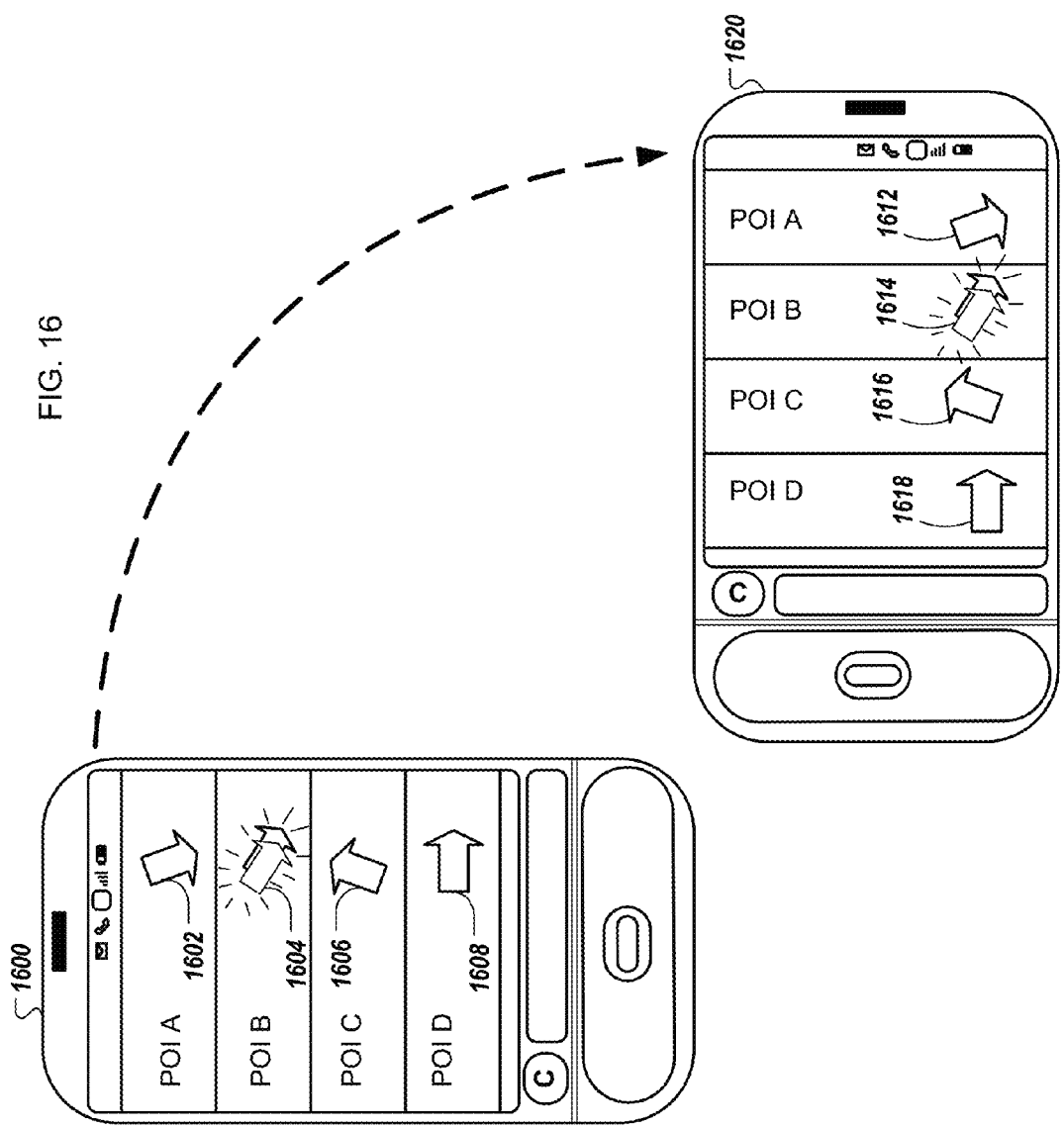

FIG. 16 illustrates animating the directional icons to remain pointed at a POI, based on detecting a change in orientation of a mobile device 1600. In FIG. 16, the top of the mobile device is associated with a 0° relative direction. The mobile device 1600 displays directional icons 1602-1608. Mobile device 1620 represents the mobile device 1600 rotated 90° clockwise. The directional icons 1602-1608 are displayed on the mobile device 1620 as directional icons 1612-1618, respectively. Each of the directional icons 1612-1618 have been animated to remain pointing toward the associated POIs, despite the change in orientation of the mobile device 1620.

As illustrated in FIG. 16, directional icons 1602, 1606, and 1608 are referred to as "static" icons because they do not "bounce" like the directional icon 1604. However, the directional icons 1602, 1606, and 1608, as well as the directional icon 1604, may, in response to an orientation change of the mobile device 1600, "move," or be animated to remain pointed toward their respective POI, despite being referred to as "static."

Figure 17:
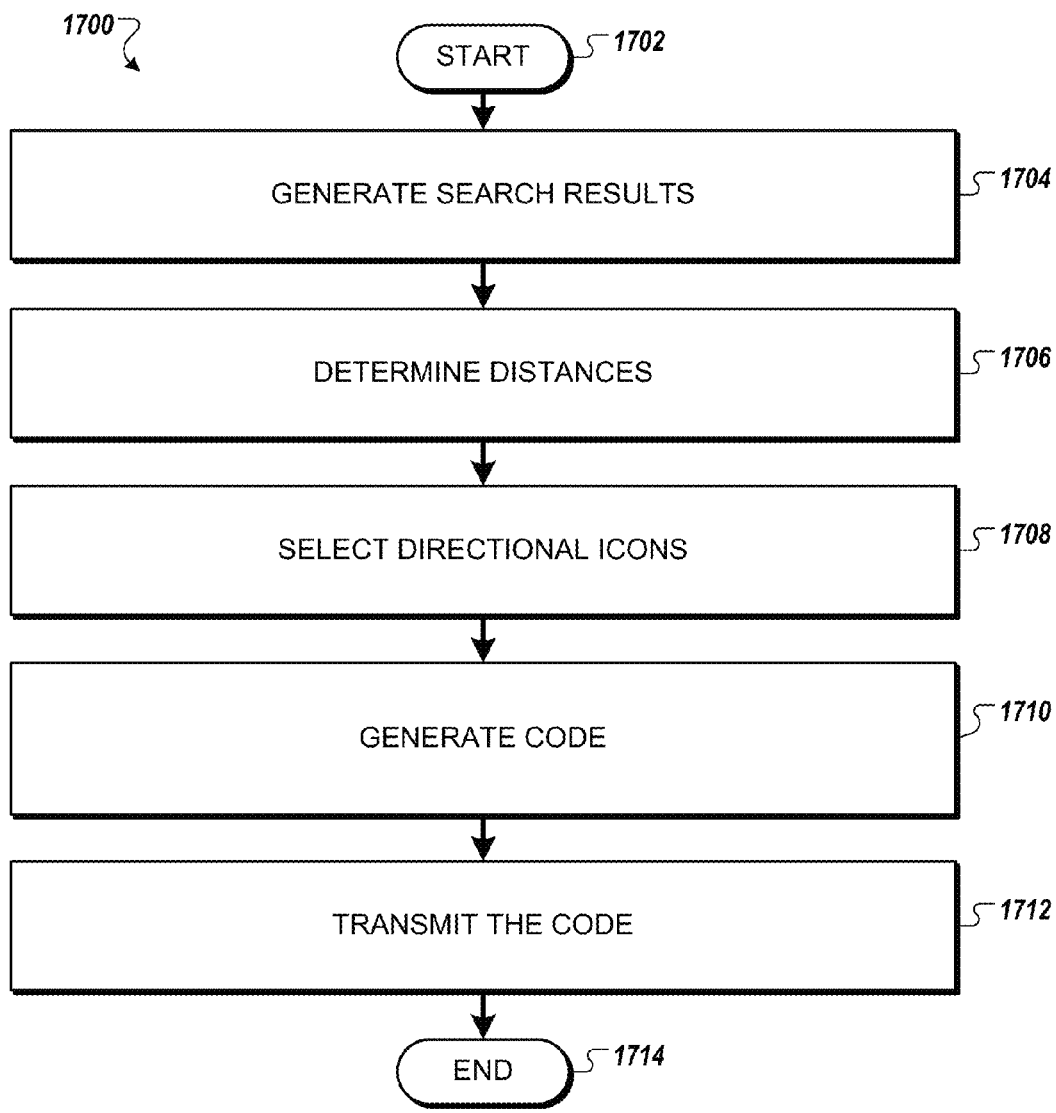

FIG. 17 is a flowchart illustrating a computer-implemented process 1700 for selecting directional icons for POIs. Briefly, the process 1700 includes: generating, by a search engine, two or more search results, each of the search results identifying a respective POI; determining a distance between a mobile device and each POI; selecting a directional icon for each POI based on the distance to the respective POI; generating code which, when invoked by the mobile device, causes the mobile device to display information identifying the POIs and, for each POI, the directional icon selected for the respective POI; and transmitting the code from the search engine to the mobile device. Unlike the process illustrated in FIG. 13, in process 1700 the selection of the directional icons occurs at the search engine instead of the mobile device.

In further detail, when the process 1700 begins (1702), two or more search results are generated by a search engine (1704), with each of the search results identifying a respective POI. For example, search results may be generated by the search engine 342 included in the server 302 (FIG. 3). The search engine 342 may generate search results in response to a user-entered search term. The user may enter a search term using a search interface displayed on a desktop computer or on the mobile device 304 (FIG. 3). As another example, the search engine 342 may generate search results which include POIs which are located within a predetermined distance from the mobile device 304.

A distance between a mobile device and each POI is determined (1706). For example, the mobile device 304 (FIG. 3) may determine and communicate its location to the server 302 over the network 306. The mobile device may, for example, determine its location using the navigation module 332 and the GPS receiver 364. Determining the location of POIs may include accessing a location database such as the business directory 340 of FIG. 3, which stores information identifying POIs, and geographic coordinates associated with each identified POI. Note that if the search results represent POIs which are nearby to the mobile device, the distance between the mobile device and each POI may have been determined as a result of determining nearby POIs.

A directional icon is selected for each POI based on the distance to the respective POI (1708). The selection of directional icons is substantially the same as described for reference S1308 of the process 1300 (FIG. 13), however, in the process 1700 the selection occurs by the search engine.

Code is generated, which, when invoked by the mobile device, causes the mobile device to display information identifying the POIs and for each POI, the directional icon selected for the respective POI (1710). For example, the code generator 344 (FIG. 3) may generate HTML code which may, when executed, result in the display, for each POI, of a POI name and other identifying information along with a directional icon. The generated code may refer to directional icons stored in the directional icon database 339 on the mobile device 304, or the code may refer to directional icons stored in the server 302 (e.g., in medium 312) or stored on another server.

The code is transmitted from the search engine to the mobile device (1712), thereby ending the process 1700 (1714). For example, the code may be transmitted from the server 302 to the mobile device 304 across the network 304 (FIG. 3).

The identification of interesting POIs may be enhanced by boosting the relevance of POIs that have been rated by past visitors of the POI, by local residents of a particular geographic area in which the POI is located, and/or by other past users who have similar characteristics or preferences as the user. Since the usefulness of the identification technique is increased when more ratings are available, users may be encouraged to assign more ratings by removing the barriers which typically prevent or discourage potential raters from critiquing a POI that they have visited.

From the perspective of a potential rater, the hassles associated with typing or otherwise entering information which identifies a particular POI to be rated, or which disambiguates a nearby POI that is to be rated from other POIs which are similarly named but that are nowhere near the user, are often sufficiently burdensome to prevent the potential rater from going through the trouble of assigning a rating. For instance, to assign a rating to a particular outlet of a global coffee shop chain that they are standing in, a potential rater might otherwise need to enter the name of the chain, wait, enter the city of the particular outlet, wait, enter the street on which the particular outlet is located, wait, then perhaps disambiguate among multiple outlets associated with the street, including outlets which are nowhere near the user. This problem is exacerbated when the potential rater is not aware of their specific location to the extent that would be necessary to disambiguate among multiple outlets.

By removing the burdens associated with manually identifying a particular POI, potential raters may be more inclined to rate POIs. To accomplish this, a rating control may be automatically displayed on the user interface of the mobile device to allow the user to quickly assign a rating to the POI as a user's mobile device physically approaches a POI, or perhaps as other criterion are satisfied. Since POIs may automatically be identified based in part upon their proximity to the user, a user would no longer be required to enter identification information for POIs that they visit. Such an approach would encourage users to enter more ratings for more POIs. These ratings may be factored into the scores that are associated with POIs in the various geographic-area-specific databases, rendering low- or high-rated POIs less likely or more likely to be considered interesting or relevant, respectively, than other unrated POIs.

When the information associated with the identified POIs and the directional icons have been displayed, a user input may be received or detected (FIG. 2, 208). For example, a user may refine a query, such as by selecting a different POI category on a user interface. As another example, a user may select a review button or link to review a POI. The user may also select a link or a button to obtain and display detailed information about a particular POI.

FIGS. 18 through 21 generally illustrate the action of displaying a rating control, which occurs when a user selects a review link or button (FIG. 2, 210). The rating control may, for example, allow the user to select a rating (e.g., three out of four stars), and optionally to enter detailed comments about a POI. The review button or link may be displayed when the mobile device is located within a threshold distance of a POI (i.e., it may be determined that a user is in or near a particular POI) or, based on various factors such as the category or service type associated with the POI, when it is determined that the user has probably visited or patronized the POI.

Figure 18:
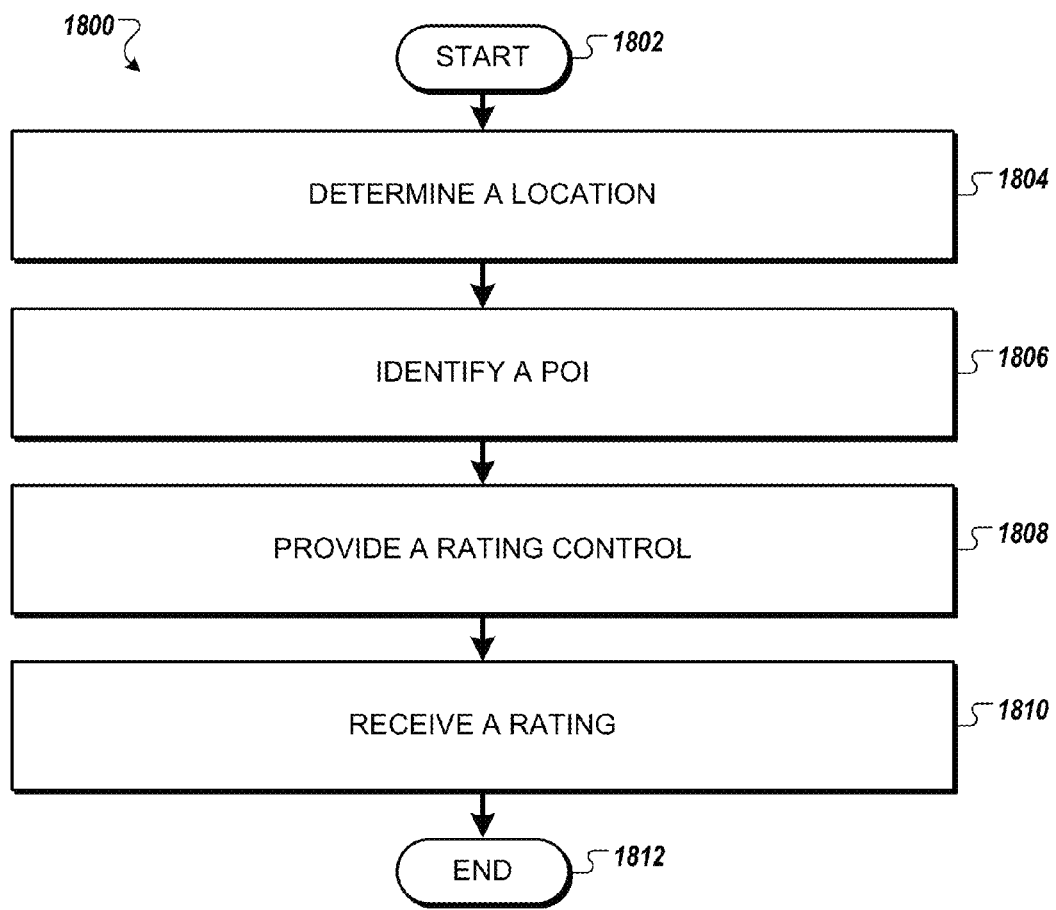

FIG. 18 is a flowchart illustrating a computer-implemented process 1800 for receiving a rating for a POI. Briefly, the process 1800 includes determining a location of a mobile device; automatically identifying a POI located within a predetermined distance of the location; providing, on a user interface of the mobile device, a rating control for allowing the user to rate the identified POI; and receiving the rating for the identified POI from the user, using the rating control. Because the rating may be entered without requiring the user to type in the name or address of the POI to be rated, this process may be referred to as a "no typing" rating process, and the rating control may similarly be referred to has a "no typing" rating control.

In further detail, when the process 1800 begins (1802), a location of a mobile device is determined (1804). In one example, the location of the mobile device may be determined using GPS or other approaches. In another example, a dead reckoning process may be used to estimate the current position of the mobile device based upon a previously determined position. As another example, a camera on the mobile device may capture an image of a landmark or text (e.g., signage) and the mobile device may determine the current location based on the captured image. As another example, the user of the mobile device may directly input the location of the mobile device, such as by selecting a location on a map or by entering an address or other location identifying information, by docking or connecting the mobile device with another device which has a known location, or by automatically parsing the user's appointments to determine where the user is expected to be at a known point-in-time.

Figure 19:
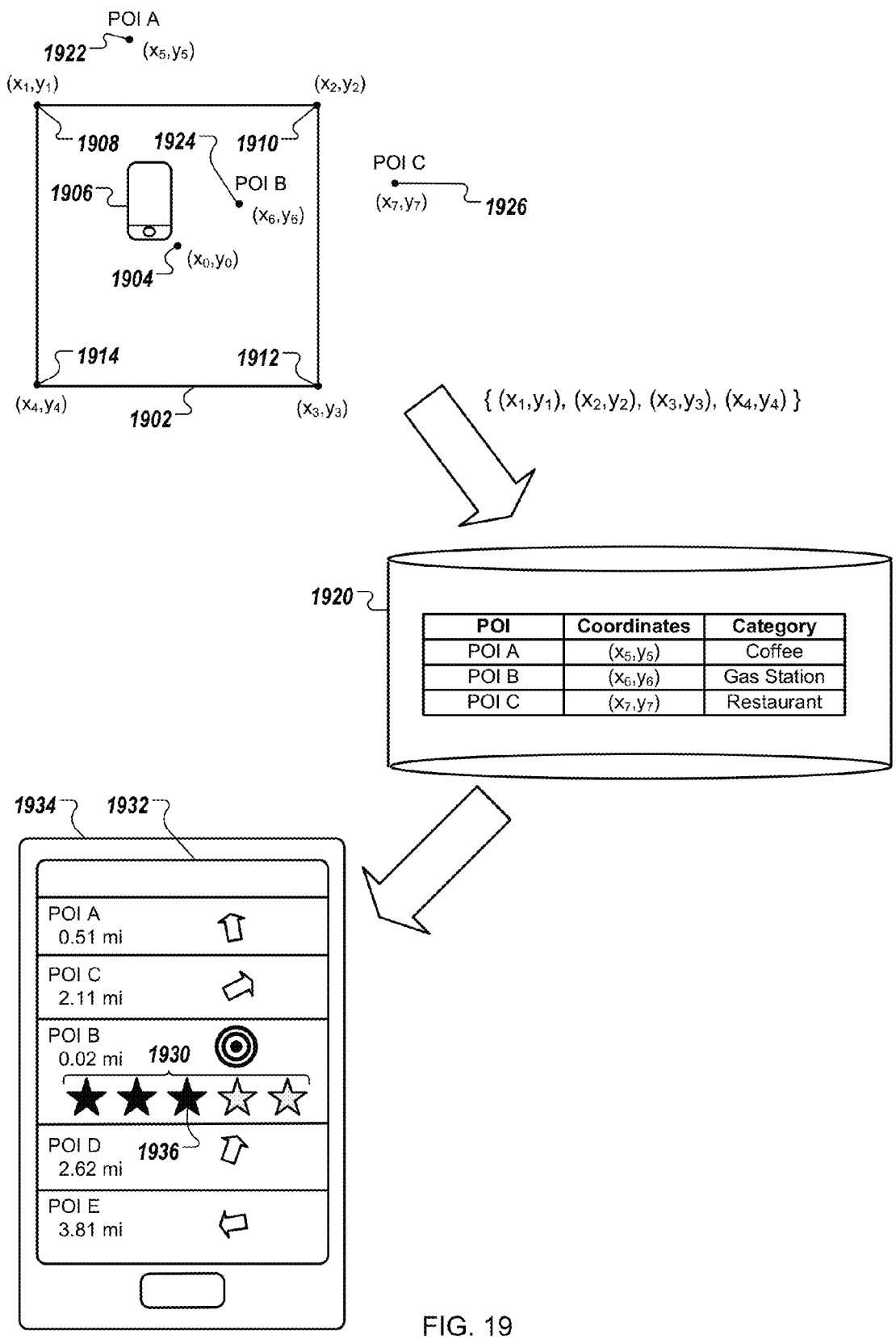

One or more POIs located within a predetermined distance of the mobile device location are automatically identified (1806). For example, a zone of interest within a predetermined distance (e.g., one hundred feet) from the mobile device location may be defined, and POIs within the defined zone of interest may be identified. For example, FIG. 19 illustrates a square zone 1902 defined around a location 1904 of a mobile device 1906. The square zone 1902 may be defined by coordinates 1908-1914. Other types of zones of interest may be defined, such as a rectangular zone, a circular zone, an arcuate zone in a certain direction relative to the mobile device 1906, or a zone of another type of shape. The zone may be a two-dimensional area, or a three-dimensional volume.

Upon defining the zone 1902, a query is be submitted to a business directory 1920, where the query includes query terms which specify the coordinates which define the zone 1902 (e.g., coordinates 1908-1914). The business directory 1920 stores information identifying POIs and geographic coordinates associated with each identified POI. For example, the business directory 1920 stores information indicating that a POI "A" is located at coordinates $(x_5, y_5)$ 1922, that a POI "B" is located at coordinates $(x_6, y_6)$ 1924, and that a POI "C" is located at coordinates $(x_7, y_7)$ 1926.

The business directory 1920 may provide a service where, when a set of input coordinates is provided which define a geographic zone, a data structure (e.g., a list) is provided which identifies POIs that are located within the zone. For example, if the coordinates 1908-1914 which define the zone 1902 are submitted in a query to the business directory 1920, a search, calculation, process or other algorithm may be performed to determine that the POI "B" is located within the zone 1902 and that the POI "A" and POI "C" are located outside of the zone 1902.

Where the service determines that more than one POI is located within the zone 1902, all, a subset, or one of the POIs may be identified. The selection of the subset or the POI may be based on a random selection, a proximity between the POI and the mobile device 1904, confidence or relevance measures, or based on any other criteria. Alternatively, the zone 1902 may be automatically redefined (e.g., to be smaller, or to exhibit a different shape), and the query may be re-executed using the boundaries of the redefined zone. Similarly, if the service determines that no POIs are located with the zone, the zone may be automatically redefined (e.g., to be larger, or to exhibit a different shape), and the query may be re-executed using the boundaries of the redefined zone.

Returning to FIG. 18, a rating control is provided on a user interface of the mobile device for allowing the user to rate the identified POI (1808). For example, FIG. 19 illustrates a rating control 1930 displayed on a user interface 1932 of a mobile device 1934. While the illustrated rating control 1930 is a rating bar that includes a scale of zero to five stars, other types of rating controls may be provided, including star rating bars which use fewer or more stars, or icons other than stars. For example, one or more check boxes, command buttons, option buttons, slider bars, text boxes, or graphical buttons may be provided. Graphical buttons may be provided in pairs. For example, "smiley face" and "sad face" buttons, or "thumbs up" and "thumbs down" buttons may be provided. As will be discussed in more detail below, in some implementations, the rating control is provided after different criteria, other than distance or proximity criteria, have been satisfied.

Returning to FIG. 18, the rating for the identified POI is received from the user (1810), using the rating control, thereby ending the process 1800 (1812). For example, as shown in FIG. 19, the user may touch a star of the rating control 1930, or control a cursor to hover over the star of the rating control 1930, to indicate their rating of the POI "B." For example, the user has selected a star 1936 to indicate that the rating for POI "B" is "three out of five stars". The received rating may be stored, in association with POI "B", in one or more databases (e.g., review databases or geographic area-specific databases).

In response to receiving the user's rating, the user may be clustered with other users, based on a similarity of the rating with the ratings for the POI collectively received from the other users. For example, a user may highly rate certain types of coffee shops and may be clustered with other users who provide similar ratings. In response to receiving the user's rating, or at other times, a different POI may be identified that other users in the cluster have rated highly. The different POI may be recommended to the user, such as by displaying identifying information about the recommended POI on the user interface of the mobile device. In general, the user's rating is received without requiring the user to input identification information associated with the identified POI (e.g., to type in the name or location of "POI B"). In other words, the rating control 930 provides "one-click rating," with "no typing required" features for the user, which provide advantages over other approaches for receiving user ratings.

In other approaches, before entering a rating, a user may be required to select a rating interface, to type in the name and address of a POI, and to disambiguate between similarly named POIs. In doing so, the user may elect to delay the entry of a rating until a later time, in which case the user may fail to remember to enter the rating, may provide fewer detailed comments, or may forget certain aspects of their visit which might affect the accuracy of the rating. The relative inconvenience of entering a rating under this approach may discourage users from providing ratings. In contrast with the enhanced approach, the rating control 1930 may be automatically presented to the user when it has been determined that the user is at or near the respective POI, at which time the accurate rating for the POI may be assigned in a timely fashion, with a single touch or click.

If another type of rating control is used, the rating may be received by the user as a result of the user interacting with the control. For example, some rating controls may allow a user to assign a letter grade (e.g., "A", "B", "C", "D", "F") or a numerical rating (e.g., from 1 to 10), such as by selecting an option button or check box or by entering a value. The user may interact with a check box or a pair of option buttons to indicate, for example, a "yes/no," "like/dislike," or a "recommend/don't recommend" rating. A rating control may be a one or two-dimensional slider bar which a user may slide from left to right or from top to bottom to indicate their relative satisfaction with various aspects of the POI. If graphical icons are used, a user may select a "smiley face" or "thumbs up" button to indicate a positive rating and a "sad face" or "thumbs down" button to indicate a negative rating.

One or more POI and/or query databases may be updated in response to receiving a rating from a user. In other words, one or more databases may be updated to account for the fact that, by rating a POI, the user expressed interest in the POI, and that the POI is relatively more or less interesting than other POIs. Reviewing a POI is another trigger of POI or query database updates, in addition to updates triggered from other selections of POI information on a mobile device (e.g., detailed information) or selection of a POI on an interface such as the user interface 400 (FIG. 4). A user who has had recent experience with the POI and who subsequently rates a POI may have a better perspective than, for example, a user using interface 400 who is perhaps a far distance away from the selected POI. Accordingly, database updates resulting from POI reviews may be given more weight than POI selections from interfaces such as the user interface 400.

Similar to the process illustrated in FIG. 7 (i.e., when an "on-the-scene" user rates a POI), one or more geographic areas are selected, an increment value is selected for each of the selected geographic areas, a score associated with the particular POI is determined for each of the selected geographic areas and is incremented, and the incremented score is stored in association with information identifying the particular POI for each of the selected geographic areas. A low rating may decrement a score associated with a POI in one or more databases (i.e., the increment value may be negative). Because the "on-the-scene" user may have a better perspective of whether a particular POI is a neighborhood gem than a user of a search engine, the increment value selected for the "on-the-scene" user may have a larger magnitude than the increment value that would be selected for the user of the search engine.

Figure 20:
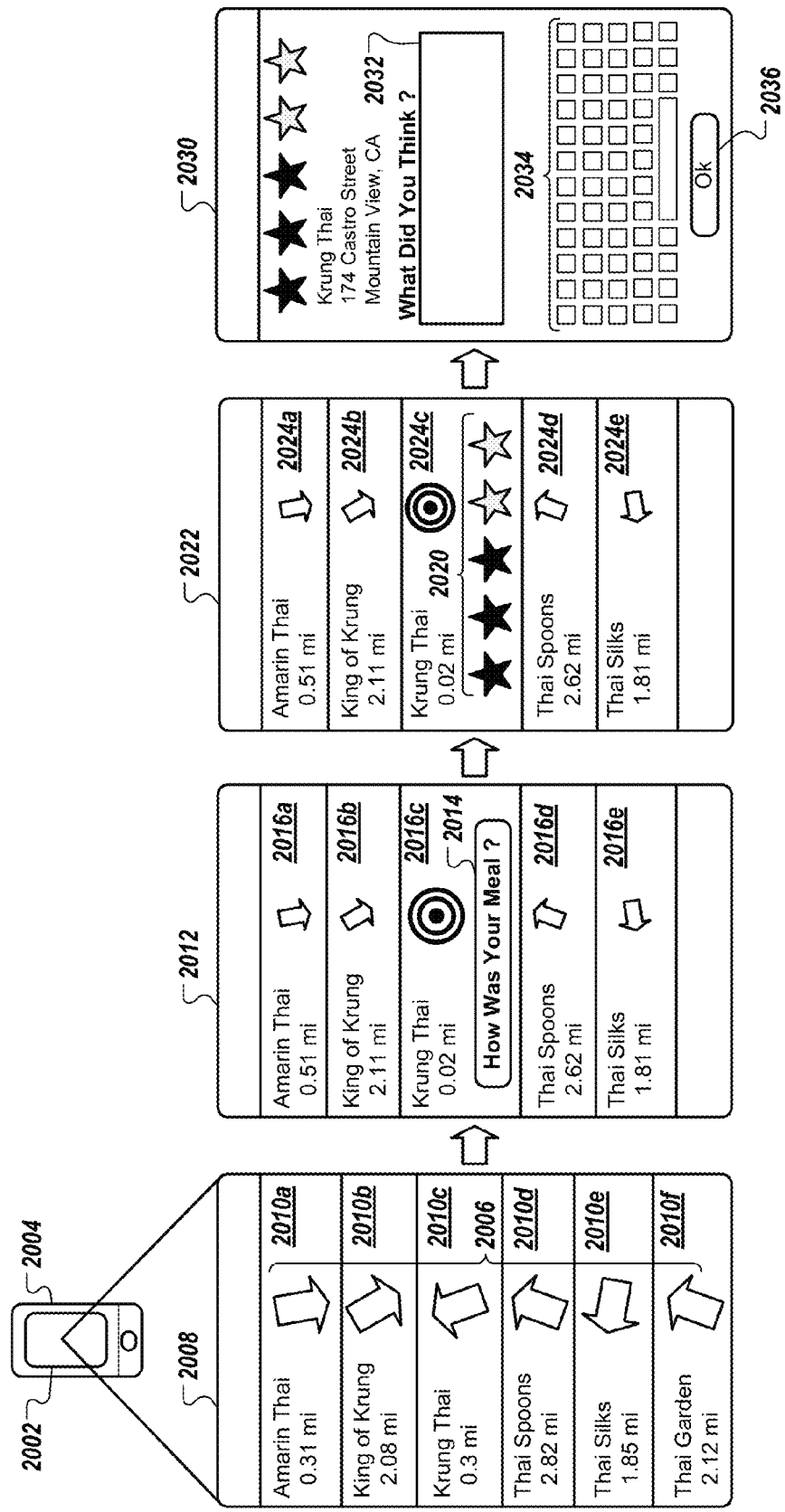

FIG. 20 illustrates other user interfaces for receiving a rating from a user. For example, a user interface 2002 may be displayed on a mobile device 2004. A list of popular, nearby POIs may be displayed, as illustrated by a POI list 2006 displayed on a user interface 2008. The POI list 2006 displays entries 2010*a-f*, where each entry 2010*a-f* includes a POI name or other identifying information, a distance indicator, and a directional icon.

If the mobile device 2004 moves to within a threshold distance of a POI, a rating interest control may be displayed which allows the user to indicate whether they are interested in rating the identified POI. For example, a user interface 2012 includes a rating interest control 2014 displayed in an entry 2016*c*. In this example, the rating interest control 2014 is displayed because the distance between the mobile device 2004 and a "Krung That" POI associated with the entry 2010*a* has dropped below a threshold distance (e.g., 0.05 miles).

In this example, the rating interest control 2014 is a "How Was Your Meal?" button which the user may press to indicate an interest in rating the respective "Krung That" POI. Other types of rating interest controls may be provided. For example, a button or link with "Click Here to Review," "Review," "What did you think?," "Rate," or another caption may be provided. The rating interest control may be a check box or one or more option button controls. The caption of a rating interest control may be customized based on the type of POI. For example, a "How Was Your Meal?" caption may be used if the POI is a restaurant, and a "Rate This Station?" caption may be used if the POI is a gas station. The POI type and associated caption may be retrieved, for example, by querying a business directory (e.g., business directory 1920, FIG. 19).

To accommodate the rating interest control 2014, the height of the entry 2016*c* may increase, as compared to the corresponding entry 2010*c*. Other entries, such as entries 2016*a*, 2016*b*, 2016*d*, and 2016*e*, may be animated to appear smaller, or to have shrunk (e.g., have had their height lessened as compared to the height of respective entries 2010*a*, 2010*b*, 2010*d*, and 2010*e*). In some implementations, the size of the respective directional icons for the entries 2016*a*, 2016*b*, 2016*d*, and 2016*e* may also be animated to shrink in response to the insertion of the rating interest control 2014. The increase in height of the entry 2016*c* may cause some entries to "fall off" the POI list 2006. For example, the entry 2010*f* displayed on the user interface 2008 has been removed from the interface 2012 to make room for the rating interest control 2014. If the mobile device 2004 is moved so that the distance between the mobile device 2004 and the "Krung That" POI is greater than a threshold distance, the rating interest control 2014 may be removed from the user interface 2014, the sizes of the entries 2016*a-e* may be restored to the heights of the respective entries 2010*a-e*, and the entry 2010*f* may be restored to the POI list 2006.

If the user selects the rating interest control 2014, a rating control 2020 may be displayed, as shown on a user interface 2022. The user may use the rating control 2020 to rate the "Krung That" POI, such as by selecting one of the five stars. As discussed above, rating controls other than star rating bars may be used. The rating control 2020 may have the same or a different height than the rating interest control 2014. If the height of the rating control 2020 and the rating interest control 2014 are different, the height of entries 2024a-d may be adjusted, as compared to the height of the respective entries 2016a-e.

In some implementations, an interface 2030 may be displayed after a rating has been received from the user, to allow the user to enter detailed comments. For example, the user may enter comments into a text box 2032. In some implementations, the text box 2032 allows the entry of up to a maximum number of characters (e.g., sixty characters). A virtual keyboard 2034 may be displayed which allows the user to enter alphanumeric characters. The virtual keyboard 2034 may be displayed, for example, if it is detected that the mobile device 2004 does not have a physical keyboard. The user may submit their detailed comments by selecting an "Ok" button 2036.

In response to the detection of the mobile device 2004 being close to a POI, one of a number of user interface flows may be used, using different combinations of interfaces shown in FIG. 20. In some implementations, the interface 2012 is displayed, followed by the display of the interface 2022, followed by the display of the interface 2030. In other implementations, the interface 2012 is not shown, rather the interface 2022 is displayed, followed by the display of interface 2030. In yet other implementations, only the interface 2022 is displayed when the mobile device draws close to the POI.

Figure 21:
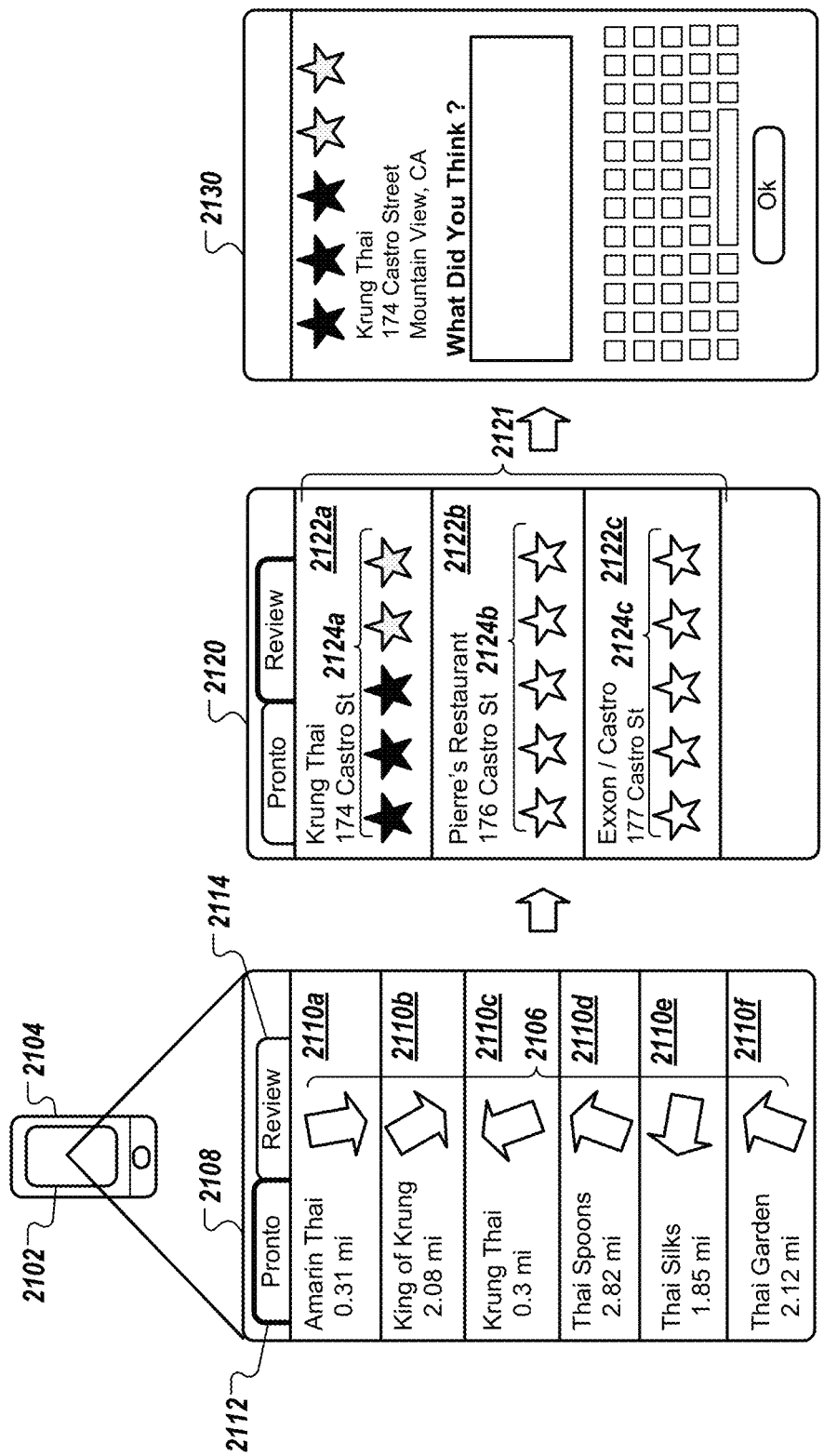

FIG. 21 illustrates other user interfaces for receiving a rating from a user. For example, a user interface 2102 may be displayed on a mobile device 2104. A list of popular or interesting, nearby POIs may be displayed, as illustrated by a POI list 2106 displayed on a user interface 2108. The POI list 2106 displays entries 2110a-f, where each entry 2110a-f includes a POI name or other identifying information, a distance indicator, and a directional icon. The POI list 2106 may be part of a default interface displayed if a tab 2112 is selected. The tab 2112 may be selected by default.

A review tab 2114 may appear if the mobile device is within a threshold distance of one or more any POIs, or within a threshold distance of one or more of the POIs displayed in the POI list 2106. If the mobile device 2104 is moved so that the mobile device 2104 is no longer within a threshold distance of at least one POI, the review tab 2114 may be removed from the interface 2108. Assuming the review tab 2114 is displayed, if the user selects the review tab 2114, an interface 2120 may be displayed.

The interface 2120 includes a review candidate list 2121 which includes review entries 2122a-c, where each review entry 2122a-c includes a rating control (2124a-c, respectively), a POI name or other identifying information, and possibly other POI information, such as an address. The review candidate list 2121 is an example of a disambiguation control, which presents candidate POIs available for the user to review and allows the user to select a POI to review.

The user may interact with one of the rating controls 2124a-c to rate one of the respective POIs. The POIs shown in the interface 2120 may include POIs from the POI list 2106 and may also include POIs not shown in the POI list 2106. The POI list 2106 may be displaying POIs which match a particular query, such as a category query. For example, the POI list 2106 is displaying POIs which have a category of "That Restaurant." The review entries shown on the interface 2120 may be associated with any POI which is within a threshold distance of the mobile device 2104. For example, the review entry 2122b is associated with a restaurant POI that is not a That restaurant (like those shown in POI list 2106), and the review entry 2122c is associated with a gas station POI.

If the user selects a rating control 2124a-c, an interface 2130 may be displayed to allow the user to enter detailed comments. The interface 2130 is similar to the interface 2030, described above with respect to FIG. 20. In some implementations, the interface 2130 is not shown when the user enters a rating.

In some implementations, a rating control is provided after the satisfaction of criteria other than the detection of a POI located within a predetermined distance of the mobile device. Table 7 below lists criteria for various POI categories:

TABLE 7

Example categories and possible criterion other than proximity

| CATEGORY | CRITERIA |
| --- | --- |
| Restaurant | distance <=100 ft |
|  | duration >10 min |
|  | time = 8-10 am, 11-2 pm, 5-7 pm |
| Gas Station | distance <50 ft |
|  | duration >2 min |
|  | fuel level Δ >+2 gal |
| Coffee Shop | distance <=10 ft |
|  | duration >1 min |
|  | wireless signal detected |
| Spa | distance <50 ft |
|  | duration >90 min |
| Retail Store | distance <=25 ft |
|  | duration >=15 min |
|  | credit card charge detected |

If a POI located within a predetermined distance of a mobile device is identified, a category associated with the identified POI may be determined. For example, a category such as "restaurant," "gas station," "coffee shop," "spa," or "grocery store" may be determined by querying a business directory. After a category is determined, one or more criteria associated with the category are determined. For example, the criteria may be determined by accessing a category/criterion database (FIG. 3). A rating control may be provided on the user interface after determining that the criteria have been satisfied.

For example, as shown in Table 7, criteria for a restaurant category may include criteria requiring that the distance between the POI and the mobile device be less than or equal to one hundred feet, that the duration (or "linger" time) be greater than ten minutes, and that the time of day be either between 8 a.m. and 10 a.m., between 11 a.m. and 2 p.m., or between 5 p.m. and 7 p.m. (e.g., during breakfast, lunch, or dinner hours). In this example, the rating control is provided for a restaurant POI if the criteria specified for the restaurant category are satisfied.

Other criteria may be defined for other POI category types. For example, as shown in Table 7, criteria for a "spa" category may include criteria requiring that the distance between the POI and the mobile device be less than fifty feet, and that the duration be greater than ninety minutes. Criteria may be configured based on expected user behavior for POIs of a certain category. For example, the test against ninety minute duration time for spa POIs is longer than the test against ten minutes duration time for restaurant POIs because it may be expected that the duration of a visit to a spa would be significantly longer than the duration of a visit to a restaurant, a coffee shop, or a gas station.

As shown in Table 7, the criteria for a gas station category may require that the distance between the POI and the mobile device be less than fifty feet, that the duration time be greater than two minutes (e.g., gas station visits may be relatively short), and that a fuel level change be a positive increase of at least two gallons. Criteria for a coffee shop category may include criteria requiring that the distance between the POI and the mobile device be less than or equal to ten feet (e.g., coffee shops may be smaller in size than other POIs and therefore to verify that the user is "in" the coffee shop, the distance value to test against may be less than other POIs), that the duration time is greater than one minute (e.g., a person may go in and out of a coffee shop relatively quickly if they are getting their coffee "to go"), and that a wireless (e.g., WiFi) signal is detected (e.g., due to the prevalence of WiFi availability in coffee shops, coffee shop criteria may include WiFi detection as part of verifying a coffee shop visit).

Criteria for a retail store category may include criteria requiring that the distance between the POI and the mobile device be less than or equal to twenty five feet, that the duration time is greater than or equal to fifteen minutes, and that a credit card charge has been detected. Other criteria may be configured for a category, for example requiring that the time of day be during the hours that the store is open (e.g., between 8 a.m. and 5 p.m.) or that the current day not be a weekend or federal holiday.

The gas station, coffee shop, and retail store categories illustrate scenarios where the mobile device (or perhaps, for example, a server device in communication with the mobile device) receives a signal from some other device. For example, while at a gas station POI, the mobile device may receive a signal from a vehicle computing device communicating a delta change in fuel level. As another example, while at a coffee shop POI, the mobile device may detect the presence of a wireless (WiFi) network. As yet another example, while at a retail store, the mobile device may receive a signal (e.g., from a point-of-sale computing device) that a credit card charge has been made. In some implementations, the signal indicating that a credit card charge has been made may be received (e.g., by a server device) some time after (e.g., three hours after) the visit to the retail store. In this example, the rating control may be provided after receiving the signal indicating the credit card charge (e.g., when the user is most likely no longer "in" the retail store).

Various approaches may be used to identify POIs that are predicted to be of interest to a user. Some of these approaches identify POIs based on the user's own past behavior, while others base their identifications on the behavior of other users who have searched for or visited a particular POI in the past, and who have similarities with the user. In either case, once a POI is identified, the user's mobile device displays information that may be used to entice the user to travel outside of their present location in order to visit the POI. For example by displaying helpful navigation information or detailed review, rating, or other contextual information, the user interface may display information that allows the user to decide that a desire or need will be satisfied at the POI, and that the user's time would be well spent by traveling to the POI.

Aside from displaying information regarding POIs in which the user is predicted to be interested, the mobile device may be used to identify a POI that the user is near and can see, and thus has a actual interest in, and to display corresponding contextual information. Thus, in addition to identifying POIs based on the user's own past behavior or on other past user's behavior, the mobile device can also identify POIs based on the user's present behavior (i.e., based on what the user is looking at when a control is selected), and can display detailed information regarding these identified POIs. In this regard, the enhanced identification technique described by this specification may be used in a greater number of situations, facilitating information retrieval regarding POIs in which the user may be interested (when they have not made a specific identification), or regarding POIs in which the user is actually interested or becomes interested, as their interest is piqued.

The identification of a nearby POI by a user may be a better indication that the POI is interesting to the user than other techniques which identify POIs based on past behaviors. That being said, however, a user may identify a POI as appearing interesting, may be presented with detailed information about that POI, may determine based on reading the detailed information that the POI is not in fact interesting, and then may wish to revert to one or more of these other techniques to suggest other POIs that may interest them, based on past behaviors.

To identify a POI that piques their interest, the user may point their mobile device at the POI and press or otherwise select a designated control (e.g., the "Pronto button") on the device, where the control may be a physical button, a soft key, or a software element alone. This identification may occur when the user walks or drives by a POI that strikes them as being interesting. Upon pressing the Pronto button, the GPS location and compass heading of the mobile device are determined, and information regarding one or more of the POIs that are within the field of view of the mobile device is selected and displayed on the user interface.

If the information regarding the POIs is not stored on the mobile device when the Pronto button is pressed, that information may be pre-cached to the mobile device. Where pointing the mobile device means pointing a camera of the mobile device at the POI, the user interface of the mobile device may display a live video feed or image taken at the time the Pronto button is selected, and detailed information about the POI may be overlaid on the screen.

FIGS. 22 through 26 generally illustrate the actions of obtaining and displaying detailed information regarding identified POIs (FIG. 2, 212). These actions may occur when a user selects a link or a button associated with a particular POI on a user interface of a mobile device, or when the user selects a designated button while pointing some portion of the mobile device at a particular POI. The detailed information may include advertisements or promotions corresponding to the POI, video or image data, ratings, reviews, contact information, hours, or other information regarding the particular POI.

Figure 22:
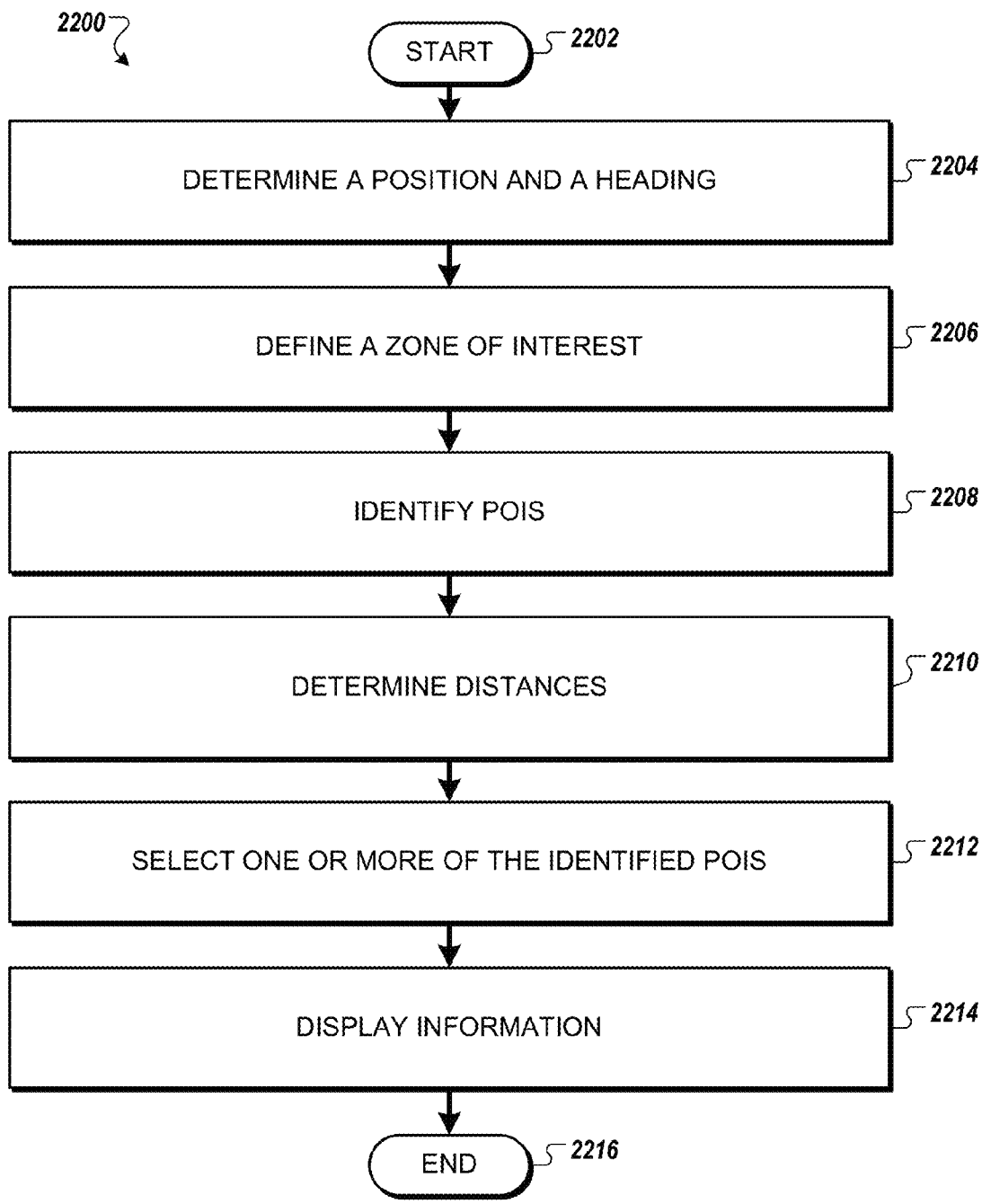

FIG. 22 is a flowchart illustrating a computer-implemented process 2200 for displaying information. Briefly, the process 2200 includes determining a position and a heading of a mobile device; defining a zone of interest based on the position and heading of the mobile device; identifying one or more POIs that are located within the zone of interest; determining, for each of the identified POIs, a distance between the mobile device and the respective POI; selecting one or more of the identified POIs based on the distances; and displaying information identifying the selected POIs on a user interface of the mobile device.

In further detail, when the process 2200 begins (2202), a position and a heading of a mobile device are determined (2204). The location of the mobile device may be determined using GPS techniques, triangulation techniques based on WiFi or cellular tower signals, or using some other technique. The heading of the mobile device may be determined, for example, using the compass 366 (FIG. 3), and may represent a true bearing or magnetic bearing.

As another example, the heading of the mobile device may be determined based on the historical travel path of the mobile device. A historical travel path may be calculated based on the recorded location of the mobile device at various past points in time. For example, the historical path of the mobile device may be plotted over a recent interval (e.g., the past minute or the past five minutes) and an expected travel path may be calculated and used as the heading of the mobile device. Alternatively, the historical travel path or expected travel path may be used to error correct the heading of the mobile device.

A zone of interest is defined based on the position and heading of the mobile device (2206). The zone of interest may be defined based on a field of view of a camera of the mobile device. For example, as illustrated in FIG. 23, a camera of a mobile device 2302 captures an image 2304 which is displayed on a user interface 2306 of the mobile device 2302. The image 2304 includes an image of a street and businesses located on the street (i.e., POI "A" 2308 and POI "B" 2310). In the examples provided by FIGS. 22 to 26, the zone of interest defined by process 2200 is different from the zone of interest defined by process 1700, although the techniques for defining an area or volume of a known size based on an initial starting position are similar. In other examples, the zone of interest defined by process 2200 is the same as the zone of interest defined by process 1700.

A triangular zone of interest 2312 may be defined to align with the field of view of the camera. A first vertex 2314 of the zone of interest 2312 occurs at the position of the mobile device 2302 (e.g., ($x_0$, $y_0$)). Where the zone of interest is triangular, the size of the zone of interest 2312 depends on the height 2316 of the triangular zone of interest 2312. Since the process 2200 is used to identify POIs at which the user is looking, the height 2316 may be selected based upon an expected viewing distance of the user. For instance, in a dense urban environment or if the user is walking slowly, a small height may be selected (e.g., one city block, or 200 feet). In a rural environment, or if the user is driving quickly in a car, a larger height may be selected (e.g., one quarter mile).

Alternatively a preset height or a user selected height may be used, such as, for example, three quarters of a mile, three hundred meters, or one twelfth of one mile (e.g., two city blocks). The zone of interest 2312 may extend a particular number of degrees (e.g., 30°, 45°, 60°, 180°) around the heading of the mobile device 2302, as represented by an angle 2318. The angle may also be selected based upon environmental, speed, user preference or other characteristics. A second vertex 2320 ($x_1$, $y_1$) and a third vertex 2322 ($x_2$, $y_2$) may be defined based, for example, on the position of the first vertex 2314, the selected height 2316, and the angle 2318.

The zone of interest may have a shape other than a triangular shape. For example, the zone of interest may be a circular sector shape. In some examples, a circular sector zone of interest may have a radius length equal to the height 2316. In other examples, the radius length of the circular sector may be greater than the height 2316. Similar to the triangular zone of interest 2312, a first vertex of a circular sector zone of interest may be defined as the position of the mobile device 2302. In other words, the position of the mobile device 2302 may be the center of a circle upon which the circular sector is based. As with the triangular zone of interest, the circular sector zone of interest may extend a particular number of degrees (e.g., 60°) around the position of the mobile device 2302. Second and third vertices may be defined for a circular sector zone of interest, with each vertex located one radius length away from the position of the mobile device 2302.

The size of the zone of interest may be adjusted by changing the angle and distance (i.e., height or radius) values. As noted above, the angle and distance values may be selected based on the speed of the mobile device 2302 or the density of the environment surrounding the user. For example, a larger zone of interest may be used if the mobile device 2302 is traveling at faster speeds, and a smaller zone of interest may be used if the mobile device 2302 is traveling at slower speeds. For example, if the mobile device 2302 is traveling at walking speed, a triangular zone of interest with a height of three hundred feet may be used; and if the mobile device 2302 is traveling in a car at thirty miles per hour, a triangular zone of interest with a height of one quarter mile may be used. As another example, if the mobile device 2302 is not moving, a circular sector zone of interest with a radius of one hundred feet may be used; and if the mobile device 2302 is traveling in a train at ninety miles per hour, a circular sector zone of interest with a radius of one half mile may be used.

Figure 24:
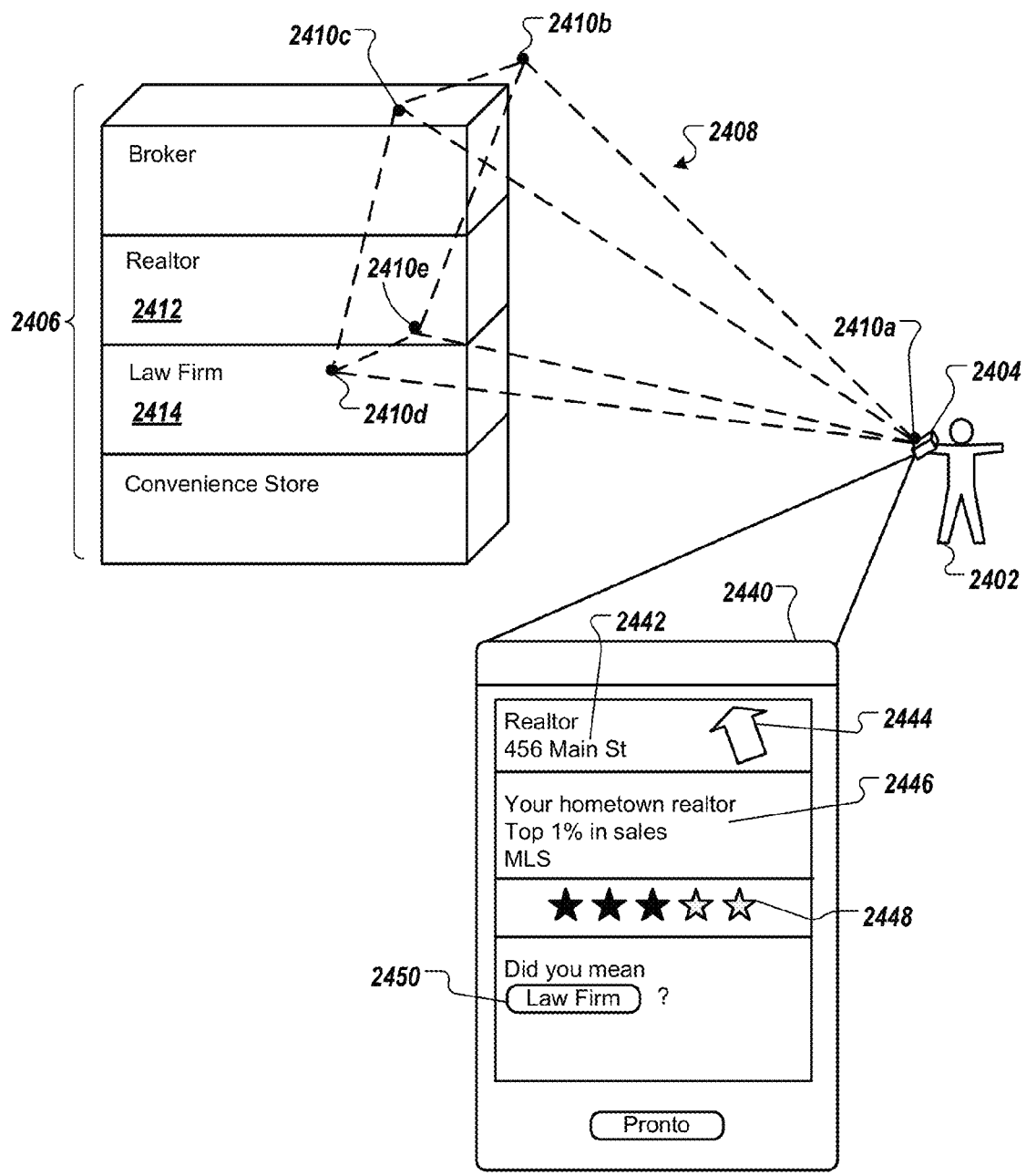

A zone of interest may be defined in two-dimensional (2D), as illustrated in FIG. 23, or a zone of interest may be defined in three dimensions (3D). For example, FIG. 24 illustrates a user 2402 holding and pointing a mobile device 2404 at a building 2406. The user 2402 is pointing the mobile device 2404 so that the field of view of the camera of the mobile device 2404 includes the top three stories of the building 2406, and excludes the first story of the building 2406. A three-dimensional zone of interest 2408 is defined to align with the camera's field of view. The zone of interest 2408 may be defined by vertices 2410a-e, where vertex 2410a occurs at the position of the mobile device 2404.

Returning to FIG. 22, one or more points of interest (POIs) that are located within the zone of interest are identified (2208). For example, a query may be submitted to a business directory, where the query includes query terms which specify the 2D or 3D coordinates which define the zone of interest. For example, for the zone of interest 2312 of FIG. 23, the coordinates defined by the vertices 2314, 2320, and 2322 may be submitted. As another example, the coordinates which define the vertex 2304 are submitted, as are desired zone of interest size or shape characteristics, and the definition of the zone of interest occurs by a search engine or by the business directory itself.

As another example, for the zone of interest 2408 of FIG. 24, the coordinates defined by the vertices 2410a-e may be submitted. The business directory stores information identifying POIs and geographic coordinates associated with each identified POI. For example, in reference to FIG. 23, the business directory stores the coordinates of POIs "A" to "F" (2322 to 2334, respectively). POI "A" 2322 corresponds to building 2308 in the image 2304, and POI "B" corresponds to building 2310 in the image 2304.

The business directory provides a service that, when a set of input coordinates is provided which define a geographic zone, a data structure (e.g., a list) is provided which identifies POIs that are located within the zone. If the business directory stores only 2D coordinates and 3D coordinates are input, the business directory may define a 2D region which represents a footprint of the 3D coordinates, or third dimension coordinates may be ignored.

In the example illustrated in FIG. 23, if the coordinates 2314, 2320, and 2322 that define the zone of interest 2312 are submitted in a query to the business directory, a search, calculation, process or other algorithm may be performed to determine that the POI "A" 2324, the POI "B" 2326, the POI "C" 2328, and the POI "F" 2334 are located within the zone 2312. In this example, the resulting data structure provided by the business directory would not identify the POI "E" 2332 or the POI "D" 2330, since those POIs are located outside of the zone of interest 2312. In the example illustrated FIG. 24, if the coordinates 2410a-d are submitted to the business directory, the business directory may provide a data structure identifying a realtor POI 2412 and a law firm POI 2414, but the other businesses outside of the zone of interest 2408 (i.e., the convenience store) would not be identified.

If no POIs are identified within the zone of interest, the zone of interest may be iteratively increased in size until a POI is identified. For example, a triangular zone of interest with a longer height or wider angle may be defined, or a circular sector zone of interest with a greater radius or wider angle may be defined. Coordinates defining the larger zone of interest may be submitted to the business directory service to determine whether one or more POIs are located within the enlarged zone of interest. If there are still no POIs located within the enlarged zone of interest, the iterative process may again be performed to further enlarge the zone of interest, and the business directory may be re-queried to determine whether there are POIs located within the further enlarged zone of interest.

The iterative process may be performed until the zone of interest reaches a maximum size, until a POI is identified, or until the user halts the process. For example, an iterative process may iteratively enlarge a triangular zone of interest until either one or more POIs are identified within the zone of interest or until the height of the zone of interest is a threshold distance (e.g., two miles). Similarly, if too many POIs are identified within the zone of interest, the zone of interest may be iteratively decreased in size, until a smaller number of POIs are identified.

A distance between the mobile device and each respective POI is determined (2210). For example, for each identified POI, a straight-line distance between the mobile device and the POI may be determined using coordinates of the POI retrieved from the business directory. As shown in Table 8, in the example of FIG. 23, the distance between the mobile device 2302 and POIs "A", "B", "C", and "F" are one hundred feet, ninety five feet, two hundred fifty feet, and two hundred feet, respectively. As discussed in more detail below, these distances may be scaled to take the angle between the mobile device and each identified POI into account.

TABLE 8

Straight-Line Distance Between Mobile Device and Each POI, Raw and Scaled

| POI | Distance | Angle | Scaled Distance |
|-----|----------|-------|-----------------|
| A | 100 ft | −5° | 100 ft |
| B | 95 ft | −25° | 142.5 ft |
| C | 250 ft | +8° | 250 ft |
| D | — | — | — |
| E | — | — | — |
| F | 200 | −19° | 200 |

Returning to FIG. 22, one or more of the identified POIs are selected, based on the distances (S2212). In some implementations, the N closest POIs may be selected, where N is any positive integer. For example, the one single POI which is closest to the mobile device may be selected. As another example, the five POIs closest to the mobile device may be selected, or all POIs within a certain threshold distance may be selected.

In some implementations, the distances between the identified POIs and the mobile device are scaled prior to selection. For example, for each of the identified POIs, an angle between the mobile device and the respective POI may be determined and the distance between the mobile device and the respective POI may be scaled based on the determined angle.

For the example of FIG. 23, Table 8 indicates that the angles between the POIs "A", "B", "C", and "F" and the mobile device 2302 are −5°, −25°, +8°, and −19°, respectively. Angles for POIs disposed to the right of a center line 2336 may have positive values and angles for POIs disposed to the left of the center line 2336 may have negative values. The center line 2336 may itself align with the focal axis of a camera on the mobile device 2302, or a longitudinal or any other axis associated with the mobile device 2302 itself.

Because the user is assumed to be pointing directly at a POI that interests the user, the distances associated with the various identified may be scaled based on the angle, so that the respective distance increases as a magnitude of the angle increases. In other words, the closer a POI is to the center line 2336, the more likely that the user is pointing at that POI, and the less its distance is scaled. Conversely, the further the POI is from the center line 2336, the less likely that the user is pointing at that POI, and the greater its distance is scaled.

In some implementations, the respective distances associated with POIs that are disposed within a threshold angle of the center line 2336 are not scaled (or, put another way, are scaled by a zero amount, or by a factor of 100%). The respective distances associated with POIs that are disposed greater than the threshold angle from the center line 2336 are scaled by a non-zero amount (i.e. are doubled, or are scaled by a factor of 150% or 200%). For example, POIs disposed greater than a magnitude of 30° degrees from the center line 2336 (i.e., less than −30°, or greater than)+30° have their distances scaled by multiplying their raw distance by 150% or by a factor of 1.5, and POIs disposed within a positive or negative thirty degrees from the center line 2336 may have their distances scaled by multiplying their raw distance by 100% or by a factor of 1.0.

A threshold line 2338 is aligned at a −30° from the center line 2336 and a threshold line 2340 is disposed at a +30° from the center line 2336, to define four separate triangles or quadrants within the zone of interest 2312. POIs located to the left of the threshold line 2338 or to the right of the threshold line 2340 may have their distances scaled. In other words, distances for POIs located within the central quadrants of the zone 2312 may be unscaled and distances for POIs located within the outer quadrants of the zone 2312 may be scaled. For example, the POI "B" 2326 is located to the left of the threshold line 2338. Table 8 indicates that the scaled distance for POI "B" is 142.5 feet, a fifty percent increase from the unscaled distance of 95.0 feet. POIs "A", "C", and "F" are each disposed between the threshold lines 2338-2440 and therefore do not have their distances scaled. Table 8 indicates that the scaled distances for POIs "A", "C", and "F" are each equal to the respective unscaled distance.

Although the POI "B" 2326 is physically closer to the mobile device 2302 than the POI "A" 2324 (i.e., the raw, straight line distance associated with POI "B" 2326 is less than the raw, straight line distance associated with POI "A" 2324), the scaled distance for POI "B" 2326 is greater than the scaled distance for POI "A" 2324. Therefore, in implementations where the closest POI is selected and the distance is scaled based on angle, POI "A" 2324 would be selected over POI "B," since POI "A" 2324 has a smaller scaled distance. In implementations where more than one POI is selected, the POIs with the N smallest scaled distances may be selected, where the selected POIs may include POI "A" 2324, POI "B" 2326" and perhaps other POIs.

A graph 2342 illustrates a relationship between angle and scaled amount. The X axis of the graph 2342 represents the angle from the center line 2336 and the Y axis represents the amount that a distance for a POI located at a particular angle is scaled. As shown in the graph 2342, the scaled amount increases as the magnitude of the angle increases. The application of scaling to raw distances based on angles is similar to the application of a fall-off function to scale scores based on geographic-area-distance, as described above, although scaling is applied to increase a raw distance based on an increased angle, while a fall-off function is applied to decrease a score increment based on an increased distance. As suggested by the graph 2342, the scaling function may be a quadratic function, or the scaling function may be any other type of function, such as a step function.

While the threshold lines 2338 and 2340 define four triangle-shaped regions within the zone of interest 2312, in other implementations the thresholds may instead be curved lines or a non-linear series of points, such that the amount of scaling to apply depends on a combination of distance and angle of the POI to the mobile device 2302. Such an approach reflects the reality that, if the user is actually pointing the mobile device 2302 at a POI with reasonable diligence, the accuracy of their pointing is likely to increase for POIs that are located further away, where the POI occupies a much smaller angle within their field of view, than for POIs that are located very closely, where the POI may occupy a much larger angle within their field of view or may occupy their entire field of view.

Figure 25:
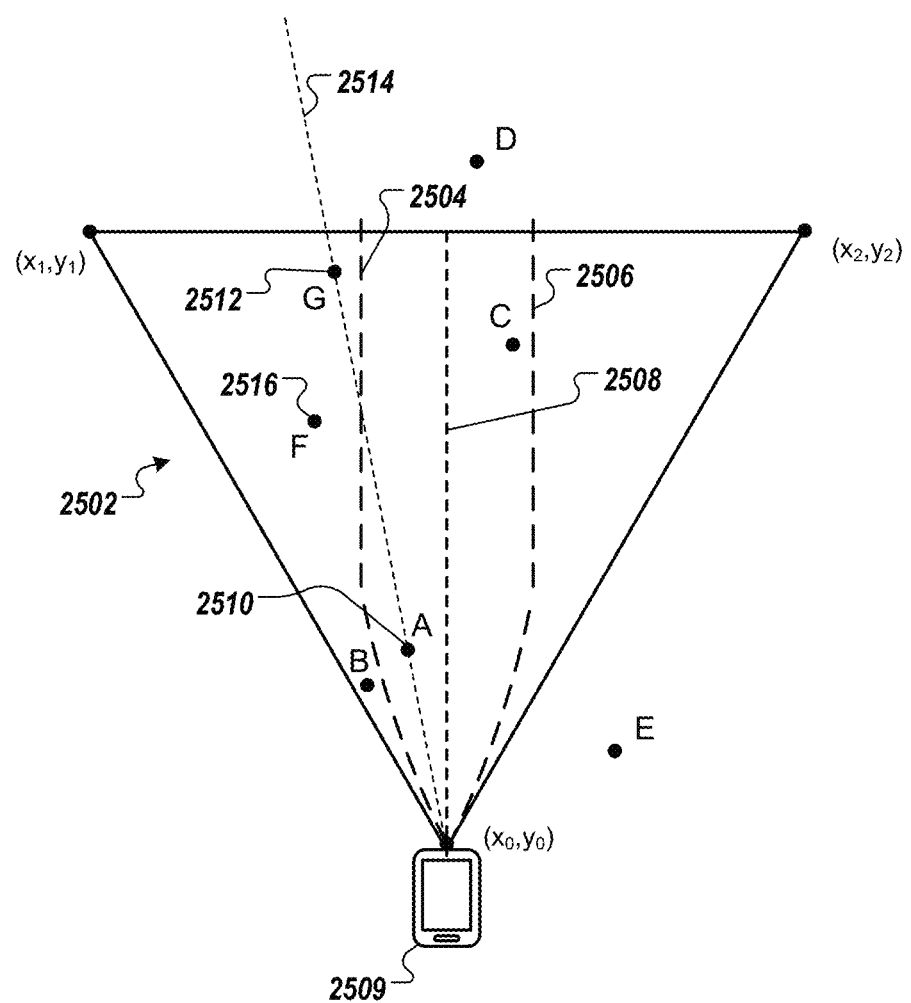

For example, FIG. 25 shows a zone of interest 2502 which is divided into quadrants by curved threshold lines 2504 and 2506 and a center line 2508. Similar to the example of FIG. 23, for POIs located within the central quadrants, the distance between the POI and a mobile device 2509 is not scaled. For POIs located in the outer quadrants, the distance between the POI and the mobile device 2509 is scaled. The threshold lines 2504 and 2506 are shaped such that they are relatively straight (e.g., parallel or near parallel to the center line 2508) in the portion farther from the mobile device 2509 and curved in the portion closest to the mobile device 2509.

The threshold lines 2504 and 2506 are shaped such that, for two POIs each disposed at a particular angle from the mobile device 2509, the POI closer to the mobile device 2509 may be within a center quadrant (e.g., the corresponding distance is not scaled) and the POI farther from the mobile device 2509 may be outside of the center quadrants (e.g., the corresponding distance is scaled). For example, POI "A" 2510 and POI "G" 2512 are both disposed from the mobile device 2509 at the same angle (as illustrated by a line 2514). POI "A" 2510 is located within a center quadrant and therefore the distance between POI "A" 2510 and the mobile device 2509 is not scaled. In contrast, POI "G" 2512 is located outside of the center quadrants and therefore the distance between the POI "G" 2512 and the mobile device 2509 is scaled.

Table 9 indicates that for POI "A" the scaled distance is the same as the respective unscaled distance (e.g., 100.0 feet), and that for POI "G" the scaled distance (e.g., 405.0 feet) is fifty percent larger than the respective unscaled distance (e.g., 270 feet).

TABLE 9

Straight-Line Distance Between Mobile Device and Each POI, Raw and Scaled

| POI | Distance | Angle | Scaled Distance |
|---|---|---|---|
| A | 100 ft | −5° | 100 ft |
| B | 95 ft | −25° | 142.5 ft |
| C | 250 ft | +8° | 250 ft |
| D | — | — | — |
| E | — | — | — |
| F | 200 | −19° | 300 ft |
| G | 270 | −5° | 405 ft |

Table 9 also indicates that for POI "F", the distance to the mobile device 2509 is scaled (e.g., the scaled distance of 300.0 feet is equal to the respective unscaled distance of 200.0 feet multiplied by a factor of 1.5). Contrasting FIGS. 23 and 25, POI "F" 2334 in FIG. 23 is located inside a center quadrant and POI "F" 2516 in FIG. 25 is located at a corresponding position relative to the mobile device 2509 and outside of a center quadrant.

In response to selecting one or more of the identified POIs, detailed information associated with the selected POIs may be pre-cached to the mobile-device. Detailed information for a POI may include, among other things, contact information (e.g., address, phone number), discount offers as provided by the operator of the POI or by third parties, rating information, such as the typed comments of one or more past reviewers of the POI or an average past user review score, other textual information, video, or one or more digital images (e.g., storefronts, menus, menu selections, or a map).

Returning to FIG. 22, information identifying the selected POIs is displayed on a user interface of the mobile device (2214), thereby ending the process 2200 (2216). For example, one or more user reviews or ratings or other detailed information for the selected POIs may be displayed on a user interface of the mobile device. For example, as shown in FIG. 23, a user interface 2350 displays detailed information for the selected POI "A" 2324. The interface 2350 displays a directional icon 2352, an address 2354, a recent user review score 2356, recent user comments 2358, and a discount offer 2360. The user may press a button 2362 to get detailed information about another POI (e.g., the user may point the mobile device at a different POI and press the button 2362). In other words, the process 2200 may be performed (or reperformed) in response to the selection of the button 2362.

As another example and as shown in FIG. 24, detailed information about the realtor POI 2412 may be displayed on a mobile device user interface 2440. The interface 2440 displays an address 2442, a directional icon 2444, an advertisement 2446, and an average user review score 2448. The interface 2440 also displays a disambiguation control 2450 which allows the user to specify that they had intended to point at the law firm POI 2414 rather than the realtor POI 2412. The use of a disambiguation control is particularly useful at shopping centers where, in official legal or governmental records, multiple businesses may officially share a single address or set of GPS coordinates, or where the mailing address of multiple businesses is differentiated by unit, store, or box numbers which have no practical correlation to geography.

FIG. 26 illustrates the displaying of information identifying a POI on a mobile device. A coffee shop POI 2602 is within the field of view of a camera of a mobile device 2604 (e.g., the user of the mobile device 2604 is standing on a street in front of the POI 2602 and points the mobile device 2604 at the POI 2602). As described above, a position and a heading of the mobile device 2604 are determined, and a zone of interest representing the field of view of the camera of the mobile device 2604 is determined based on the position and heading of the mobile device 2604. The coffee shop POI 2602 is identified as being located within the determined zone of interest and the coffee shop POI 2602 is selected (e.g., because it is the POI closest to the mobile device 2604 or because it is the only POI within the determined zone of interest).

In response to the selection of the coffee shop POI 2602, detailed information relating to the POI 2602 is displayed on the mobile device 2604, as shown on a user interface 2606 displayed on a mobile device 2608. The user interface 2606 displays detailed information relating to the POI 2602, such as an address 2610, a recent user review score 2612, recent user comments 2614, an average user review score 2616, and a camera image 2618.

The camera image 2618 shows an image of the coffee shop POI 2602. In some implementations, some or all of the detailed information 2610-2618 is overlaid on top of the camera image 2618. The user may select a button 2620 to obtain information about another POI (e.g., after pointing the mobile device 2608 at a different POI). The user may select a button 2622 to return to a search results interface. For example, a search results interface may display multiple POIs which were within the field of view of the camera of the mobile device (e.g., a search results interface may display thumbnail images of multiple, selected POIs).

Figure 27:
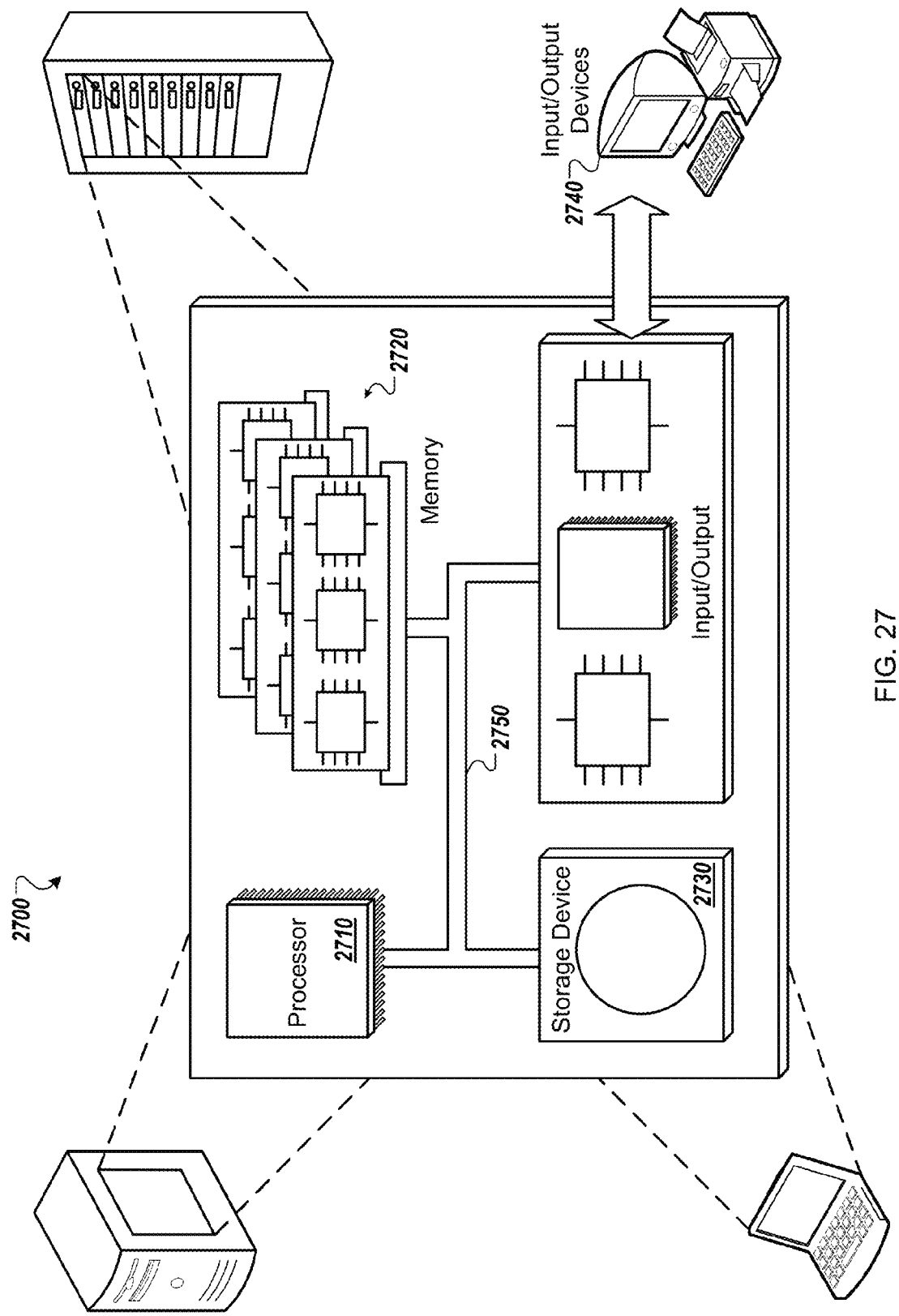
FIG. 27 illustrates an example computing device.

FIG. 27 is a schematic diagram of an example of a generic computer system 2700. The system 2700 includes a processor 2710, a memory 2720, a storage device 2730, and an input/output device 2740. Each of the components 2710, 2720, 2730, and 2740 are interconnected using a system bus 2750. The processor 2710 is capable of processing instructions for execution within the system 2700. In one implementation, the processor 2710 is a single-threaded processor. In another implementation, the processor 2710 is a multi-threaded processor. The processor 2710 is capable of processing instructions stored in the memory 2720 or on the storage device 2730 to display graphical information for a user interface on the input/output device 2740.

The memory 2720 stores information within the system 2700. In one implementation, the memory 2720 is a computer-readable medium. In another implementation, the memory 2720 is a volatile memory unit. In yet another implementation, the memory 2720 is a non-volatile memory unit.

The storage device 2730 is capable of providing mass storage for the system 2700. In one implementation, the storage device 2730 is a computer-readable medium. In various different implementations, the storage device 2730 may be a floppy disk device, a hard disk device, an optical disk device, or a tape device.

The input/output device 2740 provides input/output operations for the system 2700. In one implementation, the input/output device 2740 includes a keyboard and/or pointing device. In another implementation, the input/output device 2740 includes a display unit for displaying graphical user interfaces.

The features described may be implemented in digital electronic circuitry, or in computer hardware, or in combinations of computer hardware and firmware or software. The apparatus may be implemented in a computer program product tangibly embodied in a machine-readable storage device, for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

An electronic document (which for brevity will simply be referred to as a document) may, but need not, correspond to a file. A document may be stored in a portion of a file that holds other documents, in a single file dedicated to the document in question, or in multiple coordinated files.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer program instructions, encoded on computer storage medium for execution by, or to control the operation of, data processing apparatus. Alternatively or in addition, the program instructions may be encoded on an artificially-generated propagated signal, e.g., a machine-generated electrical, optical, or electromagnetic signal, that is generated to encode information for transmission to suitable receiver apparatus for execution by a data processing apparatus.

A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate physical components or media (e.g., multiple CDs, disks, or other storage devices). The operations described in this specification may be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus may include special purpose logic circuitry, e.g., an FPGA (field programmable gate array) or an ASIC (application-specific integrated circuit). The apparatus may also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment may realize various different computing model infrastructures, such as web services, distributed computing and grid computing infrastructures.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments of the subject matter described in this specification may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Embodiments of the subject matter described in this specification may be implemented in a computing system that includes a back-end component, e.g., as a data server, or that includes a middleware component, e.g., an application server, or that includes a front-end component, e.g., a client computer having a graphical user interface or a Web browser through which a user may interact with an implementation of the subject matter described in this specification, or any combination of one or more such back-end, middleware, or front-end components. The components of the system may be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system may include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) may be received from the client device at the server.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
generating, at one or more processors, a first search engine results page which includes links to one or more points-of-interest that satisfy a query;
receiving, at the one or more processors, one or more signals indicating that a link to a point-of-interest was selected by a user;
responsive to receiving the one or more signals:
selecting, at the one or more processors, a plurality of geographic areas, each geographic area being associated with a set of information, each set of information comprising one or more identifiers of points-of-interest and a score associated with each identifier,
determining, at the one or more processors, for each of the selected geographic areas, an increment value,
determining, at the one or more processors, for each of the selected geographic areas, a score associated with the selected point-of-interest,
incrementing, at the one or more processors, for each of the selected geographic areas, the score by the increment value, and
storing, by the one or more processors, for each of the selected geographic areas, the incremented score in the set of information associated with the respective geographic area, the incremented score being stored in association with an identifier of the selected point-of-interest; and
using, at the one or more processors, the incremented scores stored in the sets of information associated with the selected geographic areas to generate a second search engine results page.

2. The computer-implemented method of claim 1, wherein:
one or more of the sets of information are stored in a query database;
the query includes a query term entered by the user,
the first search engine results page includes one or more links to the points-of-interest which satisfy the query, overlaid on a map,
selecting the plurality of geographic areas further comprises determining that the plurality of geographic areas are disposed at or near a center of the map,
the score is associated with a query-result pair including the query term and the particular point-of-interest,
the incremented score for each of the selected geographic areas is stored in association with the query-result pair, in the query database, and
the incremented scores stored in the query database are used to generate the second search engine results page.

3. The method of claim 2, further comprising:
determining a scale of the map,
wherein determining the increment value further comprises selecting a value of zero as the increment value when the scale is determined not to exceed a predetermined threshold.

4. The method of claim 2, further comprising:
providing a search engine query page which includes a pre-query map, and a query field for the user to enter the query terms,
wherein the first search engine results page further includes one or more links to the points-of-interest which satisfy the query, overlaid on a post-query map.

5. The method of claim 1, further comprising:
determining a geographic location of the particular point-of-interest,
wherein:
one or more of the sets of information are stored in a point-of-interest database,
the first search engine results page includes one or more links to the points-of-interest which satisfy the query, presented in a list of search results or overlaid on a map,
selecting the plurality of geographic areas further comprises determining that the plurality of geographic areas are at or near the geographic location of the selected point-of-interest,
the incremented score for each of the selected geographic areas is stored in association with the selected point-of-interest, in the point-of-interest database, and
the incremented scores stored in the point-of-interest database are used to generate the second search engine results page.

6. The method of claim 5, wherein determining the geographic location of the selected point-of-interest further comprising:
determining geographic coordinates of the selected point-of-interest based on accessing a location database which stores information identifying points-of-interest, and geographic coordinates associated with each identified point-of-interest.

7. The method of claim 1, wherein using the incremented scores stored in the sets of information associated with the selected geographic areas to generate a second search engine results page further comprises:
identifying candidate points-of-interest stored for a target geographic area in the sets of information,
determining the score associated with each candidate point-of-interest; and
selecting, as relevant points-of-interest, the candidate points-of-interest whose associated scores satisfy a threshold,
wherein the second search engine results page includes links to the relevant points-of-interest.

8. The method of claim 1, wherein:
the signal further indicates a duration between an initial click on the link by the user, and a subsequent click by the user; and
determining the increment value comprises selecting, as the increment value, a value which is proportional to the duration.

9. The method of claim 1, wherein:
the signal further indicates a click-through-rate of the link, and
determining the increment value comprises selecting, as the increment value, a value which is proportional to the click-through-rate.

10. The method of claim 1, wherein determining the increment value further comprises:
selecting a first increment value for a first selected geographic area, and selecting a second, lesser increment value for the selected geographic areas which surround the first geographic area based on a fall-off function.

11. The method of claim 10, wherein determining the second increment value further comprises applying a Gaussian function to the first increment value.

12. The method of claim 10, wherein determining the second increment value further comprises applying a parabolic function to the first increment value.

13. The method of claim 1, further comprising:
determining that information identifying the selected point-of-interest is stored in the sets of information for more than a predetermined quantity of the geographic areas;
determining, for each of the geographic areas in which the information identifying the selected point-of-interest is stored, a decrement value;
decrementing, for each of the geographic areas in which the information identifying the selected point-of-interest is stored, the score by the decrement value; and
storing, for each of the geographic areas in which the information identifying the selected point-of-interest is stored, the decremented score in association with the information.

14. The method of claim 1, further comprising:
identifying a selected category associated with the link;
incrementing, for the selected point-of-interest, a category score of the selected category by a predetermined value, in a category database which stores information identifying the points-of-interest, candidate categories associated with the selected point-of-interest, and category scores associated with the candidate categories; and
storing, for the selected point-of-interest, the incremented category score in association with the selected category.

15. The method of claim 14, further comprising:
selecting, for the selected point-of-interest, a predominant category having a highest category score; and
storing, for each of the selected geographic areas, the predominant category in association with the information identifying the selected point-of-interest.

16. The method of claim 1, further comprising defining multiple, contiguous geographic areas within a geographic region, the multiple geographic areas each exhibiting a uniform size and shape.

17. The method of claim 1, wherein receiving the one or more signals further comprises:
receiving first and second signals indicating that the link to the selected point-of-interest was selected by the user at a first time and a second time, respectively; and
filtering the second signal.

18. The method of claim 1, further comprising normalizing the increment value into a range between 0 to 1, inclusive.

19. A system comprising:
one or more computers; and
a computer-readable medium coupled to the one or more computers having instructions stored thereon which, when executed by the one or more computers, cause the one or more computers to perform operations comprising:
generating a first search engine results page which includes links to one or more points-of-interest that satisfy a query;
receiving one or more signals indicating that a link to a point-of-interest was selected by a user;
responsive to receiving the one or more signals:
selecting a plurality of geographic areas, each geographic area being associated with a set of information, each set of information comprising one or more identifiers of points-of-interest and a score associated with each identifier,
determining, for each of the selected geographic areas, an increment value,
determining, for each of the selected geographic areas, a score associated with the selected point-of-interest,
incrementing, for each of the selected geographic areas, the score by the increment value, and
storing, for each of the selected geographic areas, the incremented score in the set of information associated with the respective geographic area, the incremented score being stored in association with an identifier of the selected point-of-interest; and
using the incremented scores stored in the sets of information associated with the selected geographic areas to generate a second search engine results page.

20. A non-transitory computer storage medium encoded with a computer program, the program comprising instructions that when executed by data processing apparatus cause the data processing apparatus to perform operations comprising:
generating, at the one or more processors, a first search engine results page which includes links to one or more points-of-interest that satisfy a query;
receiving, at the one or more processors, one or more signals indicating that a link to a point-of-interest was selected by a user;
responsive to receiving the one or more signals:
selecting, at the one or more processors, a plurality of geographic areas, each geographic area being associated with a set of information, each set of information comprising one or more identifiers of points-of-interest and a score associated with each identifier,
determining, at the one or more processors, for each of the selected geographic areas, an increment value,
determining, at the one or more processors, for each of the selected geographic areas, a score associated with the selected point-of-interest,
incrementing, at the one or more processors, for each of the selected geographic areas, the score by the increment value, and
storing, by the one or more processors, for each of the selected geographic areas, the incremented score in the set of information associated with the respective geographic area, the incremented score being stored in association with an identifier of the selected point-of-interest; and
using, at the one or more processors, the incremented scores stored in the sets of information associated with the selected geographic areas to generate a second search engine results page.

* * * * *